US012771992B2

(12) United States Patent
Ye et al.

(10) Patent No.: US 12,771,992 B2
(45) Date of Patent: Oct. 20, 2026

(54) APPARATUS FOR ENHANCING A SOUND PRESSURE LEVEL OF A LOW-PITCHED SOUND BAND

(71) Applicant: LG Display Co., Ltd., Seoul (KR)

(72) Inventors: Jaehun Ye, Tokyo (JP); Shinji Takasugi, Tokyo (JP)

(73) Assignee: LG DISPLAY CO., LTD., Seoul (KR)

(*) Notice: Subject to any disclaimer, the term of this patent is extended or adjusted under 35 U.S.C. 154(b) by 949 days.

(21) Appl. No.: 18/087,573

(22) Filed: Dec. 22, 2022

(65) Prior Publication Data

US 2023/0209251 A1 Jun. 29, 2023

(30) Foreign Application Priority Data

Dec. 28, 2021 (JP) ................................ 2021-214666

(51) Int. Cl.

| | |
|---|---|
| ***H04R 1/40*** | (2006.01) |
| ***H04R 3/02*** | (2006.01) |
| ***H04R 17/10*** | (2006.01) |

(52) U.S. Cl.

CPC ............ *H04R 1/403* (2013.01); *H04R 17/10* (2013.01); *H04R 3/02* (2013.01); *H04R 2201/401* (2013.01)

(58) Field of Classification Search

CPC .......... H04R 1/403; H04R 17/10; H04R 3/02; H04R 2201/401; H04R 3/00; H04R 17/00; H04R 7/06; H04R 7/10; H04R 7/045; H04R 2440/05; H04R 1/345; H04R 1/028; H04R 1/023; H04R 1/2811; H04R 2400/03; H04R 2499/15; G06F 3/01; G06F 3/0354

See application file for complete search history.

(56) References Cited

U.S. PATENT DOCUMENTS

| | | | | |
|---|---|---|---|---|
| 2007/0194660 A1 | 8/2007 | Hashimoto | | |
| 2012/0057728 A1* | 3/2012 | Fujise | ...................... | H04R 7/06 381/162 |

(Continued)

FOREIGN PATENT DOCUMENTS

| | | |
|---|---|---|
| CN | 111381672 A | 7/2020 |
| JP | 2008-245218 A | 10/2008 |

(Continued)

OTHER PUBLICATIONS

Zhu et al., "Design of FPGA Based Audio Directional Loudspeaker System", Computer Measurement & Control, vol. 26, No. 2, 2018, pp. 154-157. (English Abstract Submitted).

*Primary Examiner* — Carolyn R Edwards
*Assistant Examiner* — Julie X Dang
(74) *Attorney, Agent, or Firm* — Birch, Stewart, Kolasch & Birch, LLP

(57) ABSTRACT

An apparatus can include a passive vibration member; a vibration device including a plurality of active vibration members coupled to a rear surface of the passive vibration member, the plurality of active vibration members being arranged along one or more of a first direction and a second direction intersecting with the first direction; and a supporting member at the rear surface of the passive vibration member. Also, at least one or more of the plurality of active vibration members are configured to receive a driving signal that differs from a driving signal applied to other active vibration members among the plurality of active vibration members.

27 Claims, 23 Drawing Sheets

(56) References Cited

U.S. PATENT DOCUMENTS

| | | | | |
|---|---|---|---|---|
| 2013/0241352 | A1* | 9/2013 | Hayashi | H04R 7/045<br>310/323.01 |
| 2015/0131821 | A1 | 5/2015 | Iwasaki | |
| 2015/0341714 | A1 | 11/2015 | Ahn et al. | |
| 2020/0196082 | A1* | 6/2020 | Heilemann | H04R 1/2811 |
| 2020/0213768 | A1 | 7/2020 | Lee et al. | |
| 2021/0014449 | A1* | 1/2021 | Maeshiba | H04N 5/642 |

FOREIGN PATENT DOCUMENTS

| | | | | |
|---|---|---|---|---|
| JP | 2019-504531 | A | 2/2019 | |
| JP | 2021-90140 | A | 6/2021 | |
| JP | 2021-90141 | A | 6/2021 | |
| JP | 2021-197737 | A | 12/2021 | |
| JP | 2023-98116 | A | 7/2023 | |
| KR | 10-2370837 | B1 | 3/2002 | |
| KR | 10-1323323 | B1 | 10/2013 | |
| KR | 10-2018-0077582 | A | 7/2018 | |
| KR | 20190012680 | A * | 2/2019 | H04R 7/045 |
| KR | 10-2019-0054553 | A | 5/2019 | |
| KR | 10-2019-0056618 | A | 5/2019 | |
| KR | 10-2288653 | B1 | 8/2021 | |
| KR | 10-2310176 | B1 | 10/2021 | |
| KR | 10-2320360 | B1 | 11/2021 | |
| KR | 10-2422755 | B1 | 7/2022 | |
| WO | 2021/249392 | A1 | 12/2021 | |

* cited by examiner

APPARATUS FOR ENHANCING A SOUND PRESSURE LEVEL OF A LOW-PITCHED SOUND BAND

CROSS-REFERENCE TO RELATED APPLICATIONS

This application claims the benefit of and priority to Japanese Patent Application No. 2021-214666 filed on Dec. 28, 2021, the entirety of which is hereby incorporated by reference into the present application.

BACKGROUND

Technical Field

The present disclosure relates to a vibration device or vibration apparatus, and more particularly, to a vibration apparatus for outputting a sound.

Discussion of the Related Art

An apparatus includes a separate speaker or a sound apparatus for providing a sound. The sound apparatus includes a vibration system which converts an input electrical signal into a physical vibration. Piezoelectric speakers including ferroelectric ceramic or the like are lightweight and have low power consumption, and thus, are used for various purposes.

In piezoelectric devices used for piezoelectric speakers, a lowest resonance frequency is limited due to high stiffness, and due to this, a sound pressure level of a low-pitched sound band is usually insufficient. Therefore, piezoelectric speakers have a technical problem where a sound pressure level of the low-pitched sound band generated based on a vibration of a passive vibration member is not sufficient, and due to this, apparatuses including a piezoelectric speaker have a technical problem where a sound characteristic and a sound pressure level characteristic of the low-pitched sound band is not sufficient. For example, piezoelectric devices for providing sound often have poor dynamic range, particularly with regards to lower frequencies, such as an impaired bass response.

SUMMARY OF THE DISCLOSURE

The inventors have of the present disclosure recognized the technical problem described above and have performed various experiments for implementing a vibration apparatus which can enhance a sound pressure level of a low-pitched sound band. Through the various experiments, the inventors have invented an apparatus including a new vibration apparatus, which can enhance a sound pressure level of the low-pitched sound band (e.g., improved bass range and low to mid range).

Accordingly, embodiments of the present disclosure are directed to an apparatus that substantially obviates one or more of the problems due to limitations and disadvantages of the related art.

An aspect of the present disclosure is directed to providing an apparatus which can enhance a sound pressure level of the low-pitched sound band generated based on a vibration of a passive vibration member.

Additional features and aspects will be set forth in part in the description that follows, and in part will be apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the inventive concepts, as embodied and broadly described herein, an apparatus comprises a passive vibration member, a vibration apparatus including a plurality of active vibration members connected to a rear surface of the passive vibration member along at least one or more directions of a first direction and a second direction intersecting with the first direction, and a supporting member at the rear surface of the passive vibration member, a driving signal applied to at least one or more of the plurality of active vibration members differs from a driving signal applied to the other active vibration members of the plurality of active vibration members.

In another aspect, an apparatus comprises a passive vibration member, a vibration transfer member disposed at a rear surface of the passive vibration member and connected to the passive vibration member, a vibration apparatus including a plurality of active vibration members connected to the vibration transfer member along at least one or more directions of a first direction and a second direction intersecting with the first direction, and a supporting member at the rear surface of the passive vibration member, a driving signal applied to at least one or more of the plurality of active vibration members differs from a driving signal applied to the other active vibration members of the plurality of active vibration members.

Specific details according to various examples of the present specification other than the means for solving the above-mentioned problems are included in the description and drawings below According to an embodiment of the present disclosure, an apparatus for enhancing a sound pressure level of the low-pitched sound band generated based on a vibration of a passive vibration member can be provided (e.g., an improved bass response).

The details of the present disclosure described in technical problem, technical solution, and advantageous effects do not specify essential features of claims, and thus, the scope of claims is not limited by the details described in detailed description of the disclosure.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The companying drawings, which are included to provide a further understanding of the disclosure and are incorporated in and constitute a part of this application, illustrate aspects and embodiments of the disclosure and together with the description serve to explain principles of the disclosure.

Figure 1:
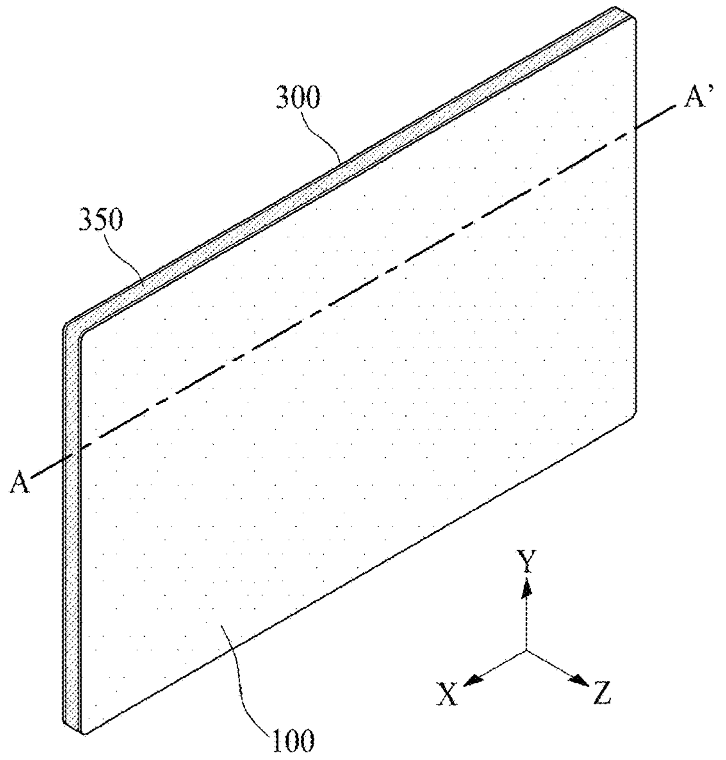
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Same reference numerals designate same elements throughout. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When “comprise,” “have,” and “include” described in the present specification are used, another part can be added unless “only” is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, “on,” “over,” “above,” “under,” and “next,” one or more other parts can be disposed between the two parts unless a more limiting term, such as “just” or “direct (ly)” is used. In the description of embodiments, when a structure is described as being positioned “on or above” or “under or below” another structure, this description should be construed as including a situation in which the structures contact each other as well as a situation in which a third structure is disposed therebetween.

In describing a time relationship, for example, when the temporal order is described as, for example, “after,” “subsequent,” “next,” and “before,” or the like a situation that is not continuous can be included unless a more limiting term, such as “just,” “immediate(ly),” or “direct(ly)” is used.

It will be understood that, although the terms “first,” “second,” etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms “first,” “second,” “A,” “B,” “(a),” “(b),” etc. can be used. These terms are intended to identify the corresponding elements from the other elements, and basis, order, or number of the corresponding elements should not be limited by these terms. The expression that an element is “connected,” “coupled,” or “adhered” to another element or layer the element or layer can not only be directly connected or adhered to another element or layer, but also be indirectly connected or adhered to another element or layer with one or more intervening elements or layers “disposed,” or “interposed” between the elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. All the components of each apparatus according to all embodiments of the present disclosure are operatively coupled and configured. In addition, for convenience of description, a scale, size and thickness of each of elements illustrated in the accompanying drawings differs from a real scale, and thus, embodiments of the present disclosure are not limited to a scale illustrated in the drawings.

Figure 2:
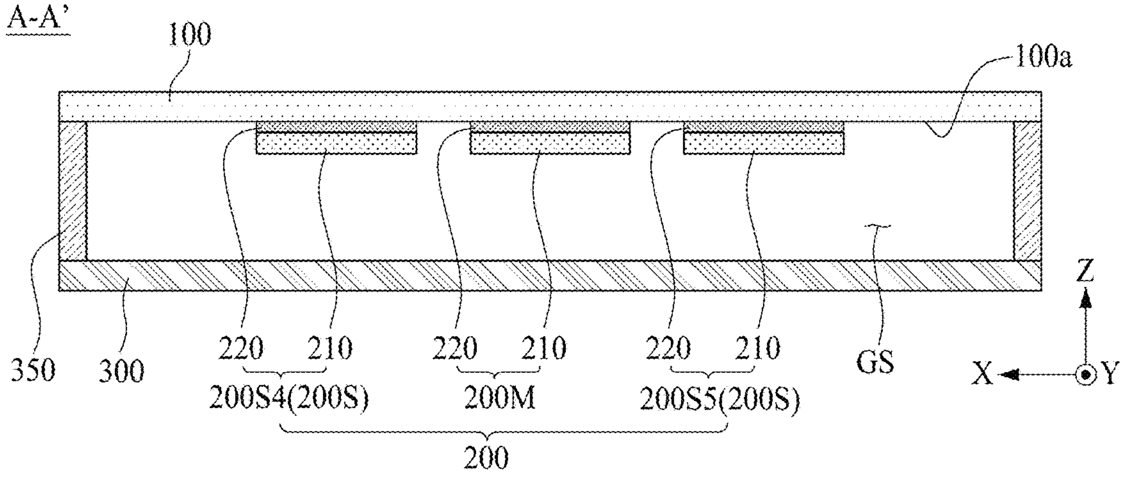
FIG. 2 is a cross-sectional view taken along line A-A' illustrated in FIG. 1 according to an embodiment of the present disclosure.

FIG. 1 illustrates an apparatus according to an embodiment of the present disclosure, and FIG. 2 is a cross-sectional view taken along line A-A' illustrated in FIG. 1.

With reference to FIGS. 1 and 2, the apparatus according to an embodiment of the present disclosure can include a passive vibration member 100 and a vibration apparatus 200. For example, the vibration apparatus 200 can move and vibrate the passive vibration member 100.

The apparatus according to an embodiment of the present disclosure can be a display apparatus, a sound apparatus, a sound generating apparatus, a sound bar, an analog signage, or a digital signage, or the like, but embodiments of the present disclosure are not limited thereto.

The display apparatus can include a display panel including a plurality of pixels which implement a black/white or color image and a driving part for driving the display panel. For example, the display panel can be an organic light emitting display panel, a light emitting diode display panel, an electrophoresis display panel, an electro-wetting display panel, a micro light emitting diode display panel, or a quantum dot light emitting display panel, or the like, but embodiments of the present disclosure are not limited thereto. For example, in the organic light emitting display panel, a pixel can include an organic light emitting device such as an organic light emitting layer or the like, and the pixel can be a subpixel which implements any one of a plurality of colors configuring a color image. Thus, an apparatus according to a first embodiment of the present disclosure can include a set device (or a set apparatus) or a set electronic device such as a notebook computer, a TV, a computer monitor, an equipment apparatus including an automotive apparatus or another type apparatus for vehicles, or a mobile electronic device such as a smartphone, or an electronic pad, or the like which is a complete product (or a final product) including a display panel such as an organic light emitting display panel, a liquid crystal display panel, or the like.

The analog signage can be an advertising signboard, a poster, a noticeboard, or the like. The analog signage can include signage content such as a sentence, a picture, and a sign, or the like. The signage content can be disposed at the passive vibration member 100 of the apparatus to be visible. For example, the signage content can be directly attached on the passive vibration member 100 and the signage content can be printed or the like on a medium such as paper, and the medium can be attached on the passive vibration member 100. Also, the apparatus according to an embodiment of the present disclosure can be included in a vehicle, and the vibration apparatus 200 can be applied to a roof, a ceiling panel, a door panel, a dash board panel, and a vehicle column, etc.

The passive vibration member 100 can vibrate based on driving (or vibration or displacing) of the vibration apparatus 200. For example, the passive vibration member 100 can generate one or more of a vibration and a sound based on driving of the vibration apparatus 200.

The passive vibration member 100 according to an embodiment of the present disclosure can be a display panel including a display area (or a screen) having a plurality of pixels which implement a black/white or color image. Thus, the passive vibration member 100 can generate one or more of a vibration and a sound based on driving of the vibration apparatus 200. For example, the passive vibration member 100 can vibrate based on a vibration of the vibration apparatus 200 while a display area is displaying an image, and thus, can generate or output a sound synchronized with the image displayed on the display area.

The passive vibration member 100 according to another embodiment of the present disclosure can be a non-display panel instead of a display panel. For example, the passive vibration member 100 can be a vibration plate which includes one or more materials of wood, rubber, plastic, flexible glass, fiber, cloth, paper, metal, carbon, a mirror, and leather, but embodiments of the present disclosure are not limited thereto.

The passive vibration member 100 according to an embodiment of the present disclosure can be a vibration object, a display member, a display panel, a signage panel, a passive vibration plate, a front cover, a front member, a vibration panel, a sound panel, or a passive vibration panel, but embodiments of the present disclosure are not limited thereto.

The vibration apparatus 200 can be configured to vibrate the passive vibration member 100. The vibration apparatus 200 can be configured to be connected to a rear surface of the passive vibration member 100. Accordingly, the vibration apparatus 200 can vibrate the passive vibration member 100 to generate or output one or more of a vibration and a sound based on a vibration of the passive vibrating member 100. Also, the vibration apparatus 200 can be referred to as a vibration device.

The vibration apparatus 200 can be connected or coupled to the rear surface 100*a* of the passive vibration member 100. The vibration apparatus 200 can divide or organize the passive vibration member 100 into a plurality of regions (or vibration regions or division regions) and can vibrate the passive vibration member 100. For example, the vibration apparatus 200 can be configured to independently or individually vibrate each of the plurality of regions which are set in the passive vibration member 100. For example, each of the plurality of regions set in the passive vibration member 100 can have the same size or the same area, but embodiments of the present disclosure are not limited thereto. For example, a size of each of the plurality of regions can include a length in a first direction X and a length in a second direction Y.

The vibration apparatus 200 according to an embodiment of the present disclosure can include a plurality of active vibration members 200M and 200S.

The plurality of active vibration members 200M and 200S can be connected to or coupled to the rear surface 100*a* of the passive vibration member 100 to have a predetermined interval in one or more of the first direction X and the second direction Y. For example, the first direction X can be perpendicular to or intersect with the second direction Y. For example, the first direction X can be a widthwise direction or a long-side lengthwise direction of the passive vibration member 100. For example, the second direction Y can be a lengthwise direction or a short-side lengthwise direction of the passive vibration member 100. For example, the plurality of active vibration members 200M and 200S can be arranged or disposed at the predetermined interval along one or more of the first direction X and the second direction Y, and thus, can be referred to as a vibration array, an array vibration apparatus, or a tiling vibration apparatus. For example, active vibration member 200M at a center of a given area, and the active vibration members 200S1-200S8 can be disposed around active vibration member 200M.

Each of the plurality of active vibration members 200M and 200S can include a vibration device 210 and a connection member 220.

The vibration device 210 can vibrate (or displace or drive) based on a driving signal input thereto. For example, the vibration device 210 can vibrate (or displace or drive) as contraction and expansion are alternately repeated based on a piezoelectric effect (or a piezoelectric characteristic) according to a driving signal applied from the outside. The driving signal can be an alternating current (AC) signal such as a sound signal, a vibration driving signal, or a voice signal, or the like. The vibration devices 210 of the plurality of active vibration members 200M and 200S can vibrate (or displace or drive) based on the same driving signal or different driving signals.

According to an embodiment of the present disclosure, driving signals respectively applied to the vibration devices 210 of the plurality of active vibration members 200M and 200S can have the same phase (or in-phase) or opposite phases (or anti-phases). According to another embodiment of the present disclosure, driving signals respectively applied to the vibration devices 210 of the plurality of active vibration members 200M and 200S can have the same period and can be the same or differ in one or more of a phase and an amplitude.

The vibration device 210 of each of the plurality of active vibration members 200M and 200S can be a single-layer vibration device or a stack type vibration device, but embodiments of the present disclosure are not limited. The vibration device 210 of each of the plurality of active vibration members 200M and 200S can include one or more piezoelectric devices having a piezoelectric characteristic. The piezoelectric device can be a device which is displaced by an inverse piezoelectric effect when a driving signal (or a voltage) based on a sound signal input thereto is input thereto. The piezoelectric device can be a device which is flexurally displaced (or flexurally vibrated or flexurally driven) based on a voltage like bimorph and unimorph, or the like.

According to an embodiment of the present disclosure, when the vibration device 210 is the single-layer vibration device, the vibration device 210 can include one piezoelectric device. The one piezoelectric device can include a piezoelectric layer, one or more first electrodes disposed at a first surface of the piezoelectric layer, and one or more second electrodes disposed at a second surface different from the first surface of the piezoelectric layer. For example, the piezoelectric layer can include a front surface and a rear surface. For example, the first surface of the piezoelectric layer can be a first region of the front surface (or the rear surface) of the piezoelectric layer, and the second surface of the piezoelectric layer can be a second region, which is spaced apart from the first region of the front surface (or the rear surface) of the piezoelectric layer. For example, the first surface of the piezoelectric layer can be the front surface of the piezoelectric layer, and the second surface of the piezoelectric layer can be the rear surface of the piezoelectric layer.

According to an embodiment of the present disclosure, when the vibration device 210 is the stack type vibration device, the vibration device 210 can include a plurality of piezoelectric devices. For example, an electrode disposed between two piezoelectric devices vertically adjacent to each other among a plurality of piezoelectric devices can be used as a common electrode which applies the same driving signal to each of the two piezoelectric devices vertically adjacent to each other, but embodiments of the present disclosure are not limited thereto. For example, an insulation layer having elasticity can be interposed between the two piezoelectric devices vertically adjacent to each other among the plurality of piezoelectric devices. For example, the insulation layer having elasticity can increase a mass of the piezoelectric device or the vibration device 210, and thus, can act as a mass which reduces or lowers a resonance frequency (or a natural frequency) of the piezoelectric device or the vibration device 210 (e.g., helping to improve the bass response).

Material of the piezoelectric layer according to an embodiment of the present disclosure is not limited thereto, but can include a piezoelectric material of a ceramic-based material capable of implementing a relatively high vibration, or can include a piezoelectric ceramic material having a perovskite-based crystal structure, but embodiments of the present disclosure are not limited thereto. For example, the piezoelectric layer can be configured as a piezoelectric material including lead (Pb) or a piezoelectric material not including lead (Pb). For example, the piezoelectric material including lead (Pb) can include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but embodiments of the present disclosure are not limited thereto. For example, the piezoelectric material not including lead (Pb) can include one or more of barium titanate ($BaTiO_3$), calcium titanate ($CaTiO_3$), and strontium titanate ($SrTiO_3$), but embodiments of the present disclosure are not limited thereto.

The connection member 220 can be disposed between the vibration device 210 and the passive vibration member 100. The connection member 220 can be coupled or connected between the vibration device 210 and the passive vibration member 100. For example, the connection member 220 can be connected to or attached on the vibration device 210 and the passive vibration member 100. For example, all of a first surface (or a front surface or an upper surface) of the connection member 220 can be connected to or attached on the rear surface 100*a* of the passive vibration member 100, and all of a second surface (or a rear surface or a lower surface), which is opposite to the first surface, of the connection member 220 can be connected to or attached on the vibration device 210. For example, the vibration device 210 can be connected to or attached on the rear surface 100*a* of the passive vibration member 100 by using a whole surface attachment scheme using the connection member 220.

The connection member 220 according to an embodiment of the present disclosure can include an elastic material which has adhesive properties and is capable of compression and decompression. For example, the connection member 220 can include an adhesive material having elasticity or flexibility. For example, the connection member 220 can be configured as an adhesive material which is low in elastic modulus (or Young's modulus). For example, the connection member 220 can be configured as an adhesive resin, an adhesive, an adhesive tape, and adhesive film, or an adhesive pad, or the like, but embodiments of the present disclosure are not limited thereto. For example, the adhesive tape can include a double-sided tape, a double-sided foam tape, or a double-sided sponge tape, or the like, which has an adhesive layer. The adhesive pad can include an elastic pad such as a rubber pad or a silicone pad, or the like, which has an adhesive layer and is capable of compression and decompression.

The adhesive resin, the adhesive, or the adhesive layer of the connection member 220 according to an embodiment of the present disclosure can include an epoxy-based adhesive material, an acrylic-based adhesive material, a silicone-based adhesive material, or urethane-based adhesive material. For example, the connection member 220 can include an acrylic-based adhesive material having a characteristic which is relatively good in adhesive force and high in hardness of acrylic and urethane so that a vibration of the first vibration device 210 is well transferred to the passive vibrating member 100, but embodiments of the present disclosure are not limited thereto.

The adhesive resin, the adhesive, or the adhesive layer of the connection member 220 according to an embodiment of the present disclosure can include a photo-curable adhesive material, but embodiments of the present disclosure are not limited thereto. For example, the adhesive resin, the adhesive, or the adhesive layer can be an ultraviolet (UV) adhesive, but embodiments of the present disclosure are not limited thereto.

The apparatus according to an embodiment of the present disclosure can further include a supporting member 300 and a coupling member 350. The coupling member 350 can be disposed between the supporting member 300 and the passive vibration member 100.

The supporting member 300 can be disposed at a rear surface 100*a* of the passive vibration member 100. The supporting member 300 can be disposed at the rear surface 100*a* of the passive vibration member 100 to cover the vibration apparatus 200. The supporting member 300 can be disposed at the rear surface 100*a* of the passive vibration member 100 to partially cover or cover all of the rear surface 100*a* of the passive vibration member 100 and the vibration apparatus 200. For example, the supporting member 300 can have the same size as the passive vibration member 100. For example, the supporting member 300 can cover a whole rear surface of the passive vibration member 100 with a gap space GS and the vibration apparatus 200 therebetween. The gap space GS can be provided by the coupling member 350 disposed between the passive vibration member 100 and the supporting member 300 facing each other. The gap space GS can be referred to as an air gap, an accommodating space, a vibration space, a sound chamber, a resonance chamber, or a sound sounding box, but embodiments of the present disclosure are not limited thereto.

The supporting member 300 can include at least one or more of a glass material, a metal material, and a plastic material. For example, the supporting member 300 can include a stacked structure in which at least one or more of a glass material, a plastic material, and a metal material is stacked thereof. For example, the supporting member 300 can include a material which has relatively high stiffness or high hardness, compared to the passive vibration member 100 (e.g., the supporting member 300 can be stiffer than the passive vibration member 100). For example, the supporting member 300 can be a rear structure, a supporting structure, a supporting plate, a supporting cover, a rear cover, a housing, or a rear member, but embodiments of the present disclosure are not limited thereto.

Each of the passive vibration member 100 and the supporting member 300 can have a square shape or a rectangular shape, but embodiments of the present disclosure are not limited thereto, and can have a polygonal shape, a non-polygonal shape, a triangular shape, a circular shape, or an oval shape. For example, when the apparatus according to another embodiment of the present disclosure is applied to a sound apparatus or a sound bar, each of the passive vibration member 100 and the supporting member 300 can have a rectangular shape where a length of a long side is twice or more times longer than a short side, but embodiments of the present disclosure are not limited thereto.

The coupling member 350 can be configured to be connected between a rear periphery portion of the passive vibration member 100 and a front periphery portion of the supporting member 300, and thus, the gap space GS can be provided between the passive vibration member 100 and the supporting member 300 facing each other.

The coupling member 350 according to an embodiment of the present disclosure can include an elastic material which has adhesive properties and is capable of compression and decompression. For example, the coupling member 350 can include a double-sided tape, a single-sided tape, an adhesive film, or a double-sided adhesive foam pad, but embodiments of the present disclosure are not limited thereto, and can include an elastic pad such as a rubber pad or a silicone pad, or the like, which has adhesive properties and is capable of compression and decompression. For example, the coupling member 350 can be formed by elastomer.

According to another embodiment of the present disclosure, the supporting member 300 can further include a sidewall portion which supports a rear periphery portion of the passive vibration member 100. The sidewall portion of the supporting member 300 can protrude or be bent toward the rear periphery portion of the passive vibration member 100 from the front periphery portion of the supporting member 300, and thus, the gap space GS can be provided between the passive vibration member 100 and the supporting member 300. For example, the coupling member 350 can be configured to be connected between the sidewall portion of the supporting member 300 and the rear periphery portion of the passive vibration member 100. Accordingly, the supporting member 300 can cover the vibration apparatus 200 and can support the rear surface 100*a* of the passive vibration member 100. For example, the supporting member 300 can cover the vibration apparatus 200 and can support the rear periphery portion of the passive vibration member 100.

According to another embodiment of the present disclosure, the passive vibration member 100 can further include a sidewall portion which is connected to a front periphery portion of the supporting member 300. The sidewall portion of the passive vibration member 100 can protrude or be bent toward the front periphery portion of the supporting member 300 from the rear periphery portion of the passive vibration member 100, and thus, the gap space GS can be provided between the passive vibration member 100 and the supporting member 300. A stiffness of the passive vibration member 100 can be increased based on the sidewall portion. For example, the coupling member 350 can be configured to be connected between the sidewall portion of the passive vibration member 100 and the front periphery portion of the supporting member 300. Accordingly, the supporting member 300 can cover the vibration apparatus 200 and can support the rear surface 100*a* of the passive vibration member 100. For example, the supporting member 300 can cover the vibration apparatus 200 and can support the rear periphery portion of the passive vibration member 100.

Figure 3:
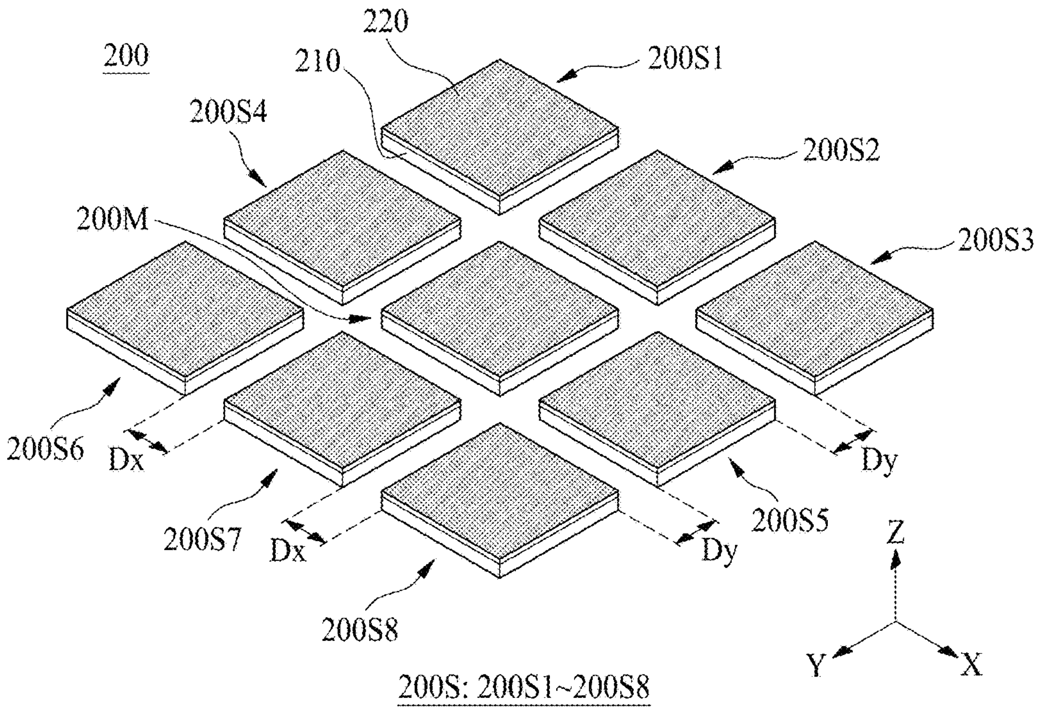
FIG. 3 illustrates a vibration apparatus according to an embodiment of the present disclosure illustrated in FIG. 1.

FIG. 3 illustrates a vibration apparatus according to an embodiment of the present disclosure illustrated in FIG. 2.

With reference to FIGS. 2 and 3, a vibration apparatus 200 according to an embodiment of the present disclosure can include a plurality of active vibration members 200M and 200S.

The plurality of active vibration members 200M and 200S can be disposed at or arranged on the same plane to have a predetermined interval Dx or Dy. Alternatively, the plurality of active vibration members 200M and 200S can be disposed at or arranged on different planes (e.g., such as slightly different levels or heights). The plurality of active vibration members 200M and 200S can be arranged as a matrix type, a grid type or a lattice type at the rear surface 100*a* of the passive vibration member 100, but embodiments of the present disclosure are not limited thereto. For example, the plurality of active vibration members 200M and 200S can be disposed or arranged to have a first interval (or a first separation distance) Dx along the first direction X or have a second interval (or a second separation distance) Dy along the second direction Y. For example, the first interval Dx and the second interval Dy can be 20 mm to 50 mm (e.g., 35 mm), but embodiments of the present disclosure are not limited thereto, and the first interval Dx and the second interval Dy can be changed based on at least one or more of a size of the vibration device 210 and a size of the passive vibration member 100.

According to an embodiment of the present disclosure, any one of the plurality of active vibration members 200M and 200S can be a main active vibration member 200M, and a plurality of active vibration members 200S1 to 200S8 other than the main active vibration member 200*m* among the plurality of active vibration members 200M and 200S can be a plurality of sub-active vibration members 200S. For example, the main active vibration member 200M can be a first active vibration member, a reference active vibration member, a center active vibration member, or a master active vibration member. For example, each of the sub-active vibration members 200S can be a second active vibration member, a secondary active vibration member, a peripheral active vibration member, or a slave active vibration member.

The main active vibration member 200M can be disposed at a center (or a middle portion, or other target location) of a vibration region of the passive vibration member 100 which is vibrated by the vibration apparatus 200. A center (or a middle portion) of the main active vibration member 200M can be disposed aligned at the center (or the middle portion) of the vibration region of the passive vibration member 100. For example, as illustrated in FIG. 3, when the vibration apparatus 200 includes nine active vibration members 200M and 200S arranged in a 3×3 form, an active vibration member 200M arranged in a second column of a second row (2, 2) of the 3×3 form can be set to the main active vibration member 200M.

Each of the plurality of sub-active vibration members 200S can be disposed at a periphery of the main active vibration member 200M with respect to the main active vibration member 200M. For example, the plurality of sub-active vibration members 200S can be arranged in a lattice form or a radial form at the periphery of the main active vibration member 200M, but embodiments of the present disclosure are not limited thereto. For example, the plurality of sub-active vibration members 200S can be regularly arranged or irregularly or randomly arranged at the periphery of the main active vibration member 200M, based on at least one or more of a material characteristic of the passive vibration member 100 and a vibration (or displacement or driving) characteristic of a vibration region. Alternatively, the plurality of sub-active vibration members 200S can be arranged around the main active vibration member 200M with different shapes and arrangements, such a star pattern, a hub and spoke wheel pattern, a cross pattern, a diamond pattern, or an oval pattern, but embodiments are not limited thereto.

According to an embodiment of the present disclosure, the plurality of sub-active vibration members 200S can be respectively disposed at upper, lower, left, and right peripheries of the main active vibration member 200M. The plurality of sub-active vibration members 200S can be respectively disposed at the upper, lower, left, and right peripheries of the main active vibration member 200M to have the first interval Dx and the second interval Dy from the main active vibration member 200M. For example, as illustrated in FIG. 3, when the vibration apparatus 200 includes nine active vibration members 200M and 200S arranged in a 3×3 form to have the first interval Dx and the second interval Dy, an active vibration member 200M arranged in a second column of a second row (2, 2) of the 3×3 form can be the main active vibration member 200M, and eight active vibration members 200S other than the active vibration member 200M arranged in the second column of the second row (2, 2) can be a plurality of sub-active vibration members 200S. For example, when the vibration apparatus 200 includes the nine active vibration members 200M and 200S arranged in the 3×3 form, the vibration apparatus 200 can include the main active vibration member 200M and first to eighth sub-active vibration members 200S1 to 200S8 which are arranged at a periphery of the main active vibration member 200M to surround the main active vibration member 200M.

According to an embodiment of the present disclosure, the main active vibration member 200M and the plurality of sub-active vibration members 200S can be simultaneously driven (or vibrated or a displaced) by a driving signal based on one sound source signal, and thus, can be driven as one vibration apparatus. Accordingly, the vibration apparatus 200 according to an embodiment of the present disclosure can vibrate the passive vibration member 100 having a relatively large size (or area) by using the plurality of active vibration members 200M and 200S, and thus, can increase a vibration amplitude (or a displacement width) of the passive vibration member 100, thereby enhancing a sound characteristic and a sound pressure level characteristic of a low-pitched sound band generated based on a vibration of the passive vibration member 100. Alternatively, the plurality of active vibration members 200M and 200S can be driven at slightly different timings or according to a certain sequence (e.g., such as based on how far away the sub-active vibration members are from the main active vibration member 200M).

The inventors of the present disclosure have performed various experiments for enhancing a sound characteristic and a sound pressure level characteristic of the low-pitched sound band in a situation where the plurality of active vibration members 200M and 200S are connected to the passive vibration member 100 in an array (or tiling) form and a sound is generated or output by vibrating the passive vibration member 100 based on one sound source signal.

According to the various experiments, the inventors of the present disclosure have recognized that a vibration of each of the plurality of active vibration members 200M and 200S is propagated in a radial form in a vibration region of the passive vibration member 100, and thus, a vibration amplitude (or a displacement width) of the passive vibration member 100 is reduced in a specific region of the vibration region of the passive vibration member 100 due to a reflective vibration wave and/or interference of a vibration, and through the various experiments, the inventors of the present disclosure have recognized that a sound characteristic and a sound pressure level characteristic of the low-pitched sound band are further enhanced by controlling at least one or more of driving signals respectively applied to the main active vibration member 200M and the first to eighth sub-active vibration members 200S1 to 200S8. This will be described below with reference to FIG. 4.

Figure 4:
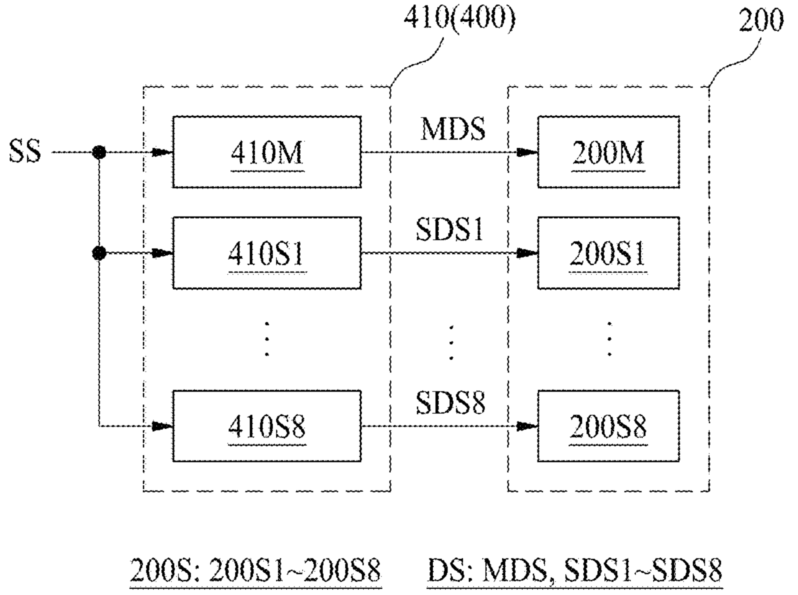
FIG. 4 is a block diagram illustrating a vibration driving circuit according to an embodiment of the present disclosure.
Figure 5:
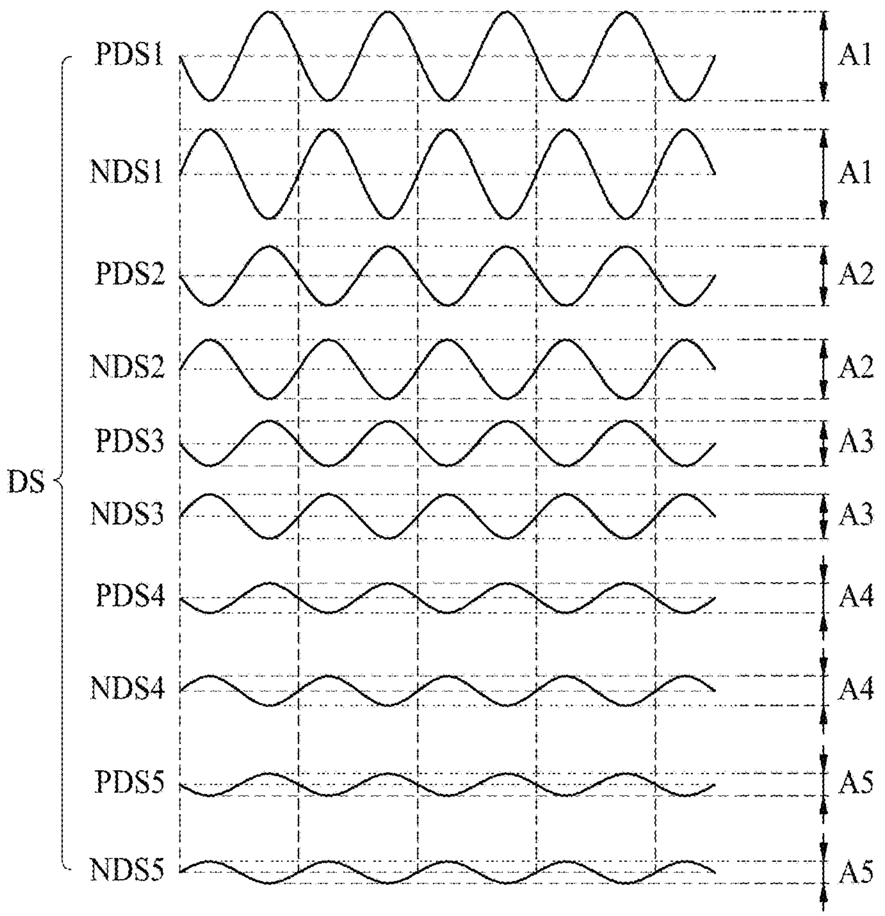
FIG. 5 is a waveform diagram illustrating a driving signal for driving of an active vibration member according to an embodiment of the present disclosure.

FIG. 4 is a block diagram illustrating a vibration driving circuit 400 according to a first embodiment of the present disclosure, and FIG. 5 is a waveform diagram illustrating a driving signal for driving of an active vibration member according to an embodiment of the present disclosure.

With reference to FIGS. 3 to 5, the vibration driving circuit 400 according to the first embodiment of the present disclosure can generate a driving signal DS for vibrating (or displacing) each of a plurality of active vibration members 200M and 200S based on one sound source signal SS input from a host device (or a host driving circuit) and can supply the generated driving signal DS to corresponding active vibration members 200M and 200S.

A driving signal DS applied to a main active vibration member 200M can be referred to as a main driving signal MDS, and driving signals respectively applied to a plurality of sub-active vibration members 200S can be referred to as a plurality of sub-driving signals SDS1 to SDS8. The vibration driving circuit 400 can generate each of the main driving signal MDS for vibrating (or displacing) the main driving signal MDS and the plurality of sub-driving signals SDS1 to SDS8 for vibrating (or displacing) the plurality of sub-active vibration members 200S, based on one sound source signal SS. For example, the vibration driving circuit 400 can generate the main active vibration member 200M and first to eighth sub-driving signals SDS1 to SDS8, respectively, based on one sound source signal SS.

According to another embodiment of the present disclosure, each of the main driving signal MDS and the plurality of sub-driving signals SDS1 to SDS8 can be generated based on the same sound source signal or one sound source signal, and each of the main driving signal MDS and the plurality of sub-driving signals SDS1 to SDS8 can have the same period or can simultaneously vary (or change).

Each of the first to eighth sub-driving signals SDS1 to SDS8 according to an embodiment of the present disclosure can be the same as or different from the main driving signal MDS. For example, at least one or more of first to eighth sub-driving signals SDS1 to SDS8 can be the same as or different from the main driving signal MDS. For example, one or more of a phase and an amplitude of each of the first to eighth sub-driving signals SDS1 to SDS8 can be the same as or different from one or more of a phase and an amplitude of the main driving signal MDS.

According to an embodiment of the present disclosure, the phase of each of the first to eighth sub-driving signals SDS1 to SDS8 can be the same as or different from the phase of the main driving signal MDS. For example, at least one or more of the first to eighth sub-driving signals SDS1 to SDS8 can have a phase which is the same as or opposite to that of the main driving signal MDS. For example, when the main driving signal MDS has a positive phase, at least one or more of the first to eighth sub-driving signals SDS1 to SDS8 can have a positive phase or a negative antiphase.

According to another embodiment of the present disclosure, the amplitude of each of the first to eighth sub-driving signals SDS1 to SDS8 can be the same as or different from the amplitude of the main driving signal MDS. For example, at least one or more of the first to eighth sub-driving signals SDS1 to SDS8 can have an amplitude which is the same as or different from that of the main driving signal MDS. For example, at least one or more of the first to eighth sub-driving signals SDS1 to SDS8 can have an amplitude which is smaller than or equal to that of the main driving signal MDS.

The vibration driving circuit 400 according to the first embodiment of the present disclosure can include an amplification circuit part 410 which generates the driving signal DS for vibrating (or displacing) each of the plurality of active vibration members 200M and 200S based on one sound source signal SS input from the host device (or the host driving circuit) and supplies the generated driving signal DS to corresponding active vibration members 200M and 200S.

The amplification circuit part 410 can be configured to amplify one sound source signal SS input thereto and supply the amplified sound source signal SS to each of the plurality of active vibration members 200M and 200S. The amplification circuit part 410 can include a plurality of amplification circuits 410M and 410S1 to 410S8 respectively corresponding to the plurality of active vibration members 200M and 200S. For example, the amplification circuit part 410 can include a main amplification circuit 410M and a plurality of sub amplification circuits 410S1 to 410S8. The amplification circuit part 410 can include a main amplification circuit 410M and first to eighth sub amplification circuits 410S1 to 410S8.

Each of the main amplification circuit 410M and a plurality of sub amplification circuits 410S1 to 410S8 can simultaneously receive the same sound source signal and can amplify a sound source signal based on a predetermined gain value to generate the driving signal DS.

The main amplification circuit 410M, as illustrated in FIG. 5, can amplify a sound source signal to one of a plurality of positive driving signals PDS1 to PDS5 and a plurality of negative driving signals NDS1 to NDS5 based on the predetermined gain value to generate a main driving signal MDS and can supply the generated main driving signal MDS to the main active vibration member 200M. For example, the main amplification circuit 410M can amplify the sound source signal to one of first to fifth positive driving signals PDS1 to PDS5 and first to fifth negative driving signals NDS1 to NDS5 based on the predetermined gain value to generate the main driving signal MDS.

The first positive driving signal PDS1 and the first negative driving signal NDS1 can have the same period and first amplitude A1. The first negative driving signal NDS1 can be an anti-phase signal of the first positive driving signal PDS1.

A second positive driving signal PDS2 and a second negative driving signal NDS2 can have the same period and second amplitude A2. The second negative driving signal NDS2 can be an anti-phase signal of the second positive driving signal PDS2. For example, the second amplitude A2 can be ½ of the first amplitude A1 (A2=A1×½), but embodiments of the present disclosure are not limited thereto.

A third positive driving signal PDS3 and a third negative driving signal NDS3 can have the same period and third amplitude A3. The third negative driving signal NDS3 can be an anti-phase signal of the third positive driving signal PDS3. For example, the third amplitude A3 can be ⅔ of the first amplitude A1 (A3=A1×⅔), but embodiments of the present disclosure are not limited thereto.

A fourth positive driving signal PDS4 and a fourth negative driving signal NDS4 can have the same period and fourth amplitude A4. The fourth negative driving signal NDS4 can be an anti-phase signal of the fourth positive driving signal PDS4. For example, the fourth amplitude A4 can be ⅓ of the first amplitude A1 (A4=A1×⅓), but embodiments of the present disclosure are not limited thereto.

A fifth positive driving signal PDS5 and a fifth negative driving signal NDS5 can have the same period and fifth amplitude A5. The fifth negative driving signal NDS5 can be an anti-phase signal of the fifth positive driving signal PDS5. For example, the fifth amplitude A5 can be ¼ of the first amplitude A1 (A5=A1×¼), but embodiments of the present disclosure are not limited thereto.

According to an embodiment of the present disclosure, the main amplification circuit 410M, as illustrated in FIG. 5, can be implemented to amplify a sound source signal to one of the first positive driving signal PDS1, the first negative driving signal NDS1, the second positive driving signal PDS2, and the second negative driving signal NDS2 based on a predetermined gain value to output the main driving signal MDS, but embodiments of the present disclosure are not limited thereto.

According to an embodiment of the present disclosure, each of the plurality of (or first to eighth) sub amplification circuits 410S1 to 410S8, as illustrated in FIG. 5, can amplify a sound source signal to one of the plurality of positive driving signals PDS1 to PDS5 and the plurality of negative driving signals NDS1 to NDS5 based on the predetermined gain value to generate corresponding sub-driving signals SDS1 to SDS8 and can supply the generated sub-driving signals SDS1 to SDS8 to corresponding sub-active vibration members 200S1 to 200S8. For example, each of the plurality of (or first to eighth) sub amplification circuits 410S1 to 410S8 can amplify a sound source signal to one of the first to fifth positive driving signals PDS1 to PDS5 and the first to fifth negative driving signals NDS1 to NDS5 based on the predetermined gain value to generate the sub-driving signals SDS1 to SDS8.

A gain value of each of the plurality of (or first to eighth) sub amplification circuits 410S1 to 410S8 can be set or adjusted based on a region-based vibration (or displacement) deviation occurring in a vibration region of the passive vibration member 100 vibrating based on driving (or vibration) of the vibration apparatus 200. The gain value of each of the plurality of (or first to eighth) sub amplification circuits 410S1 to 410S8 can be set so that a vibration width (or a displacement width) of a vibration region of the passive vibration member 100 has symmetricity with respect to a vibration region based on the main active vibration member 200M. For example, each of the sub amplification circuits 410S1 to 410S8 can be individually tuned to provide an optimal vibration response with a vibration region corresponding to the main active vibration member 200M. Also, the amplification circuits can be dynamically tuned (e.g., to address any issues or changes that may develop over time, such as certain parts losing elasticity or degrading, etc.).

According to an embodiment of the present disclosure, a vibration region of the passive vibration member 100 can include a large region, a small region, and a middle region, which are large, small, and middle in vibration width (or displacement width) based on vibration interference and/or a reflective vibration wave. Therefore, the gain value of each of the plurality of (or first to eighth) sub amplification circuits 410S1 to 410S8 can be set to reduce or minimize a region-based vibration (or displacement) deviation in a vibration region of the passive vibration member 100. For example, in the vibration region of the passive vibration member 100, when a vibration of a vibration region having a large vibration width (or displacement width) increases and a vibration of a vibration region having a small vibration width (or displacement width) decreases, a vibration width (or a displacement width) of the passive vibration member 100 can further increase or can be maximized, and thus, a sound characteristic and a sound pressure level characteristic of the low-pitched sound band generated by the passive vibration member 100 can be further enhanced. Accordingly, the gain value of each of the plurality of (or first to eighth) sub amplification circuits 410S1 to 410S8 can be set to be equal to or different from a gain value of the main amplification circuit 410M, based on the vibration width (or displacement width) of the vibration region of the passive vibration member 100.

As described above, the vibration driving circuit 400 according to the first embodiment of the present disclosure can vary (or change) the sub-driving signals SDS1 to SDS8, which are to be applied to at least one or more of the plurality of sub-active vibration members 200S1 to 200S8, to be different from the main driving signal MDS based on the sound source signal SS, thereby further enhancing a sound characteristic and a sound pressure level characteristic of the low-pitched sound band generated by the passive vibration member 100. For example, the vibration driving circuit 400 according to the first embodiment of the present disclosure can vary (or change) at least one or more of a phase and an amplitude of a sub-driving signal SDS which is to be applied to at least one or more of the plurality of sub-active vibration members 200S1 to 200S8, based on at least one or more of a phase and an amplitude of the main driving signal MDS which is to be applied to the main active vibration member 200M. Accordingly, a region-based vibration (or displacement) deviation in the vibration region of the passive vibration member 100 can be reduced or minimized, and thus, a sound characteristic and a sound pressure level characteristic of the low-pitched sound band generated by the passive vibration member 100 can be further enhanced.

Figure 6:
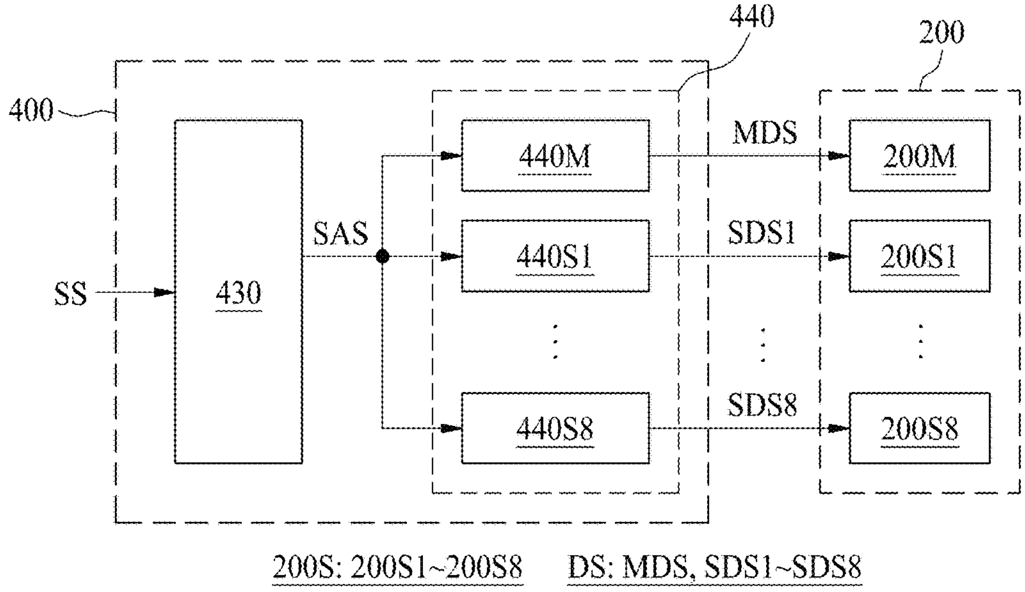
FIG. 6 is a block diagram illustrating a vibration driving circuit according to another embodiment of the present disclosure.

FIG. 6 is a block diagram illustrating a vibration driving circuit according to a second embodiment of the present disclosure.

With reference to FIG. 6, a vibration driving circuit 400 according to a second embodiment of the present disclosure can generate a driving signal DS for vibrating (or displacing) each of a plurality of active vibration members 200M and 200S based on one sound source signal SS input from the host device (or the host driving circuit) and can supply the generated driving signal DS to corresponding active vibration members 200M and 200S.

The vibration driving circuit 400 according to the second embodiment of the present disclosure can include an amplification circuit 430 and a signal conversion part 440.

The amplification circuit 430 can simultaneously receive the same sound source signal and can amplify the sound source signal based on a predetermined gain value to generate a sound source amplification signal SAS. For example, the amplification circuit 430 can include a preamplifier and a main amplifier. A sound source signal (or a sound signal) SS input to the vibration driving circuit 400 can be primarily amplified by the preamplifier, and a signal primarily amplified by the preamplifier can be additionally amplified by the main amplifier and can be output as the sound source amplification signal SAS.

The signal conversion part 440 can convert the sound source amplification signal SAS supplied from the amplification circuit 430 into a driving signal DS and can supply the driving signal DS to corresponding active vibration members 200M and 200S. For example, the signal conversion part 440 can convert the sound source amplification signal SAS, supplied from the amplification circuit 430, into a driving signal DS based on a predetermined signal conversion coefficient (or a gain value) and can supply the driving signal DS to corresponding active vibration members 200M and 200S.

The signal conversion part 440 can include a plurality of signal conversion circuits 440M and 440S1 to 440S8 respectively corresponding to the plurality of active vibration members 200M and 200S. For example, the signal conversion part 440 can include a main conversion circuit 440M and a plurality of sub conversion circuits 440S1 to 440S8. The signal conversion part 440 can include the main conversion circuit 440M and first to eighth sub conversion circuits 440S1 to 440S8.

The main conversion circuit 440M, as illustrated in FIG. 6, can convert the sound source amplification signal SAS, supplied from the amplification circuit 430, into one of a plurality of positive driving signals PDS1 to PDS5 and a plurality of negative driving signals NDS1 to NDS5 based on the predetermined signal conversion coefficient (or gain value) to generate a main driving signal MDS and can supply the generated main driving signal MDS to the main active vibration member 200M. For example, the main conversion circuit 440M can convert the sound source amplification signal SAS into one of first to fifth positive driving signals PDS1 to PDS5 and first to fifth negative driving signals NDS1 to NDS5 based on the predetermined signal conversion coefficient (or gain value) to generate the main driving signal MDS. The first to fifth positive driving signals PDS1 to PDS5 and the first to fifth negative driving signals NDS1 to NDS5 can be as described above with reference to FIGS. 4 and 5, and thus, their repetitive descriptions can be omitted.

According to an embodiment of the present disclosure, the main conversion circuit 440M, as illustrated in FIG. 6, can be implemented to convert the sound source amplification signal SAS into one of the first positive driving signal PDS1, the first negative driving signal NDS1, the second positive driving signal PDS2, and the second negative driving signal NDS2 based on the predetermined signal conversion coefficient (or gain value) to output the main driving signal MDS, but embodiments of the present disclosure are not limited thereto.

According to an embodiment of the present disclosure, each of the plurality of (or first to eighth) sub conversion circuits 440S1 to 440S8, as illustrated in FIG. 6, can convert the sound source amplification signal SAS supplied from the amplification circuit 430 into one of the plurality of positive driving signals PDS1 to PDS5 and the plurality of negative driving signals NDS1 to NDS5 based on the predetermined signal conversion coefficient (or gain value) to generate corresponding sub-driving signals SDS1 to SDS8 and can supply the generated sub-driving signals SDS1 to SDS8 to corresponding sub-active vibration members 200S1 to 200S8. For example, each of the plurality of (or first to eighth) sub conversion circuits 440S1 to 440S8 can convert the sound source amplification signal SAS into one of the first to fifth positive driving signals PDS1 to PDS5 and the first to fifth negative driving signals NDS1 to NDS5 based on the predetermined signal conversion coefficient (or gain value) to generate the sub-driving signals SDS1 to SDS8.

As described above, like the vibration driving circuit 400 described above with reference to FIG. 4, the vibration driving circuit 400 according to the second embodiment of the present disclosure can further enhance a sound characteristic and a sound pressure level characteristic of the low-pitched sound band generated by the passive vibration member 100. In the vibration driving circuit 400 according to the second embodiment of the present disclosure, the number of used amplification circuits can be reduced compared to the vibration driving circuit 400 described above with reference to FIG. 4, which can conserve power and resources.

Figure 7:
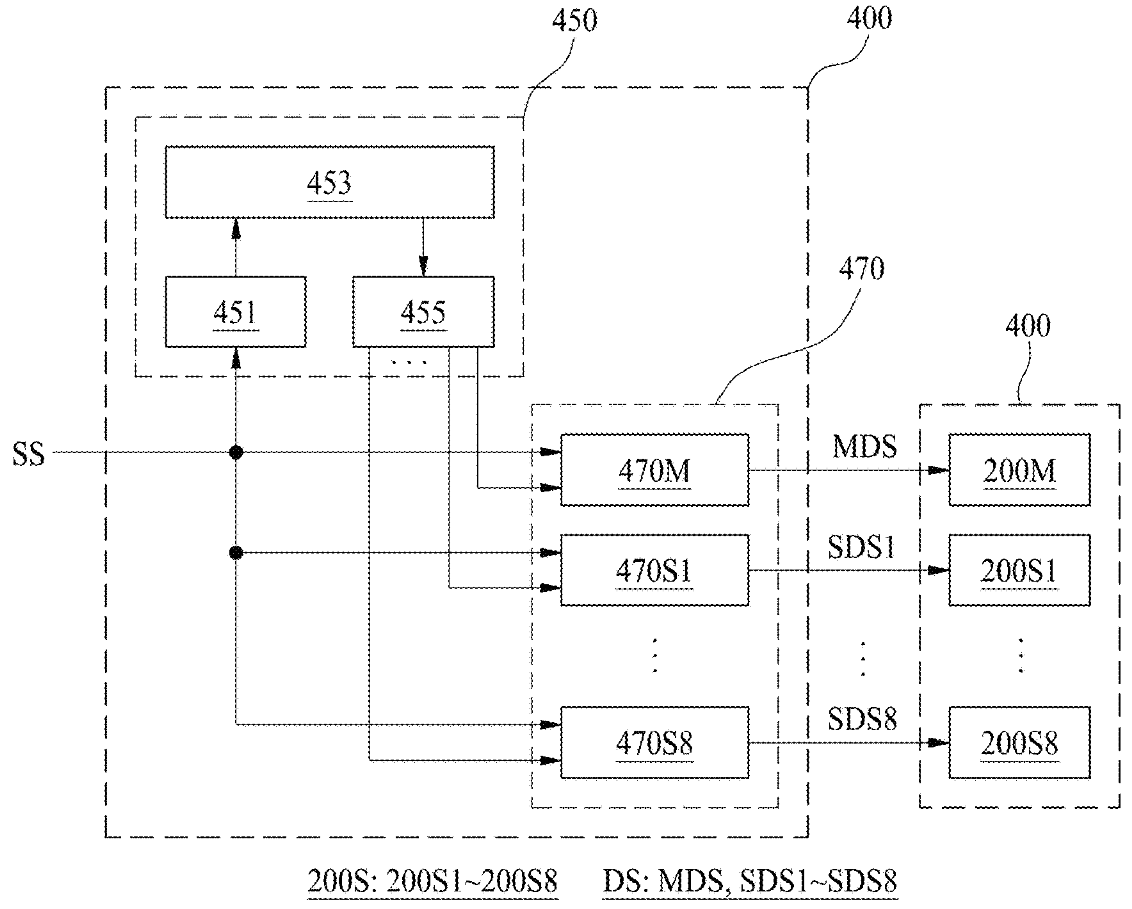
FIG. 7 is a block diagram illustrating a vibration driving circuit according to another embodiment of the present disclosure.

FIG. 7 is a block diagram illustrating a vibration driving circuit according to a third embodiment of the present disclosure. FIG. 7 illustrates an embodiment where a signal processor is added to the vibration driving circuit illustrated in FIG. 4.

With reference to FIG. 7, a vibration driving circuit 400 according to the third embodiment of the present disclosure can generate a driving signal DS for vibrating (or displacing) each of a plurality of active vibration members 200M and 200S based on one sound source signal SS input from a host device (or a host driving circuit) and can supply the generated driving signal DS to corresponding active vibration members 200M and 200S.

The vibration driving circuit 400 according to the third embodiment of the present disclosure can include a signal processor 450 and an amplification circuit part 470.

The signal processor 450 can receive one sound source signal SS input from the host device (or the host driving circuit) in real time. The one sound source signal SS can be simultaneously supplied to each of the signal processor 450 and the amplification circuit part 470 in common.

The signal processor 450 can generate a plurality of gain values based on one sound source signal SS input thereto. For example, the signal processor 450 can analyze a frequency characteristic or a-pitched sound band characteristic of the sound source signal SS input thereto to generate the plurality of gain values.

The signal processor 450 according to an embodiment of the present disclosure can include a frequency analysis circuit 451, a weight generating circuit 453, and a gain value generator 455.

The frequency analysis circuit 451 can analyze the frequency characteristic or-pitched sound band characteristic of the sound source signal SS input thereto to generate frequency-based intensity information. For example, the frequency analysis circuit 451 can analyze the frequency characteristic or-pitched sound band characteristic of the input sound source signal SS by predetermined time units to generate frequency-based intensity information. For example, the frequency analysis circuit 451 can analyze the frequency characteristic or-pitched sound band characteristic of the input sound source signal SS in real time to generate the frequency-based intensity information.

The weight generating circuit 453 can classify frequencies by frequency bands (or-pitched sound bands) based on the frequency-based intensity information supplied from the frequency analysis circuit 451 to generate a frequency band-based weight. For example, the weight generating circuit 453 can generate the frequency band-based weight for identically controlling a vibration amplitude (or a displacement width) of each of the plurality of active vibration members 200M and 200S or for differently controlling vibration amplitudes (or displacement widths) of one or more of the plurality of active vibration members 200M and 200S to correspond to frequency band-based intensity information. For example, the weight generating circuit 453 can classify a main frequency and a sub-frequency by frequency bands (or by-pitched sound bands), generate a frequency band-based main weight based on intensity information about a frequency band-based main frequency, and generate a plurality of frequency band-based sub-weights based on a main gain value and intensity information about a frequency band-based sub-frequency, but embodiments of the present disclosure are not limited thereto.

The gain value generator 455 can generate a plurality of gain values based on the frequency band-based weight supplied from the weight generating circuit 453. For example, the gain value generator 455 can generate the plurality of gain values for varying (or changing) one or more of a phase and an amplitude of the driving signal DS which is to be supplied to each of the plurality of active vibration members 200M and 200S based on the frequency band-based weight supplied from the weight generating circuit 453. For example, the gain value generator 455 can generate the main gain value based on the frequency band-based main weight supplied from the weight generating circuit 453 and can generate a plurality of sub gain values based on the plurality of frequency band-based sub weights supplied from the weight generating circuit 453.

The amplification circuit part 470 can be configured to amplify the sound source signal SS input thereto based on a plurality of gain values supplied from the signal processor 450 so that the amplified sound source signal SS is supplied to each of the plurality of active vibration members 200M and 200S. The amplification circuit part 470 can include a plurality of amplification circuits 470M and 470S1 to 470S8 respectively corresponding to the plurality of active vibration members 200M and 200S. Each of the plurality of amplification circuits 470M and 470S1 to 470S8 can amplify the sound source signal SS based on a gain value supplied from the signal processor 450 to generate the driving signal DS.

The amplification circuit part 470 can include a main amplification circuit 470M and a plurality of sub amplification circuits 470S1 to 470S8. The amplification circuit part 470 can include a main amplification circuit 470M and first to eighth sub amplification circuits 470S1 to 470S8.

The main amplification circuit 470M can amplify the sound source signal SS based on the main gain value supplied from the signal processor 450 to generate a main driving signal MDS and can supply the generated main driving signal MDS to the main active vibration member 200M. Except for that the main amplification circuit 470M amplifies the sound source signal SS according to the main gain value supplied from the signal processor 450, the main amplification circuit 470M can be substantially the same as the main amplification circuit 410M illustrated in FIG. 4.

According to an embodiment of the present disclosure, the main amplification circuit 470M, as illustrated in FIG. 7, can amplify a sound source signal SS to one of a plurality of positive driving signals PDS1 to PDS5 and a plurality of negative driving signals NDS1 to NDS5 based on the main gain value supplied from the signal processor 450 to generate a main driving signal MDS and can supply the generated main driving signal MDS to the main active vibration member 200M. For example, the main amplification circuit 470M can amplify the sound source signal to one of first to fifth positive driving signals PDS1 to PDS5 and first to fifth negative driving signals NDS1 to NDS5 based on the main gain value to generate the main driving signal MDS. The first to fifth positive driving signals PDS1 to PDS5 and the first to fifth negative driving signals NDS1 to NDS5 can be as described above with reference to FIGS. 4 and 5, and thus, their repetitive descriptions can be omitted.

Each of the plurality of (or first to eighth) sub amplification circuits 470S1 to 470S8 can amplify the sound source signal SS based on a corresponding sub gain value of the plurality of sub gain values supplied from the signal processor 450 to generate a corresponding sub-driving signal of the plurality of (or first to eighth) sub-driving signals SDS1 to SDS8 and can supply the generated sub-driving signals SDS1 to SDS8 to corresponding sub-active vibration members 200S1 to 200S8. Except for that each of the plurality of (or first to eighth) sub amplification circuits 470S1 to 470S8 amplifies the sound source signal SS according to the sub gain value supplied from the signal processor 450, the each of the plurality of (or first to eighth) sub amplification circuits 470S1 to 470S8 can be substantially the same as the each of the plurality of (or first to eighth) sub amplification circuits 410S1 to 410S8 illustrated in FIG. 4. For example, each of the main amplification circuit 470M and sub amplification circuits 410S1 to 410S8 can receive two inputs, such as an input of the sound source signal SS and an individual gain value supplied from the signal processor 450. In other words, each amplification circuit can receive its own unique gain value calculated by the signal processor 450, which can provide a finer granularity of control.

According to an embodiment of the present disclosure, each of the plurality of (or first to eighth) sub amplification circuits 470S1 to 470S8, as illustrated in FIG. 7, can amplify the sound source signal SS to one of the plurality of positive driving signals PDS1 to PDS5 and the plurality of negative driving signals NDS1 to NDS5 based on the sub gain value supplied from the signal processor 450 to generate corresponding sub-driving signals SDS1 to SDS8 and can supply the generated sub-driving signals SDS1 to SDS8 to corresponding sub-active vibration members 200S1 to 200S8. For example, each of the plurality of (or first to eighth) sub amplification circuits 470S1 to 470S8 can amplify the sound source signal SS to one of the first to fifth positive driving signals PDS1 to PDS5 and the first to fifth negative driving signals NDS1 to NDS5 based on the sub gain value supplied from the signal processor 450 to generate the sub-driving signals SDS1 to SDS8.

As described above, like the vibration driving circuit 400 described above with reference to FIG. 4, the vibration driving circuit 400 according to the third embodiment of the present disclosure can further enhance a sound characteristic and a sound pressure level characteristic of the low-pitched sound band generated by the passive vibration member 100. The vibration driving circuit 400 according to the third embodiment of the present disclosure can analyze the sound source signal SS by certain time units or in real time to actively vibrate (or displace) each of the plurality of active vibration members 200M and 200S, and thus, can generate or output a sound which corresponds to or is optimized for the sound source signal SS, based on a vibration of the passive vibration member 100. In other words, the vibration driving circuit 400 can dynamically adjust the individual gain corresponding to each of the plurality of active vibration members 200M and 200S, in real-time, in order to provide more control and provide better quality sound.

Figure 8:
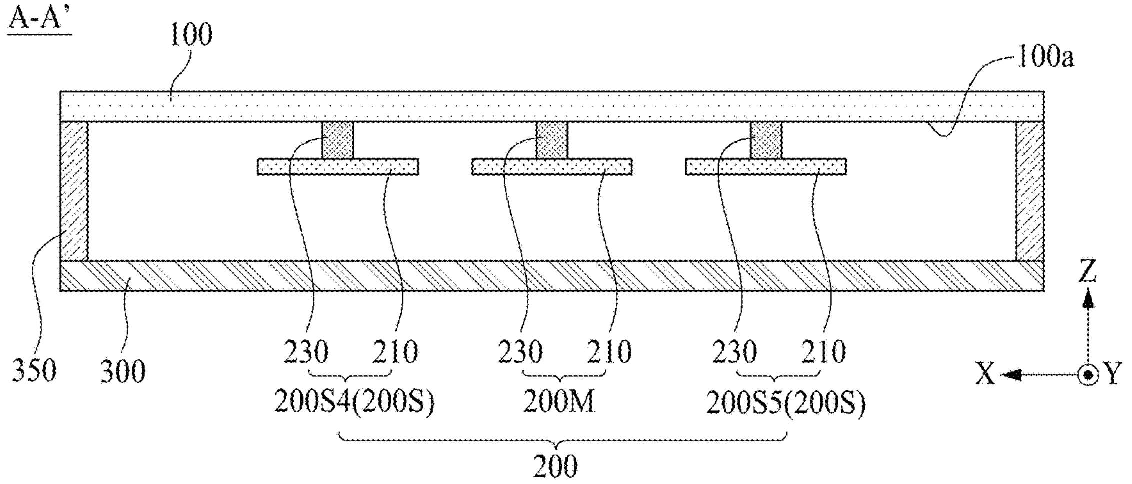
FIG. 8 is another cross-sectional view taken along line A-A' illustrated in FIG. 1 according to an embodiment of the present disclosure.
Figure 9:
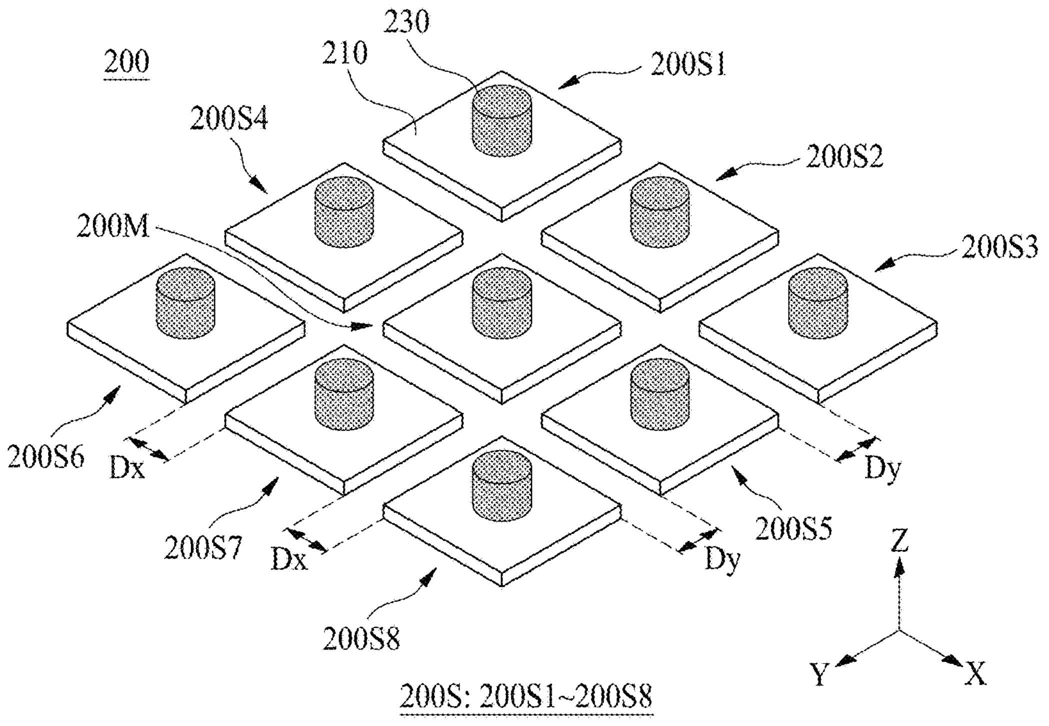
FIG. 9 illustrates a vibration apparatus illustrated in FIG. 8 according to an embodiment of the present disclosure.

FIG. 8 is another cross-sectional view taken along line A-A' illustrated in FIG. 1, and FIG. 9 illustrates a vibration apparatus illustrated in FIG. 8. FIGS. 8 and 9 illustrate an apparatus or a vibration apparatus according to another embodiment of the present disclosure. FIGS. 8 and 9 illustrate an embodiment implemented by modifying a connection member in the vibration apparatus of the apparatus described above with reference to the FIGS. 1 to 7. In the following description, therefore, the other elements except a connection member and relevant elements are referred to by like reference numerals, and their repetitive descriptions can be omitted.

With reference to FIGS. 8 and 9, in a vibration apparatus 200 of the apparatus according to another embodiment of the present disclosure, a connection member 230 can be disposed between a portion of a vibration device 210 and a passive vibration member 100. The connection member 230 can be connected between a portion of a vibration device 210 and a passive vibration member 100. For example, the connection member 230 can be connected to or attached on a portion of a vibration device 210 and a passive vibration member 100.

The connection member 220 according to an embodiment of the present disclosure can include an elastic material which has adhesive properties and is capable of compression and decompression. For example, the connection member 220 can include an elastic material having elasticity or flexibility. For example, the connection member 220 can be configured as an adhesive material which is low in elastic modulus (or Young's modulus). The connection member 230 according to an embodiment of the present disclosure can be the same as the connection member 220 illustrated in FIGS. 2 and 3, and thus, the repetitive description thereof is omitted. For example, the connection member 230 can be referred to as an adhesive member, an elastic adhesive member, or a damping member, but embodiments of the present disclosure are not limited thereto.

A first surface (or a front surface or an upper surface) of the connection member 220 according to an embodiment of the present disclosure can be connected to or attached on the passive vibration member 100, and a second surface (or a rear surface or a lower surface), which is opposite to the first surface, of the connection member 220 can be connected to or attached on the vibration device 210. For example, a portion of the first surface (or the front surface or the upper surface) of the connection member 220 can be connected to or attached on a rear surface 100*a* of the passive vibration member 100 and a portion of the second surface (or the rear surface or the lower surface), which is opposite to the first surface, of the connection member 220 can be connected to or attached on the vibration device 210. For example, the vibration device 210 can be connected to or attached on a rear surface 100*a* of the passive vibration member 100 by a partial attachment scheme using the connection member 230.

The connection member 230 according to an embodiment of the present disclosure can have a size which is smaller than that of the vibration device 210. The connection member 230 can be connected to or attached on a center portion (or a middle portion), except an edge portion (or a periphery portion), of the vibration device 210. Alternatively, the connection member 230 can be larger than the corresponding vibration device 210, according to an embodiment. Also, the connection member 230 can be hollow or solid. The center portion (or the middle portion) of the vibration device 210 can be a portion which is a center of a vibration, and thus, a vibration of the vibration device 210 can be efficiently transferred to the passive vibration member 100 through the connection member 230. The edge portion of the vibration device 210 can be in a raised state where the edge portion of the vibration device 210 is spaced apart from each of the connection member 230 and the passive vibration member 100 without being connected to the connection member 230 and/or the passive vibration member 100, and thus, in performing a flexural vibration (or a bending vibration) of the vibration device 210, a vibration of the edge portion of the vibration device 210 may not be prevented (or reduced) by the connection member 230 and/or the passive vibration member 100, thereby increasing a vibration width (or a displacement width) of the vibration device 210. In addition, the connection member 230 can include an elastic material, and thus, a vibration of the center portion of the vibration device 210 may not be prevented (or reduced) by the connection member 230 or a vibration width (or a displacement width) of the vibration device 210 can be further increased by damping of the connection member 230. Accordingly, a vibration width (or a displacement width) of the passive vibration member 100 based on a vibration of the vibration device 210 can increase, and thus, a sound characteristic and a sound pressure level characteristic of the low-pitched sound band generated based on a vibration of the passive vibration member 100 can be further enhanced.

As described above, like the apparatus or the vibration apparatus 200 illustrated in FIGS. 1 to 7, the apparatus or the vibration apparatus 200 according to another embodiment of the present disclosure can enhance a sound characteristic and a sound pressure level characteristic of the low-pitched sound band generated by the passive vibration member 100 and can include the connection member 230 connected between a portion of the vibration device 210 and the passive vibration member 100, and thus, a vibration of each of the plurality of active vibration members 200M and 200S can be efficiently transferred to the passive vibration member 100 through the connection member 230 and a vibration width (or a displacement width) of the passive vibration member 100 can increase, thereby further enhancing a sound characteristic and a sound pressure level characteristic of the low-pitched sound band generated based on a vibration of the passive vibration member 100. For example, each of the plurality of active vibration members 200M and 200S can be isolated from each other and individually connected to the passive vibration member 100 with a corresponding connection member 230, which can provide a finer granularity of control and enhance sound production.

Figure 10:
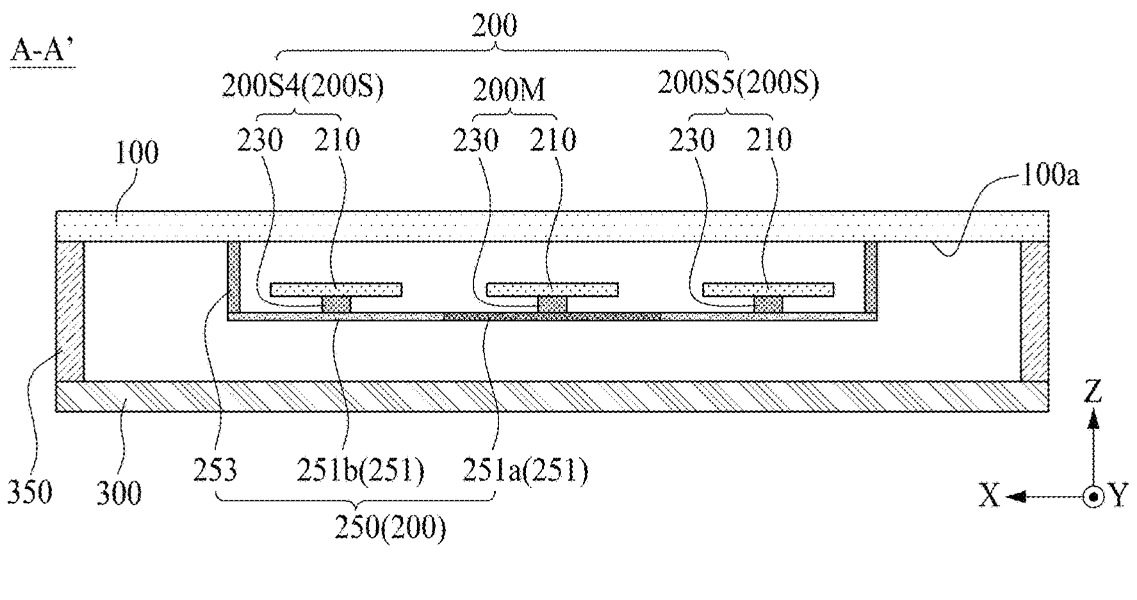
FIG. 10 is another cross-sectional view taken along line A-A' illustrated in FIG. 1 according to an embodiment of the present disclosure.
Figure 11:
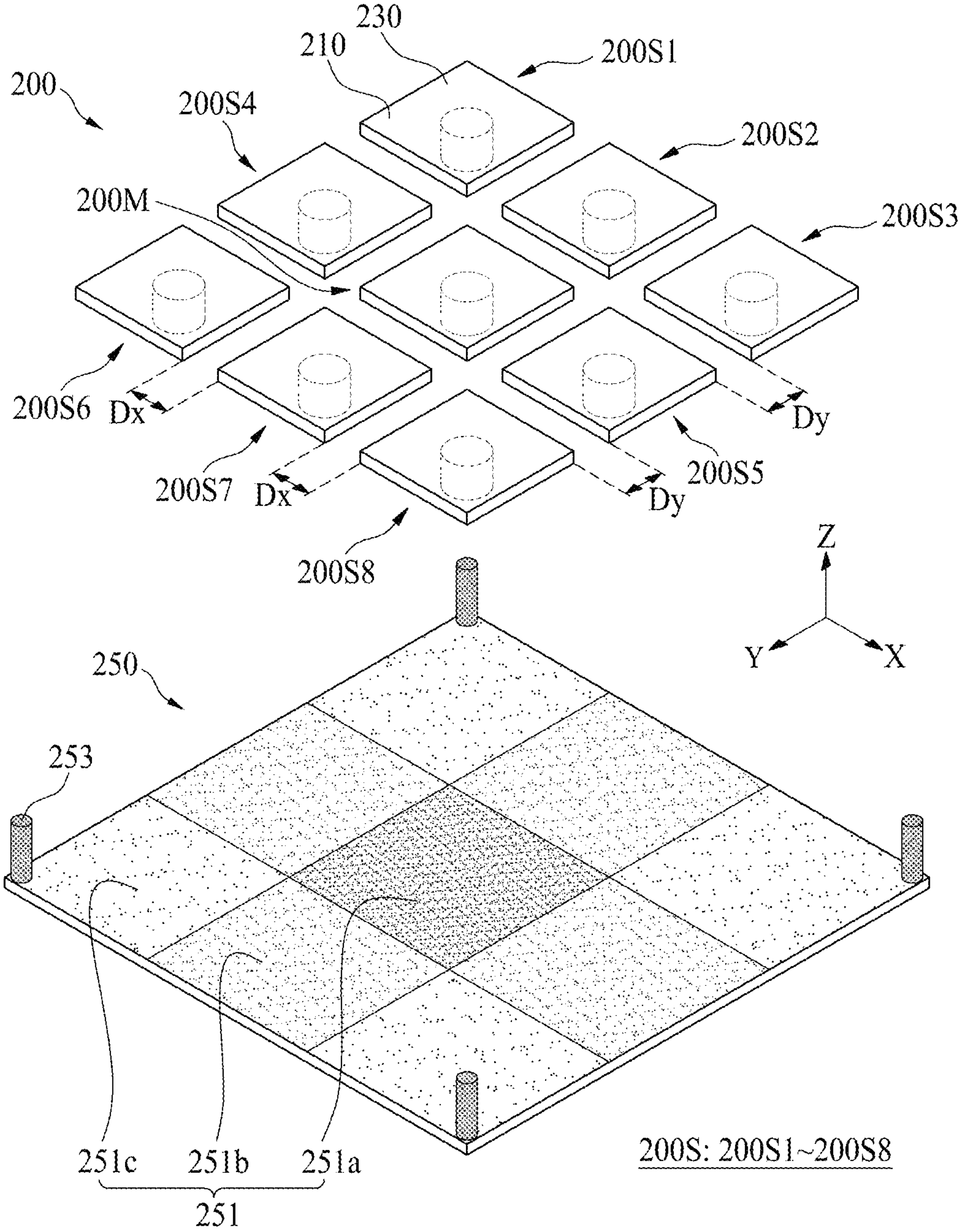
FIG. 11 illustrates a vibration apparatus illustrated in FIG. 10 according to an embodiment of the present disclosure.

FIG. 10 is another cross-sectional view taken along line A-A' illustrated in FIG. 1, and FIG. 11 illustrates a vibration apparatus illustrated in FIG. 10. FIGS. 10 and 11 illustrate an embodiment where a vibration transfer member is added to the vibration apparatus of the apparatus described above with reference to FIGS. 1 to 9. In the following description, therefore, the other elements except a vibration transfer member and relevant elements are referred to by like reference numerals, and their repetitive descriptions can be omitted.

With reference to FIGS. 10 and 11, a vibration apparatus 200 according to another embodiment of the present disclosure can include a plurality of active vibration members 200M and 200S and a vibration transfer member 250.

Each of the plurality of active vibration members 200M and 200S can include a vibration device 210 and a connection member 230.

The vibration device 210 of each of the plurality of active vibration members 200M and 200S can be substantially the same as the vibration device 210 described above with reference to FIGS. 1 to 9, and thus, the repetitive description thereof can be omitted.

The connection member 230 can be disposed between a portion of the vibration device 210 and the vibration transfer member 250. The connection member 230 can be connected between a portion of the vibration device 210 and the vibration transfer member 250. For example, the connection member 230 can be connected to or attached on the portion of the vibration device 210 and the vibration transfer member 250. Except for that the connection member 230 is connected to (or attached on) the vibration transfer member 250 instead of the passive vibration member 100, the connection member 230 can be substantially the same as the connection member 230 described above with reference to FIGS. 8 and 9, and thus, like reference numerals refer to like elements and the repetitive description thereof can be omitted.

In FIGS. 10 and 11, it is illustrated that the connection member 230 is connected to (or attached on) the vibration transfer member 250, but embodiments of the present disclosure are not limited thereto. The connection member 230 can be connected to or attached on the vibration transfer member 250 and all of a first surface of the vibration device 210 like the connection member 220 illustrated in FIG. 2, and thus, the repetitive description thereof can be omitted.

The vibration transfer member 250 can be configured to transfer a vibration of each of the plurality of active vibration members 200M and 200S to the passive vibration member 100. For example, the vibration transfer member 250 can vibrate (or displace) based on the vibration of each of the plurality of active vibration members 200M and 200S to vibrate the passive vibration member 100. For example, the passive vibration member 100 can vibrate based on a vibration of the vibration transfer member 250 to generate or output a sound or a vibration.

The vibration transfer member 250 according to an embodiment of the present disclosure can include a vibration transfer plate 251 and a plurality of elastic members 253.

The vibration transfer plate 251 can be disposed at a rear surface 100*a* of the passive vibration member 100 and a rear surface of each of the plurality of active vibration members 200M and 200S. The vibration transfer plate 251 can be disposed between the rear surface 100*a* of the passive vibration member 100 and a supporting member 300 and can be connected to each of the plurality of active vibration members 200M and 200S in common. The vibration transfer plate 251 can vibrate based on a vibration of each of the plurality of active vibration members 200M and 200S.

The vibration transfer plate 251 according to an embodiment of the present disclosure can include one or more materials of wood, rubber, plastic, flexible glass, fiber, cloth, paper, metal, carbon, a mirror, and leather, but embodiments of the present disclosure are not limited thereto.

Each of the plurality of elastic members 253 can be configured to transfer a vibration of the vibration transfer plate 251 to the passive vibration member 100. For example, each of the plurality of elastic members 253 can be an elastic member, an elastic connection member, a second damping member, or a second connection member.

Each of the plurality of elastic members 253 can be disposed between the passive vibration member 100 and the vibration transfer plate 251. Each of the plurality of elastic members 253 can be connected between the passive vibration member 100 and the vibration transfer plate 251. For example, each of the plurality of elastic members 253 can be disposed between a rear periphery portion of the passive vibration member 100 and a front periphery portion of the vibration transfer plate 251. For example, each of the plurality of elastic members 253 can be connected between a rear periphery portion (or a rear edge portion) of the passive vibration member 100 and a front periphery portion (or a front edge portion) of the vibration transfer plate 251. For example, each of the plurality of elastic members 253 can be connected between the rear periphery portion of the passive vibration member 100 and a corner portion of the vibration transfer plate 251.

Each of the plurality of elastic members 253 can include an elastic material having elasticity or flexibility. For example, each of the plurality of elastic members 253 can be configured as an adhesive material which is low in elastic modulus (or Young's modulus). For example, each of the plurality of elastic members 253 can include a double-sided tape, a single-sided tape, adhesive film, or a double-sided adhesive foam pad, which has an adhesive layer, but embodiments of the present disclosure are not limited thereto, and can include an elastic pad such as a rubber pad or a silicone pad, or the like, which has adhesive layer and is capable of compression and decompression. For example, the adhesive layer of each of the plurality of elastic members 253 can include an acrylic-based adhesive material having a characteristic which is relatively good in adhesive force and high in hardness, but embodiments of the present disclosure are not limited thereto.

Each of the plurality of elastic members 253 can transfer, to the passive vibration member 100, a vibration of the vibration transfer plate 251 vibrating based on a vibration of each of the plurality of active vibration members 200M and 200S to vibrate the passive vibration member 100. The vibration of the vibration transfer plate 251 vibrating based on the vibration of each of the plurality of active vibration members 200M and 200S may not be prevented (or reduced) by an elastic force of each of the plurality of elastic members 253, and moreover, a vibration of the passive vibration member 100 may not be prevented (or reduced) by the elastic force of each of the plurality of elastic members 253. Accordingly, the vibration of the vibration transfer plate 251 vibrating based on the vibration of each of the plurality of active vibration members 200M and 200S can be efficiently transferred to the passive vibration member 100.

The vibration transfer plate 251 according to another embodiment of the present disclosure can include a plurality of regions (or division regions) 251*a*, 251*b*, and 251*c* having different hardness or varying degrees of stiffness. For example, the vibration transfer plate 251 can have a hardness which is greatest in a center region (or a center portion) thereof and can have hardness which is least in a region thereof connected to the connection member 230. For example, the vibration transfer plate 251 can include a first region (or a first division region) 251*a*, at least one or more second regions (or second division regions) 251*b*, and at least one or more third regions (or third division regions) 251*c* (e.g., see FIG. 11).

The first region 251*a* can be disposed at a center region (or a center portion) of the vibration transfer plate 251. For example, the first region 251*a* can overlap a main active vibration member 200M of the plurality of active vibration members 200M and 200S. For example, the first region 251*a* can have first hardness.

The at least one or more second regions 251*b* can be disposed at a periphery of the first region 251*a* and can be connected to at least a portion of the first region 251*a*. For example, the vibration transfer plate 251 can include four second regions 251*b* which are disposed at or connected to upper, lower, left, and right sides of the first region 251*a*, but embodiments of the present disclosure are not limited thereto. Each of the at least one or more second regions 251*b* or four second regions 251*b* can have second hardness which is less than the first hardness of the first region 251*a*.

The at least one or more third regions 251*c* can be disposed at the other region, except the first region 251*a* and the one or more second regions 251*b*, of the regions of the vibration transfer plate 251 (e.g., see FIG. 11). For example, the at least one or more third regions 251*c* can be disposed at a periphery of the first region 251*a*, connected to at least a portion of the first region 251*a*, and connected to at least a portion of the second region 251*b*. For example, the vibration transfer plate 251 can include four third regions 251*c* which are arranged in a diagonal direction of the first region 251*a* or disposed between the four second regions 251*b*, but embodiments of the present disclosure are not limited thereto. Each of the at least one or more third regions 251*c* or the four third regions 251*c* can have third hardness which is smaller than each of the first hardness of the first region 251*a* and the second hardness of the second region 251*b*. For example, each of the at least one or more third regions 251*c* or the four third regions 251*c* can be disposed at a corner portion of the vibration transfer plate 251. The vibration transfer plate 251 can form a type of trampoline structure or have a shape of an upside down table, which has varying degrees of stiffness in different areas (e.g., the center can be stiffer than the outer portions, which can be more flexible).

Each of the plurality of elastic members 253 can be connected to a region, having the least hardness or lowest stiffness, of a plurality of regions 251*a* to 251*c* of the vibration transfer plate 251. For example, each of the plurality of elastic members 253 can be connected to a corresponding third region of the four third regions 251*c* of the vibration transfer plate 251.

The at least one or more second regions 251*b* and the at least one or more third regions 251*c* can overlap a plurality of sub-active vibration members 200S of the plurality of active vibration members 200M and 200S.

In the vibration transfer plate 251 according to another embodiment of the present disclosure, the at least one or more third regions 251*c* can include one or more among wood, rubber, plastic, flexible glass, fiber, cloth, paper, metal, carbon, and leather, but embodiments of the present disclosure are not limited thereto.

The at least one or more second regions 251*b* can include one or more materials selected from among wood, rubber, plastic, flexible glass, fiber, cloth, paper, metal, carbon, and leather to have the second hardness which is greater than the third hardness of the third region 251*c*, or can include a stack structure of the one or more selected materials, but embodiments of the present disclosure are not limited thereto. For example, the at least one or more second regions 251*b* can include a stack structure including the same material as that of the third region 251*c*.

The at least one or more first regions 251*a* can include one or more materials selected from among wood, rubber, plastic, flexible glass, fiber, cloth, paper, metal, carbon, and leather to have the first hardness which is greater than the second hardness of the second region 251*b*, or can include a stack structure of the one or more selected materials, but embodiments of the present disclosure are not limited thereto.

The vibration transfer plate 251 according to an embodiment of the present disclosure can include a first region 251*a* including a metal material, four second regions 251*b* including a plastic material, and four third regions 251*c* including a paper material, but embodiments of the present disclosure are not limited thereto.

In the vibration transfer plate 251 according to another embodiment of the present disclosure, the first region 251*a* overlapping the main active vibration member 200M can have relatively large hardness and the third region 251*c* connected to each of the plurality of elastic members 253 can have relatively small hardness, and thus, a vibration width (or a displacement width) of the third region 251*c* (or a corner portion) based on a vibration of each of the plurality of active vibration members 200M and 200S can increase, thereby further increasing a vibration width (or a displacement width) of the passive vibration member 100. For example, the different hardness regions of the vibration transfer plate 251 can allow the vibration transfer plate 251 to vibrate and move similar to a speaker cone, but with a much more compact design.

In the apparatus according to another embodiment of the present disclosure, the vibration driving circuit 400 illustrated in FIGS. 4 to 7 can be configured to supply the same driving signal DS to each of the plurality of active vibration members 200M and 200S, but embodiments of the present disclosure are not limited thereto.

As described above, the apparatus according to another embodiment of the present disclosure can transfer a vibration of each of the plurality of active vibration members 200M and 200S to the passive vibration member 100 through the vibration transfer member 450, and thus, a sound characteristic and a sound pressure level characteristic of the low-pitched sound band generated based on a vibration of the passive vibration member 100 can be further enhanced.

Figure 12A:
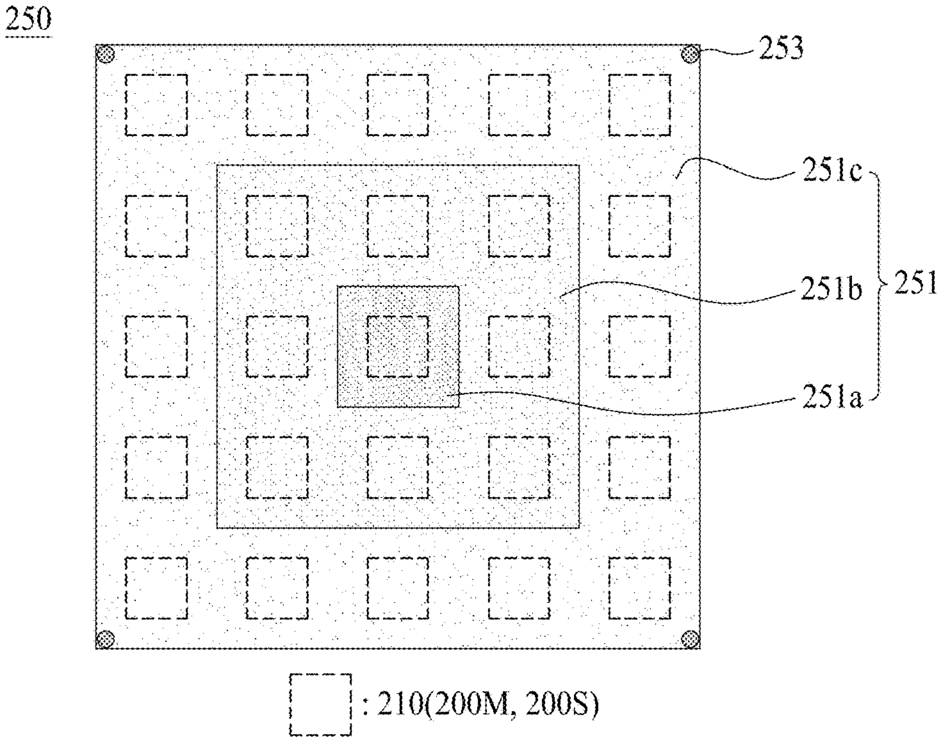
FIG. 12A illustrates a modification embodiment of the vibration transfer member illustrated in FIGS. 10 and 11 according to an embodiment of the present disclosure.
Figure 12B:
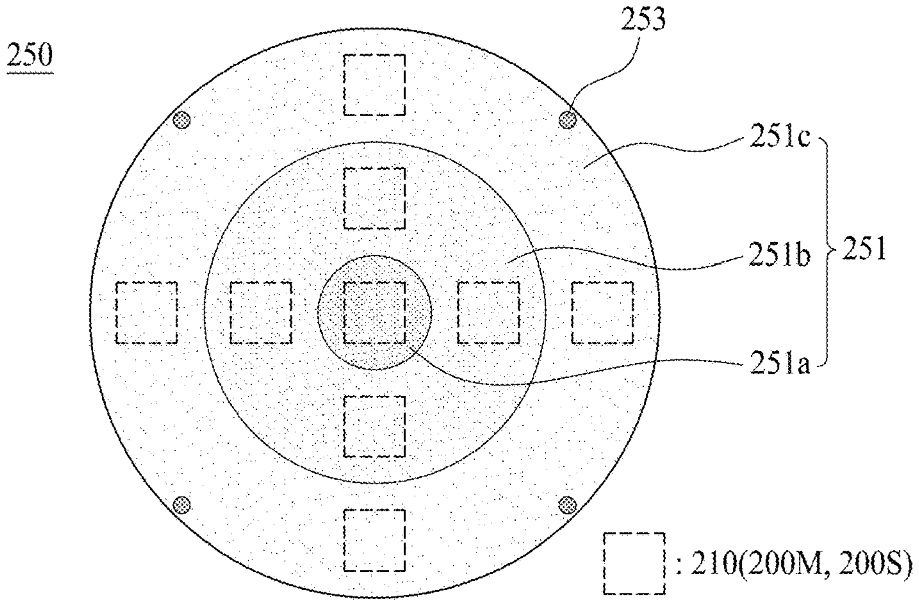
FIG. 12B illustrates another modification embodiment of the vibration transfer member illustrated in FIGS. 10 and 11 according to an embodiment of the present disclosure.

FIG. 12A illustrates a modification embodiment of the vibration transfer member illustrated in FIGS. 10 and 11, and FIG. 12B illustrates another modification embodiment of the vibration transfer member illustrated in FIGS. 10 and 11.

With reference to FIGS. 10, 12A, and 12B, a vibration transfer plate 251 according to a modification embodiment of the present disclosure can include a plurality of regions 251*a* to 251*c* implemented in a radial form. The vibration transfer plate 251 can include first to third regions 251*a* to 251*c* implemented in a radial form. For example, regions 251*a*, 251*b* and 251*c* can be arranged as nested rectangular shapes or as concentric rings.

The first region 251*a* can be disposed at a center region (or a center portion) of the vibration transfer plate 251. The first region 251*a* can have the first hardness. For example, the first region 251*a* can have a tetragonal shape, a triangular shape, or a circular shape, but embodiments of the present disclosure are not limited thereto. For example, the first region 251*a* can have an oval shape or a non-symmetrical shape. The first region 251*a* can vibrate based on a vibration of the main active vibration member 200M of the plurality of active vibration members 200M and 200S.

The second region 251*b* can be connected to or coupled to the first region 251*a* to surround the first region 251*a*. The second region 251*b* can have second hardness which is less than the first hardness. For example, the second region 251*b* can have a tetragonal shape or a circular shape, but embodiments of the present disclosure are not limited thereto. For example, the second region 251*b* can have an oval shape. Also, the second region 251*b* can have a different shape than the first region 251*a* (e.g., a square region inside a circle region, etc.). The second region 251*b* can vibrate based on vibrations of the one or more sub-active vibration members 200S of the plurality of active vibration members 200M and 200S. For example, the second region 251*b* can vibrate based on vibrations of a two-multiple or four-multiple number of sub-active vibration members 200S.

The third region 251*c* can be connected to or coupled to the second region 251*b* to surround the second region 251*b*. The third region 251*c* can have the third hardness which is smaller than each of the first hardness and the second hardness. For example, the third region 251*c* can have a tetragonal shape or a circular shape, but embodiments of the present disclosure are not limited thereto. For example, the third region 251*c* can have an oval shape. For example, the third region 251*c* can vibrate based on vibrations of a two-multiple or four-multiple number of sub-active vibration members 200S. Also, the third region 251*c* can have a different shape than the first region 251*a* and the second region 251*b* (e.g., a square region inside a circle region, inside an oval region, etc.).

The third region 251*c* of the vibration transfer plate 251 can be connected to the passive vibration member 100 through each of the plurality of elastic members 253.

As described above, an apparatus or a vibration apparatus 200 including the vibration transfer plate 251 according to a modification embodiment of the present disclosure can transfer a vibration of each of the plurality of active vibration members 200M and 200S to the passive vibration member 100 through the vibration transfer member 450, and thus, a sound characteristic and a sound pressure level characteristic of the low-pitched sound band generated based on a vibration of the passive vibration member 100 can be further enhanced.

Figure 13A:
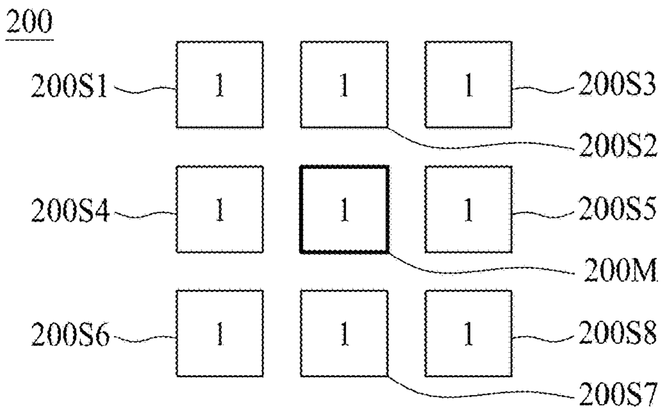
FIGS. 13A to 13L illustrate various embodiments of a driving signal of a vibration apparatus according to an embodiment of the present disclosure.
Figure 13B:
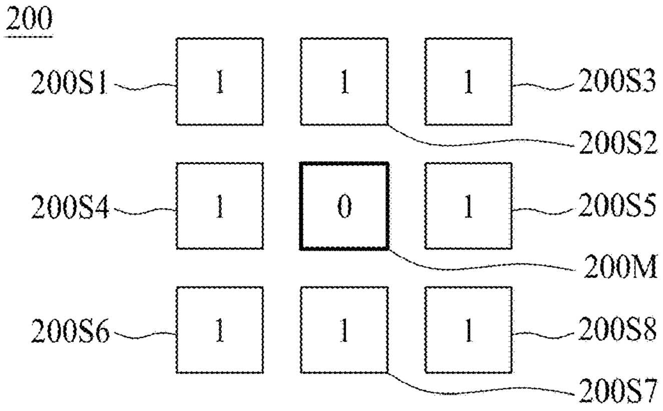
Figure 13C:
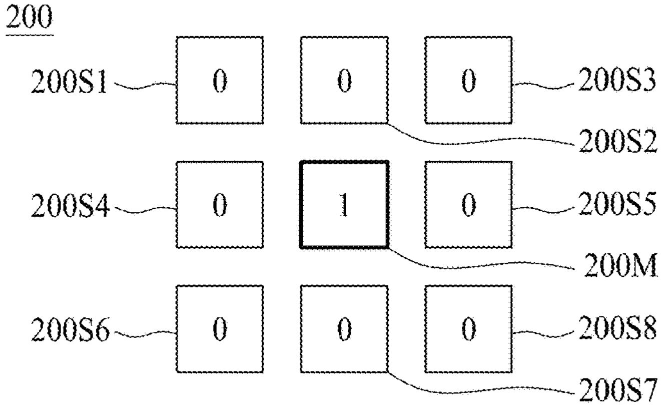
Figure 13D:
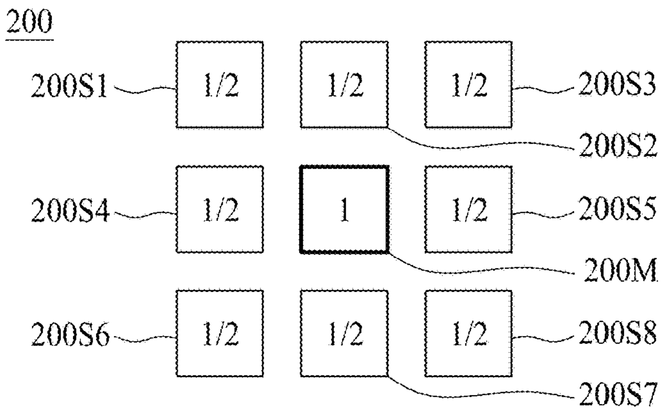
Figure 13E:
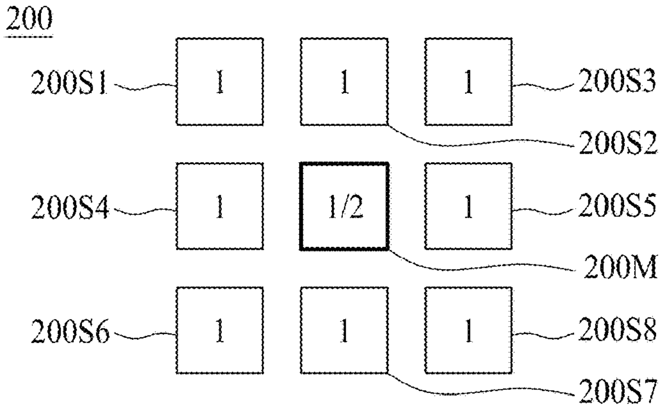
Figure 13F:
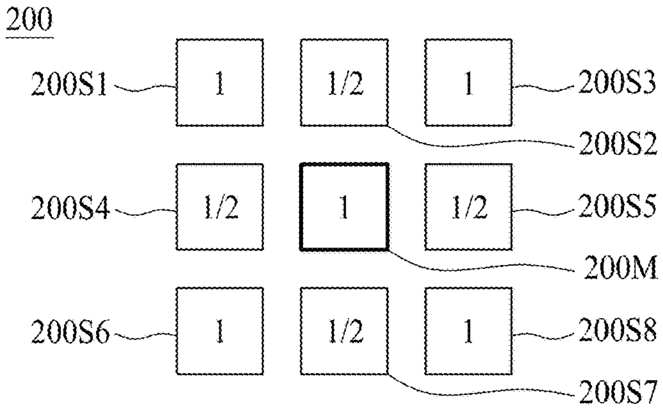
Figure 13G:
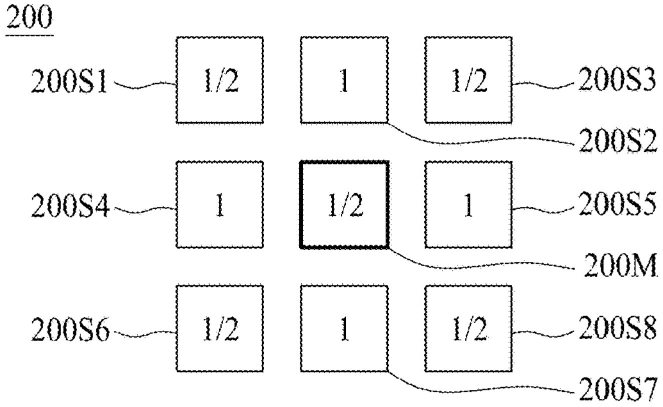
Figure 13H:
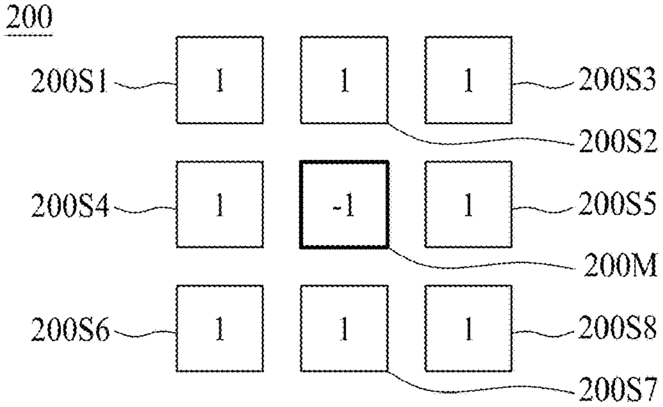
Figure 13I:
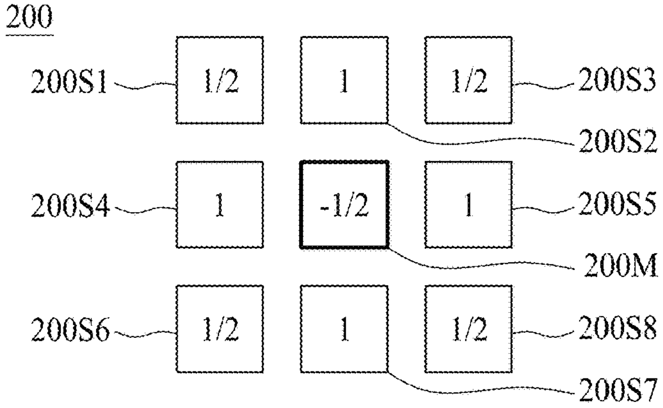
Figure 13J:
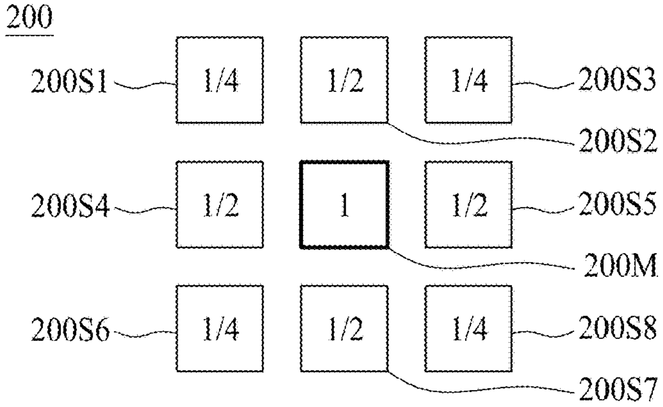
Figure 13K:
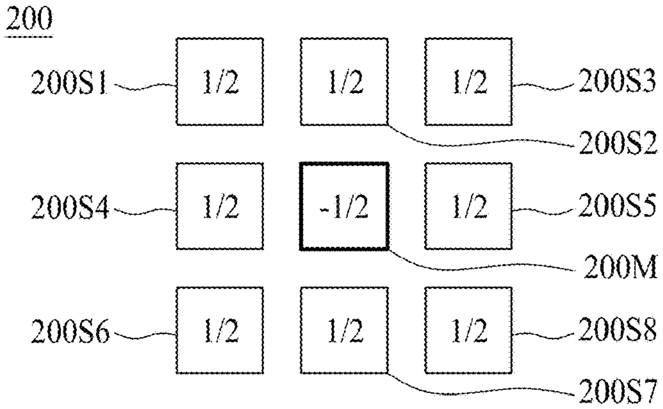
Figure 13L:
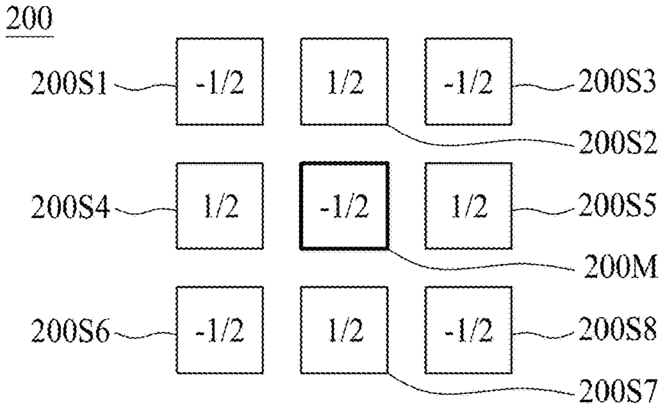
Figure 13M:
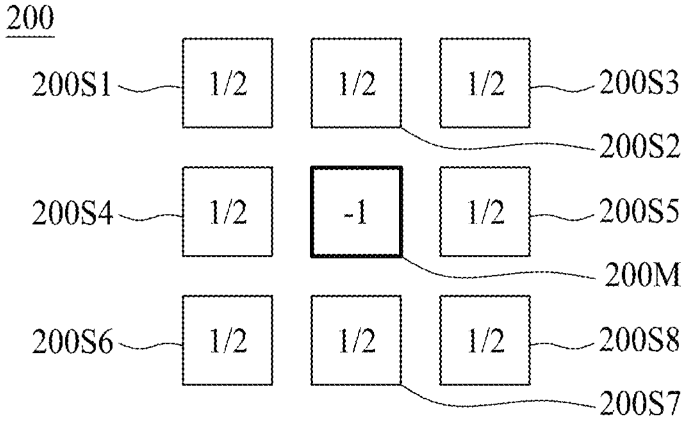
FIG. 13M illustrates a driving signal of a vibration apparatus according to an experimental example according to an embodiment of the present disclosure.

FIGS. 13A to 13L illustrate various embodiments of a driving signal of a vibration apparatus according to an embodiment of the present disclosure, and FIG. 13M illustrates a driving signal of a vibration apparatus according to an experimental example. In FIGS. 13A to 13M, a digit illustrated in a tetragon refers to an amplitude of a driving signal applied to an active vibration member.

With reference to FIGS. 5 and 13A, according to a first driving signal according to an embodiment of the present disclosure, each of a main active vibration member 200M and first to eighth sub-active vibration members 200S1 to 200S8 can vibrate (or displace) based on the first positive driving signal PDS1 having a first amplitude A1.

With reference to FIGS. 5 and 13B, according to a second driving signal according to an embodiment of the present disclosure, the main active vibration member 200M may not vibrate because a main driving signal is not supplied thereto, and each of the first to eighth sub-active vibration members 200S1 to 200S8 can vibrate based on the first positive driving signal PDS1 having the first amplitude A1.

With reference to FIGS. 5 and 13C, according to a third driving signal according to an embodiment of the present disclosure, the main active vibration member 200M can vibrate based on the first positive driving signal PDS1 having the first amplitude A1, and each of the first to eighth sub-active vibration members 200S1 to 200S8 may not vibrate because a corresponding sub-driving signal is not supplied thereto.

With reference to FIGS. 5 and 13D, according to a fourth driving signal according to an embodiment of the present disclosure, the main active vibration member 200M can vibrate based on the first positive driving signal PDS1 having the first amplitude A1, and each of the first to eighth sub-active vibration members 200S1 to 200S8 can vibrate based on the second positive driving signal PDS2 having the second amplitude A2 (e.g., the second amplitude A2 can be ½ of the first amplitude A1).

With reference to FIGS. 5 and 13E, according to a fifth driving signal according to an embodiment of the present disclosure, the main active vibration member 200M can vibrate based on the second positive driving signal PDS2 having the second amplitude A2, and each of the first to eighth sub-active vibration members 200S1 to 200S8 can vibrate based on the first positive driving signal PDS1 having the first amplitude A1.

With reference to FIGS. 5 and 13F, according to a sixth driving signal according to an embodiment of the present disclosure, the main active vibration member 200M can vibrate based on the first positive driving signal PDS1 having the first amplitude A1, some (or a first group) of the first to eighth sub-active vibration members 200S1 to 200S8 can vibrate based on the first positive driving signal PDS1 having the first amplitude A1, and the other (or a second group) of the first to eighth sub-active vibration members 200S1 to 200S8 can vibrate based on the second positive driving signal PDS2 having the second amplitude A2.

For example, each of the first, third, sixth, and eighth sub-active vibration members 200S1, 200S3, 200S6, and 200S8 can configure the first group and can vibrate based on the first positive driving signal PDS1 having the first amplitude A1. For example, each of the second, fourth, fifth, and seventh sub-active vibration members 200S2, 200S4, 200S5, and 200S7 can configure the second group and can vibrate based on the second positive driving signal PDS2 having the second amplitude A2.

According to an embodiment of the present disclosure, each of the first, third, sixth, and eighth sub-active vibration members 200S1, 200S3, 200S6, and 200S8 arranged in a "×"-shape among the first to eighth sub-active vibration members 200S1 to 200S8 can vibrate based on a sub-driving signal having the same phase and amplitude as a main driving signal applied to the main active vibration member 200M. In addition, each of the second, fourth, fifth, and seventh sub-active vibration members 200S2, 200S4, 200S5, and 200S7 arranged in a "+"-shape among the first to eighth sub-active vibration members 200S1 to 200S8 can vibrate based on a sub-driving signal having the same phase as a phase and half of an amplitude of the main driving signal applied to the main active vibration member 200M.

With reference to FIGS. 5 and 13G, according to a seventh driving signal according to an embodiment of the present disclosure, the main active vibration member 200M can vibrate based on the second positive driving signal PDS2 having the second amplitude A2, some (or a first group) of the first to eighth sub-active vibration members 200S1 to 200S8 can vibrate based on the second positive driving signal PDS2 having the second amplitude A2, and the other (or a second group) of the first to eighth sub-active vibration members 200S1 to 200S8 can vibrate based on the first positive driving signal PDS1 having the first amplitude A1.

For example, each of the first, third, sixth, and eighth sub-active vibration members 200S1, 200S3, 200S6, and 200S8 can configure the first group and can vibrate based on the second positive driving signal PDS2 having the second amplitude A2. For example, each of the second, fourth, fifth, and seventh sub-active vibration members 200S2, 200S4, 200S5, and 200S7 can configure the second group and can vibrate based on the first positive driving signal PDS1 having the first amplitude A1.

According to an embodiment of the present disclosure, each of the second, fourth, fifth, and seventh sub-active vibration members 200S2, 200S4, 200S5, and 200S7 arranged in a "+"-shape among the first to eighth sub-active vibration members 200S1 to 200S8 can vibrate based on a sub-driving signal having the same phase as a phase and twice amplitude of the main driving signal applied to the main active vibration member 200M. In addition, each of the first, third, sixth, and eighth sub-active vibration members 200S1, 200S3, 200S6, and 200S8 arranged in a "×"-shape among the first to eighth sub-active vibration members 200S1 to 200S8 can vibrate based on a sub-driving signal having the same phase and amplitude as the main driving signal applied to the main active vibration member 200M.

With reference to FIGS. 5 and 13H, according to the driving signal according to an eighth embodiment of the present disclosure, the main active vibration member 200M can vibrate based on the first negative driving signal NDS1 having the first amplitude A1, and each of the first to eighth sub-active vibration members 200S1 to 200S8 can vibrate based on the first positive driving signal PDS1 having the first amplitude A1.

With reference to FIGS. 5 and 13I, according to the driving signal according to a ninth embodiment of the present disclosure, the main active vibration member 200M can vibrate based on the second negative driving signal NDS2 having the second amplitude A2, some (or a first group) of the first to eighth sub-active vibration members 200S1 to 200S8 can vibrate based on the second positive driving signal PDS2 having the second amplitude A2, and the other (or a second group) of the first to eighth sub-active vibration members 200S1 to 200S8 can vibrate based on the first positive driving signal PDS1 having the first amplitude A1.

For example, each of the first, third, sixth, and eighth sub-active vibration members 200S1, 200S3, 200S6, and 200S8 can configure the first group and can vibrate based on the second positive driving signal PDS2 having the second amplitude A2. For example, each of the second, fourth, fifth, and seventh sub-active vibration members 200S2, 200S4, 200S5, and 200S7 can configure the second group and can vibrate based on the first positive driving signal PDS1 having the first amplitude A1.

With reference to FIGS. 5 and 13J, according to the driving signal according to a tenth embodiment of the present disclosure, the main active vibration member 200M can vibrate based on the first positive driving signal PDS1 having the first amplitude A1, some (or a first group) of the first to eighth sub-active vibration members 200S1 to 200S8 can vibrate based on the fifth positive driving signal PDS5 having the fifth amplitude A5, and the other (or a second group) of the first to eighth sub-active vibration members 200S1 to 200S8 can vibrate based on the second positive driving signal PDS2 having the second amplitude A2.

For example, each of the first, third, sixth, and eighth sub-active vibration members 200S1, 200S3, 200S6, and 200S8 can configure the first group and can vibrate based on the fifth positive driving signal PDS5 having the fifth amplitude A5. For example, each of the second, fourth, fifth, and seventh sub-active vibration members 200S2, 200S4, 200S5, and 200S7 can configure the second group and can vibrate based on the second positive driving signal PDS2 having the second amplitude A2.

With reference to FIGS. 5 and 13K, according to the driving signal according to an eleventh embodiment of the present disclosure, the main active vibration member 200M can vibrate based on the second negative driving signal NDS2 having the second amplitude A2, and each of the first to eighth sub-active vibration members 200S1 to 200S8 can vibrate based on the second positive driving signal PDS2 having the second amplitude A2.

With reference to FIGS. 5 and 13L, according to the driving signal according to a twelfth embodiment of the present disclosure, the main active vibration member 200M can vibrate based on the second negative driving signal NDS2 having the second amplitude A2, some of the first to eighth sub-active vibration members 200S1 to 200S8 can vibrate based on the second negative driving signal NDS2 having the second amplitude A2, and the other of the first to eighth sub-active vibration members 200S1 to 200S8 can vibrate based on the second positive driving signal PDS2 having the second amplitude A2. For example, each of the first, third, sixth, and eighth sub-active vibration members 200S1, 200S3, 200S6, and 200S8 can vibrate based on the second negative driving signal NDS2 having the second amplitude A2. For example, each of the second, fourth, fifth, and seventh sub-active vibration members 200S2, 200S4, 200S5, and 200S7 can vibrate based on the second positive driving signal PDS2 having the second amplitude A2.

With reference to FIGS. 5 and 13M, according to the driving signal according to the experimental example, the main active vibration member 200M can vibrate based on the first negative driving signal NDS1 having the first amplitude A1, and each of the first to eighth sub-active vibration members 200S1 to 200S8 can vibrate based on the second positive driving signal PDS2 having the second amplitude A2.

FIGS. 14A to 14F illustrate various embodiments of a driving signal of a vibration apparatus according to another embodiment of the present disclosure. In FIGS. 14A to 14F, a digit illustrated in a tetragon refers to an amplitude of a driving signal applied to an active vibration member, and a dotted line represents a region, where a vibration width (or a displacement width) is largest, of a vibration region of a passive vibration member vibrated based on a vibration of a vibration apparatus 200.

With reference to FIGS. 14A to 14F, a vibration apparatus 200 according to another embodiment of the present disclosure can include twenty-five active vibration members 200M and 200S1 to 200S24 arranged in a 5×5 form, an active vibration member 200M arranged in a third column of a third row (3, 3) in the 5×5 form can be set to a main active vibration member 200M, and the other active vibration members 200S1 to 200S24 can be respectively set to first to twenty-fourth active vibration members 200S1 to 200S24. At least one or more of a phase and an amplitude of a sub-driving signal applied to the first to twenty-fourth active vibration members 200S1 to 200S24 can be set or vary so that a vibration width (or vibration intensity) of a vibration region of a passive vibration member is symmetric in one shape of a "+"-shape, a "/"-shape, a "*"-shape, a "×"-shape, a combination shape of a "×"-shape and a "–"-shape, a combination shape of a "+"-shape and a "×"-shape, and a "\"-shape with respect to the main active vibration member 200M.

Figure 14A:
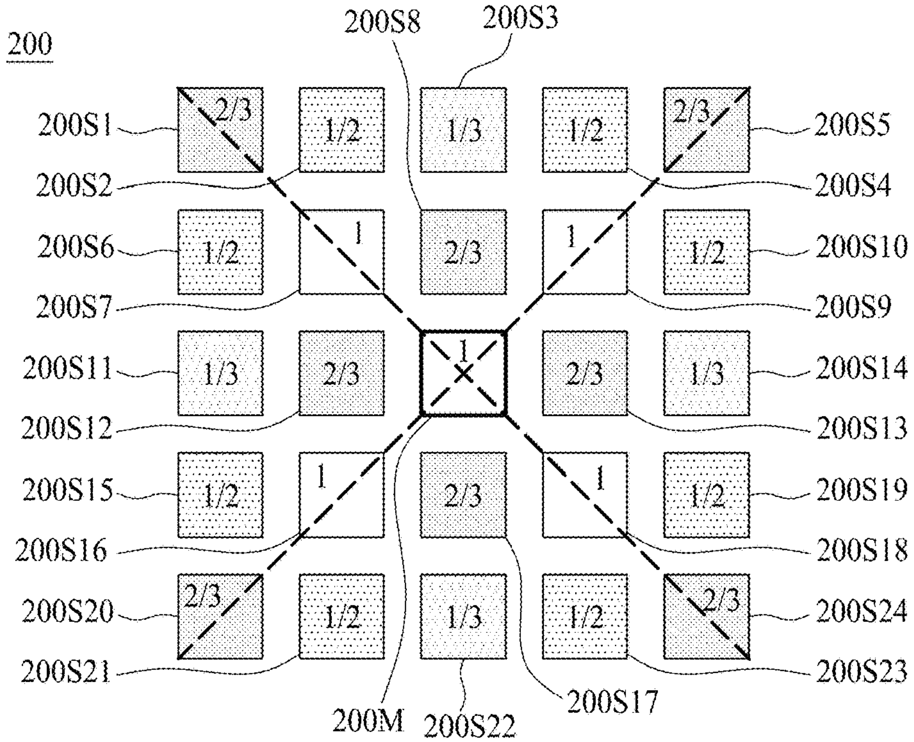
FIGS. 14A to 14F illustrate various embodiments of a driving signal of a vibration apparatus according to another embodiment of the present disclosure.

With reference to FIGS. 5 and 14A, a sub-driving signal applied to each of the first to twenty-fourth sub-active vibration members 200S1 to 200S24 can be set or vary so that the vibration width (or vibration intensity) of the vibration region of the passive vibration member is symmetric in the "×"-shape with respect to the main active vibration member 200M.

According to the driving signal according to a thirteenth embodiment of the present disclosure, a main driving signal applied to the main active vibration member 200M can have the first amplitude A1, and the sub-driving signal applied to each of the first to twenty-fourth sub-active vibration members 200S1 to 200S24 can have an amplitude which is symmetric in the "×"-shape with respect to the main active vibration member 200M.

For example, the main active vibration member 200M can vibrate based on the first positive driving signal PDS1 having the first amplitude A1.

For example, each of the first, fifth, eighth, twelfth, thirteenth, seventeenth, twentieth, and twenty-fourth sub-active vibration members 200S1, 200S5, 200S8, 200S12, 200S13, 200S17, 200S20, and 200S24 can configure a first subgroup and can vibrate based on the third positive driving signal PDS3 having the third amplitude A3 (e.g., ⅔).

For example, each of the second, fourth, sixth, tenth, fifteenth, nineteenth, twenty-first, and twenty-third sub-active vibration members 200S2, 200S4, 200S6, 200S10, 200S15, 200S19, 200S21, and 200S23 can configure a second subgroup and can vibrate based on the second positive driving signal PDS2 having the second amplitude A2 (e.g., ½).

For example, each of the third, eleventh, fourteenth, and twenty-second sub-active vibration members 200S3, 200S11, 200S14, and 200S22 can configure a third subgroup and can vibrate based on the fourth positive driving signal PDS4 having the fourth amplitude A4 (e.g., ⅓).

For example, each of the seventh, ninth, sixteenth, and eighteenth sub-active vibration members 200S7, 200S9, 200S16, and 200S18 can configure a fourth subgroup and can vibrate based on the first positive driving signal PDS1 having the first amplitude A1 (e.g., 1).

Figure 14B:
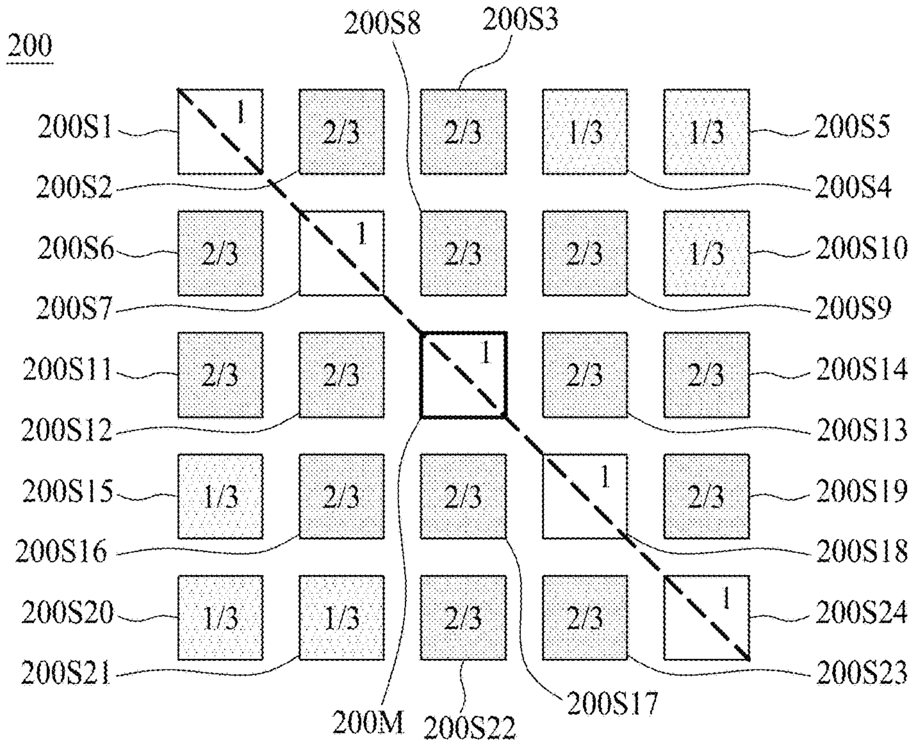

With reference to FIGS. 5 and 14B, the sub-driving signal applied to each of the first to twenty-fourth sub-active vibration members 200S1 to 200S24 can be set or vary so that the vibration width (or vibration intensity) of the vibration region of the passive vibration member is symmetric in the "\"-shape with respect to the main active vibration member 200M.

According to the driving signal according to a fourteenth embodiment of the present disclosure, the main driving signal applied to the main active vibration member 200M can have the first amplitude A1, and the sub-driving signal applied to each of the first to twenty-fourth sub-active vibration members 200S1 to 200S24 can have an amplitude which is symmetric in the "\"-shape with respect to the main active vibration member 200M.

For example, the main active vibration member 200M can vibrate based on the first positive driving signal PDS1 having the first amplitude A1 (e.g., 1).

For example, each of the first, seventh, eighteenth, and twenty-fourth sub-active vibration members 200S1, 200S7, 200S18, and 200S24 can configure a first subgroup and can vibrate based on the first positive driving signal PDS1 having the first amplitude A1.

For example, each of the second, third, sixth, eighth, ninth, eleventh, twelfth, thirteenth, fourteenth, sixteenth, seventeenth, nineteenth, twenty-second, and twenty-third sub-active vibration members 200S2, 200S3, 200S6, 200S8, 200S9, 200S11, 200S12, 200S13, 200S14, 200S16, 200S17, 200S19, 200S22, and 200S23 can configure a second subgroup and can vibrate based on the third positive driving signal PDS3 having the third amplitude A3 (e.g., ⅔).

For example, each of the fourth, fifth, tenth, fifteenth, twentieth, and twenty-first sub-active vibration members 200S4, 200S5, 200S10, 200S15, 200S20, and 200S21 can configure a third subgroup and can vibrate based on the fourth positive driving signal PDS4 having the fourth amplitude A4 (e.g., ⅓).

Figure 14C:
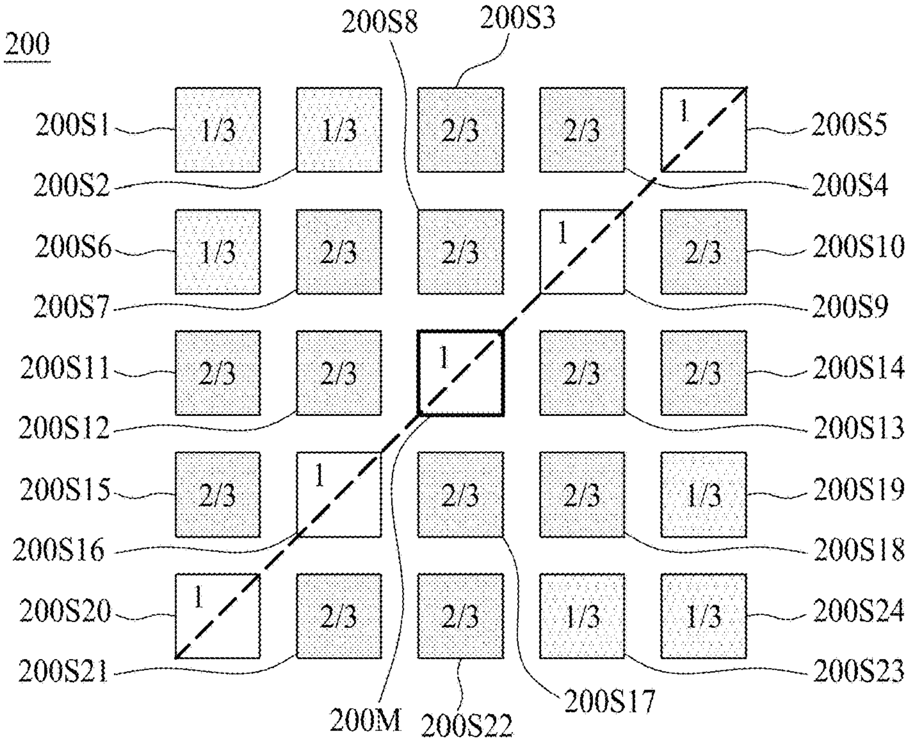

With reference to FIGS. 5 and 14C, the sub-driving signal applied to each of the first to twenty-fourth sub-active vibration members 200S1 to 200S24 can be set or vary so that the vibration width (or vibration intensity) of the vibration region of the passive vibration member is symmetric in the "/"-shape with respect to the main active vibration member 200M.

According to the driving signal according to a fifteenth embodiment of the present disclosure, the main driving signal applied to the main active vibration member 200M can have the first amplitude A1, and the sub-driving signal applied to each of the first to twenty-fourth sub-active vibration members 200S1 to 200S24 can have an amplitude which is symmetric in the "/"-shape with respect to the main active vibration member 200M.

For example, the main active vibration member 200M can vibrate based on the first positive driving signal PDS1 having the first amplitude A1 (e.g., 1).

For example, each of the first, second, sixth, nineteenth, twenty-third, and twenty-fourth sub-active vibration members 200S1, 200S2, 200S6, 200S19, 200S23, and 200S24 can configure a first subgroup and can vibrate based on the fourth positive driving signal PDS4 having the fourth amplitude A4 (e.g., ⅓).

For example, each of the third, fourth, seventh, eighth, tenth, eleventh, twelfth, thirteenth, fourteenth, fifteenth, seventeenth, eighteenth, twenty-first, and twenty-second sub-active vibration members 200S3, 200S4, 200S7, 200S8, 200S10, 200S11, 200S12, 200S13, 200S14, 200S15, 200S17, 200S18, 200S21, and 200S23 can configure a second subgroup and can vibrate based on the third positive driving signal PDS3 having the third amplitude A3 (e.g., ⅔).

For example, each of the fifth, ninth, sixteenth, and twentieth sub-active vibration members 200S5, 200S9, 200S16, and 200S20 can configure a third subgroup and can vibrate based on the first positive driving signal PDS1 having the first amplitude A1 (e.g., 1).

Figure 14D:
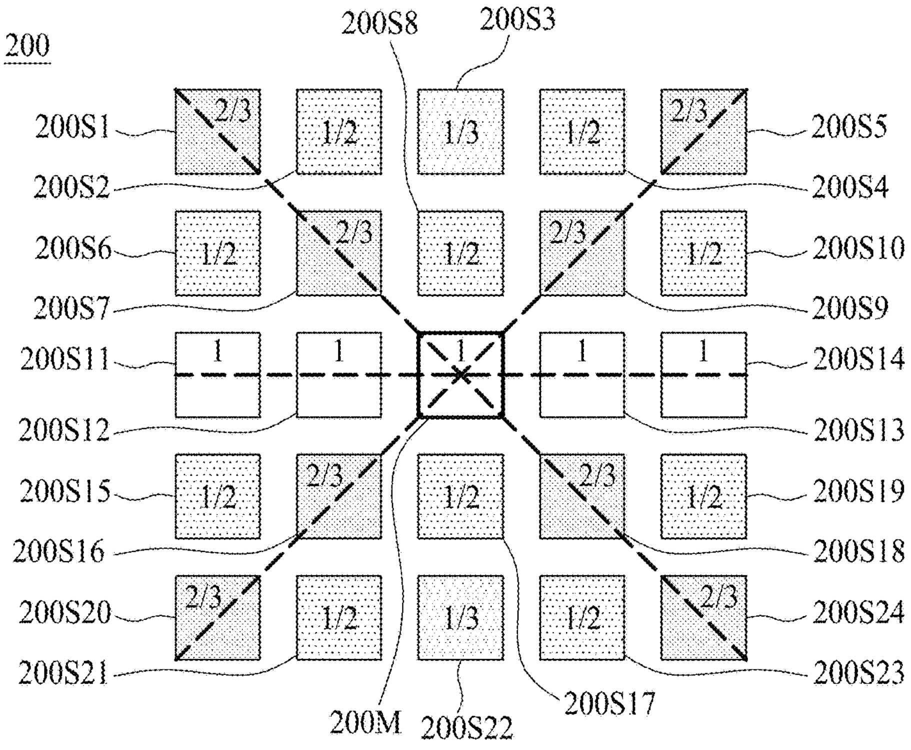

With reference to FIGS. 5 and 14D, the sub-driving signal applied to each of the first to twenty-fourth sub-active vibration members 200S1 to 200S24 can be set or vary so that the vibration width (or vibration intensity) of the vibration region of the passive vibration member is symmetric in the combination shape of the "×"-shape and the "–"-shape with respect to the main active vibration member 200M.

According to a driving signal according to a sixteenth embodiment of the present disclosure, the main driving signal applied to the main active vibration member 200M can have the first amplitude A1, and the sub-driving signal applied to each of the first to twenty-fourth sub-active vibration members 200S1 to 200S24 can have an amplitude which is symmetric in the combination shape of the "×"-shape and the "–"-shape with respect to the main active vibration member 200M.

For example, the main active vibration member 200M can vibrate based on the first positive driving signal PDS1 having the first amplitude A1 (e.g., 1).

For example, each of the first, fifth, seventh, ninth, sixteenth, eighteenth, twentieth, and twenty-fourth sub-active vibration members 200S1, 200S5, 200S7, 200S9, 200S16, 200S18, 200S20, and 200S24 can configure a first subgroup and can vibrate based on the third positive driving signal PDS3 having the third amplitude A3 (e.g., ⅔).

For example, each of the second, fourth, sixth, eighth, tenth, fifteenth, seventeenth, nineteenth, twenty-first, and twenty-third sub-active vibration members 200S2, 200S4, 200S6, 200S8, 200S10, 200S15, 200S17, 200S19, 200S21, and 200S23 can configure a second subgroup and can vibrate based on the second positive driving signal PDS2 having the second amplitude A2 (e.g., ½).

For example, each of the third and twenty-second sub-active vibration members 200S3 and 200S22 can configure a third subgroup and can vibrate based on the fourth positive driving signal PDS4 having the fourth amplitude A4 (e.g., ⅓).

For example, each of the eleventh, twelfth, thirteenth, and fourteenth sub-active vibration members 200S11, 200S12, 200S13, and 200S14 can configure a fourth subgroup and can vibrate based on the first positive driving signal PDS1 having the first amplitude A1.

Figure 14E:
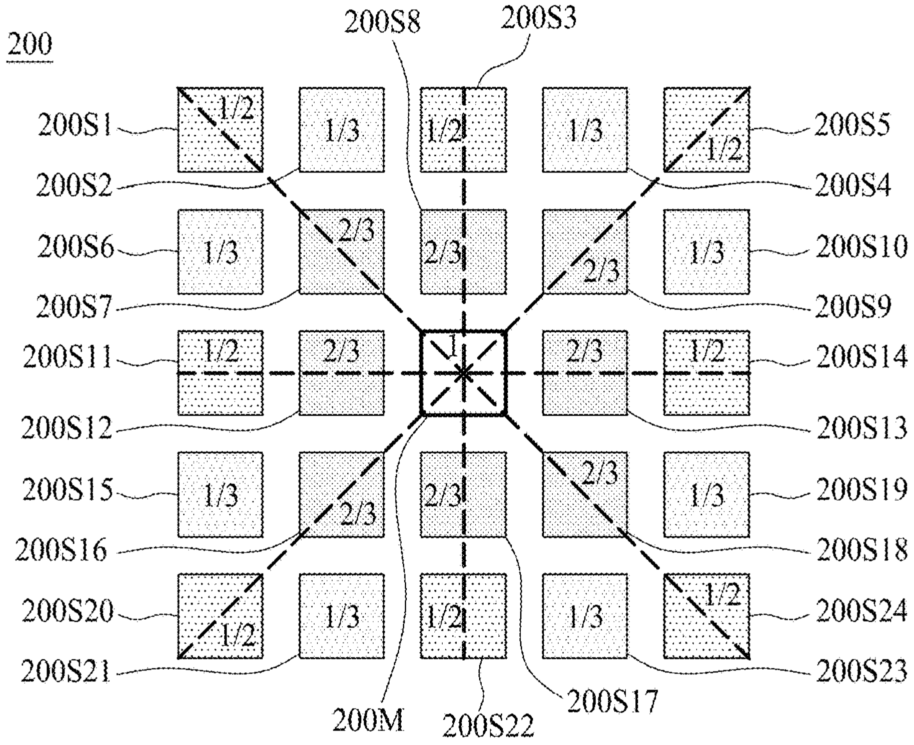

With reference to FIGS. 5 and 14E, the sub-driving signal applied to each of the first to twenty-fourth sub-active vibration members 200S1 to 200S24 can be set or vary so that the vibration width (or vibration intensity) of the vibration region of the passive vibration member is symmetric in the "*"-shape or the combination shape of a "+"-shape and a "×"-shape with respect to the main active vibration member 200M.

According to a driving signal according to a seventeenth embodiment of the present disclosure, the main driving signal applied to the main active vibration member 200M can have the first amplitude A1, and the sub-driving signal applied to each of the first to twenty-fourth sub-active vibration members 200S1 to 200S24 can have an amplitude which is symmetric in the "*"-shape or the combination shape of a "+"-shape and a "×"-shape with respect to the main active vibration member 200M.

For example, the main active vibration member 200M can vibrate based on the first positive driving signal PDS1 having the first amplitude A1 (e.g., 1).

For example, each of the first, third, fifth, eleventh, fourteenth, twentieth, twenty-second, and twenty-fourth sub-active vibration members 200S1, 200S3, 200S5, 200S11, 200S14, 200S20, 200S22, and 200S24 can configure a first subgroup and can vibrate based on the second positive driving signal PDS2 having the second amplitude A2 (e.g., ½).

For example, each of the second, fourth, sixth, tenth, fifteenth, nineteenth, twenty-first, and twenty-third sub-active vibration members 200S2, 200S4, 200S6, 200S10, 200S15, 200S19, 200S21, and 200S23 can configure a second subgroup and can vibrate based on the fourth positive driving signal PDS4 having the fourth amplitude A4 (e.g., ⅓).

For example, each of the seventh, eighth, ninth, twelfth, thirteenth, sixteenth, seventeenth, and eighteenth sub-active vibration members 200S7, 200S8, 200S9, 200S12, 200S13, 200S16, 200S17, and 200S18 can configure a third subgroup and can vibrate based on the third positive driving signal PDS3 having the third amplitude A3 (e.g., ⅔).

Figure 14F:
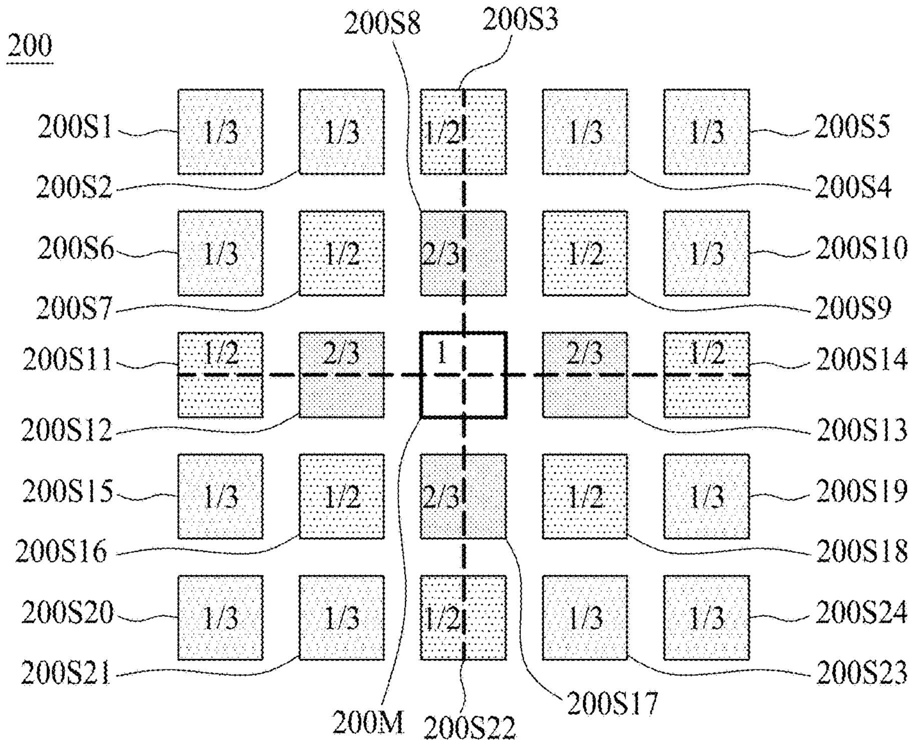

With reference to FIGS. 5 and 14F, the sub-driving signal applied to each of the first to twenty-fourth sub-active vibration members 200S1 to 200S24 can be set or vary so that the vibration width (or vibration intensity) of the vibration region of the passive vibration member is symmetric in the "+"-shape with respect to the main active vibration member 200M.

According to a driving signal according to a eighteenth embodiment of the present disclosure, the main driving signal applied to the main active vibration member 200M can have the first amplitude A1, and the sub-driving signal applied to each of the first to twenty-fourth sub-active vibration members 200S1 to 200S24 can have an amplitude which is symmetric in the "+"-shape with respect to the main active vibration member 200M.

For example, the main active vibration member 200M can vibrate based on the first positive driving signal PDS1 having the first amplitude A1 (e.g., 1).

For example, each of the first, second, fourth, fifth, sixth, tenth, fifteenth, nineteenth, twentieth, twenty-first, twenty-third, and twenty-fourth sub-active vibration members 200S1, 200S2, 200S4, 200S5, 200S6, 200S10, 200S15, 200S19, 200S20, 200S21, 200S23, and 200S24 can configure a first subgroup and can vibrate based on the fourth positive driving signal PDS4 having the fourth amplitude A4 (e.g., ⅓).

For example, each of the third, seventh, ninth, eleventh, fourteenth, sixteenth, eighteenth, and twenty-second sub-active vibration members 200S3, 200S7, 200S9, 200S11, 200S14, 200S16, 200S18, and 200S22 can configure a second subgroup and can vibrate based on the second positive driving signal PDS2 having the second amplitude A2 (e.g., ½).

For example, each of the eighth, twelfth, thirteenth, and seventeenth sub-active vibration members 200S8, 200S12, 200S13, and 200S17 can configure a third subgroup and can vibrate based on the third positive driving signal PDS3 having the third amplitude A3 (e.g., ⅔).

Figure 15:
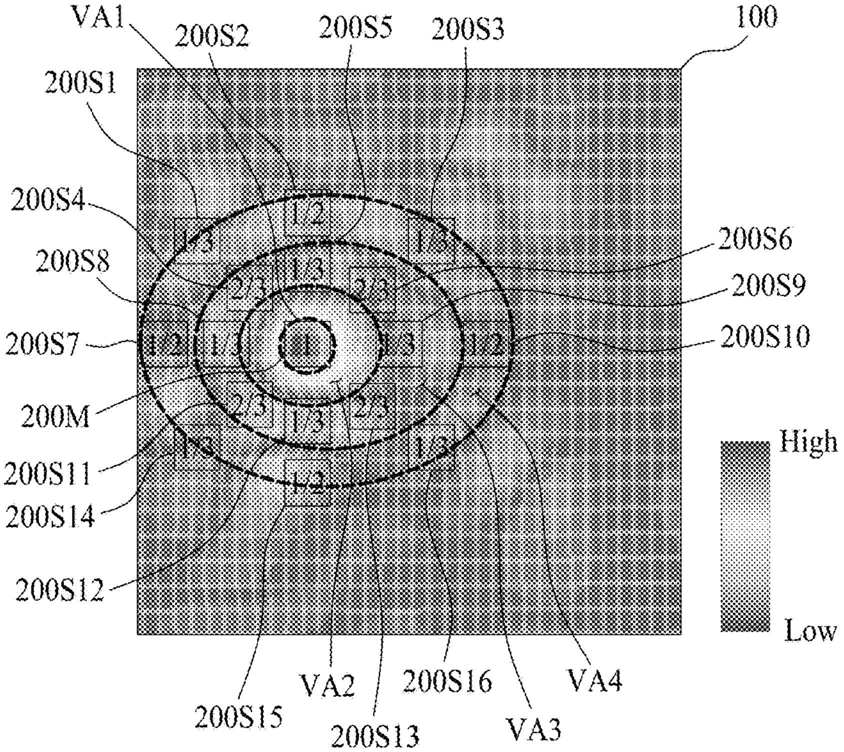
FIG. 15 illustrates a circular arrangement structure of a plurality of active vibration members according to another embodiment of the present disclosure.

FIG. 15 illustrates a circular arrangement structure of a plurality of active vibration members according to another embodiment of the present disclosure. In FIG. 15, a digit illustrated in a tetragon refers to an amplitude of a driving signal applied to an active vibration member.

With reference to FIGS. 5 and 15, a vibration apparatus 200 according to another embodiment of the present disclosure can include a plurality of active vibration members 200M and 200S1 to 200S16 which are regularly arranged based on a vibration displacement characteristic (or vibration intensity characteristic or vibration characteristic) of a passive vibration member 100. For example, the vibration apparatus 200 can include a main active vibration member 200M and a plurality of sub-active vibration members 200S1 to 200S16 which are regularly arranged based on a vibration displacement characteristic (or vibration intensity characteristic or vibration characteristic) of the passive vibration member 100. For example, the vibration apparatus 200 can include the main active vibration member 200M and first to sixteenth sub-active vibration members 200S1 to 200S16.

The passive vibration member 100 can include a main vibration region based on a vibration of the main active vibration member 200M and a plurality of sub vibration regions based on vibrations of a plurality of sub-active vibration members 200S. Each of the plurality of sub vibration regions can surround the main vibration region. Each of the main vibration region and the plurality of sub vibration regions can have a circular shape, but embodiments of the present disclosure are not limited thereto, and can have an oval shape or a non-symmetrical shape, such as an oblong shape. Each of the main vibration region and the plurality of sub vibration regions can have a concentric shape. For example, the passive vibration member 100 can include a first vibration region VA1, a second vibration region VA2 surrounding the first vibration region VA1, a third vibration region VA3 surrounding the second vibration region VA2, and a fourth vibration region VA4 surrounding the third vibration region VA3. For example, the first vibration region VA1 can be a main vibration region, and each of the second to fourth vibration regions VA2, VA3, and VA4 can be a sub vibration region or an auxiliary vibration region.

The main active vibration member 200M can be disposed at the first vibration region VA1 of the passive vibration member 100 and can vibrate based on the first positive driving signal PDS1 having the first amplitude A1 (e.g., 1).

The first to sixteenth sub-active vibration members 200S1 to 200S16 can be disposed at the second to fourth vibration regions VA2 to VA4, based on a vibration displacement characteristic (or vibration intensity characteristic or vibration characteristic) of the passive vibration member 100. For example, the first to sixteenth sub-active vibration members 200S1 to 200S16 can configure first to fourth subgroups or can be grouped into the first to fourth subgroups, and a plurality of sub-active vibration members included in each of the first to fourth subgroups can be regularly distributed and arranged at each of the third and fourth vibration regions VA3 and VA4, based on a vibration displacement characteristic (or vibration intensity characteristic or vibration characteristic) of the passive vibration member 100. For example, the first to sixteenth sub-active vibration members 200S1 to 200S16 can be arranged to have a "+"-shape and a "×"-shape with respect to the main active vibration member 200M, in the second to fourth vibration regions VA2 to VA4.

The first, third, fourteenth, and sixteenth sub-active vibration members 200S1, 200S3, 200S14, and 200S16 can be arranged at the fourth vibration region VA4 disposed in a diagonal direction of the main active vibration member 200M. For example, the first, third, fourteenth, and sixteenth sub-active vibration members 200S1, 200S3, 200S14, and 200S16 can be arranged at the "×"-shaped position with respect to the main active vibration member 200M. For example, each of the first, third, fourteenth, and sixteenth sub-active vibration members 200S1, 200S3, 200S14, and 200S16 can configure the first subgroup and can vibrate based on the fourth positive driving signal PDS4 having the fourth amplitude A4 (e.g., ⅓).

The second, seventh, tenth, and fifteenth sub-active vibration members 200S2, 200S7, 200S10, and 200S15 can be arranged at the fourth vibration region VA4 disposed in upward, downward, left, and right directions of the main active vibration member 200M. For example, the second, seventh, tenth, and fifteenth sub-active vibration members 200S2, 200S7, 200S10, and 200S15 can be arranged at the "+"-shaped position with respect to the main active vibration member 200M. For example, each of the second, seventh, tenth, and fifteenth sub-active vibration members 200S2, 200S7, 200S10, and 200S15 can configure the second subgroup and can vibrate based on the second positive driving signal PDS2 having the second amplitude A2 (e.g., ½).

The fourth, sixth, eleventh, and thirteenth sub-active vibration members 200S4, 200S6, 200S11, and 200S13 can be arranged at the third vibration region VA3 disposed in the diagonal direction of the main active vibration member 200M. For example, the fourth, sixth, eleventh, and thirteenth sub-active vibration members 200S4, 200S6, 200S11, and 200S13 can be arranged at the "×"-shaped position with respect to the main active vibration member 200M. For example, each of the fourth, sixth, eleventh, and thirteenth sub-active vibration members 200S4, 200S6, 200S11, and 200S13 can configure the third subgroup and can vibrate based on the third positive driving signal PDS3 having the third amplitude A3 (e.g., ⅔).

The fifth, eighth, ninth, and twelfth sub-active vibration members 200S5, 200S8, 200S9, and 200S12 can be arranged in the third vibration region VA3 disposed in the upward, downward, left, and right directions of the main active vibration member 200M. For example, the fifth, eighth, ninth, and twelfth sub-active vibration members 200S5, 200S8, 200S9, and 200S12 can be arranged at the "+"-shaped position with respect to the main active vibration member 200M. For example, each of the fifth, eighth, ninth, and twelfth sub-active vibration members 200S5, 200S8, 200S9, and 200S12 can configure the fourth subgroup and can vibrate based on the fourth positive driving signal PDS4 having the fourth amplitude A4 (e.g., ⅓).

As described above, an apparatus or the vibration apparatus 200 according to another embodiment of the present disclosure can include the plurality of active vibration members 200M and 200S1 to 200S16 which are regularly arranged based on a vibration displacement characteristic (or vibration intensity characteristic or vibration characteristic) of the passive vibration member 100 and can vary (or change) a sub-driving signal applied to the plurality of active vibration members 200S1 to 200S16 (or first to fourth subgroups) to be different from the main driving signal MDS, in order to be optimized for a vibration displacement characteristic (or vibration intensity characteristic or vibration characteristic) of the passive vibration member 100, thereby further enhancing a sound characteristic and a sound pressure level characteristic of the low-pitched sound band generated by the passive vibration member 100.

Figure 16:
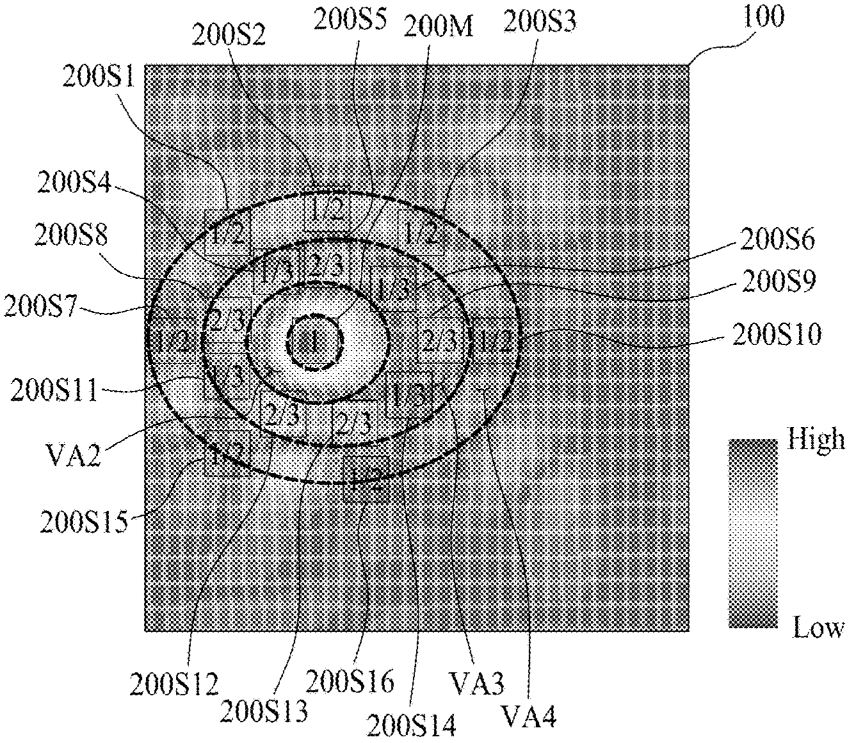
FIG. 16 illustrates a circular arrangement structure of a plurality of active vibration members according to another embodiment of the present disclosure.

FIG. 16 illustrates a circular arrangement structure of a plurality of active vibration members according to another embodiment of the present disclosure. FIG. 16 illustrates an embodiment implemented by changing positions of the plurality of sub-active vibration members illustrated in FIG. 15. Therefore, in describing FIG. 16, only positions of a plurality of sub-active vibration members will be described. In FIG. 16, a digit illustrated in a tetragon refers to an amplitude of a driving signal applied to an active vibration member.

With reference to FIGS. 5 and 16, a plurality of active vibration members 200S1 to 200S16 according to another embodiment of the present disclosure can be irregularly arranged at a periphery of a main active vibration member 200M, based on a vibration displacement characteristic (or vibration intensity characteristic or vibration characteristic) of a passive vibration member 100. For example, the plurality of active vibration members 200S1 to 200S16 can configure first to third subgroups or can be grouped into the first to third subgroups, and a plurality of sub-active vibration members included in each of the first to third subgroups can be irregularly distributed and arranged in each of third and fourth vibration regions VA3 and VA4, based on a vibration displacement characteristic (or vibration intensity characteristic or vibration characteristic) of the passive vibration member 100.

The first, second, third, seventh, tenth, fifteenth, and sixteenth sub-active vibration members 200S1, 200S2, 200S3, 200S7, 200S10, 200S15, and 200S16 can be disposed at a region, which is relatively small in vibration displacement characteristic, of the fourth vibration region VA4, and thus, can be irregularly arranged in the fourth vibration region VA4. For example, each of the first, second, third, seventh, tenth, fifteenth, and sixteenth sub-active vibration members 200S1, 200S2, 200S3, 200S7, 200S10, 200S15, and 200S16 can configure the first subgroup and can vibrate based on the second positive driving signal PDS2 having the second amplitude A2. The fourth, sixth, eleventh, and fourteenth sub-active vibration members 200S4, 200S6, 200S11, and 200S14 can be disposed at a region, which is relatively large in vibration displacement characteristic, of the third vibration region VA3. For example, each of the fourth, sixth, eleventh, and fourteenth sub-active vibration members 200S4, 200S6, 200S11, and 200S14 can configure the second subgroup and can vibrate based on the fourth positive driving signal PDS4 having the fourth amplitude A4 (e.g., ⅓). The fifth, eighth, ninth, twelfth, and thirteenth sub-active vibration members 200S5, 200S8, 200S9, 200S12, and 200S13 can be disposed at a region, which is relatively small in vibration displacement characteristic, of the third vibration region VA3. For example, each of the fifth, eighth, ninth, twelfth, and thirteenth sub-active vibration members 200S5, 200S8, 200S9, 200S12, and 200S13 can configure the third subgroup and can vibrate based on the third positive driving signal PDS3 having the third amplitude A3 (e.g., ⅔).

As described above, an apparatus or the vibration apparatus 200 according to another embodiment of the present disclosure can include the plurality of active vibration members 200M and 200S1 to 200S16 which are irregularly arranged based on a vibration displacement characteristic (or vibration intensity characteristic or vibration characteristic) of the passive vibration member 100 and can vary (or change) a sub-driving signal applied to the plurality of active vibration members 200S1 to 200S16 (or first to third subgroups) to be different from the main driving signal MDS, in order to be optimized for a vibration displacement characteristic (or vibration intensity characteristic or vibration characteristic) of the passive vibration member 100, thereby further enhancing a sound characteristic and a sound pressure level characteristic of the low-pitched sound band generated by the passive vibration member 100.

Figure 17:
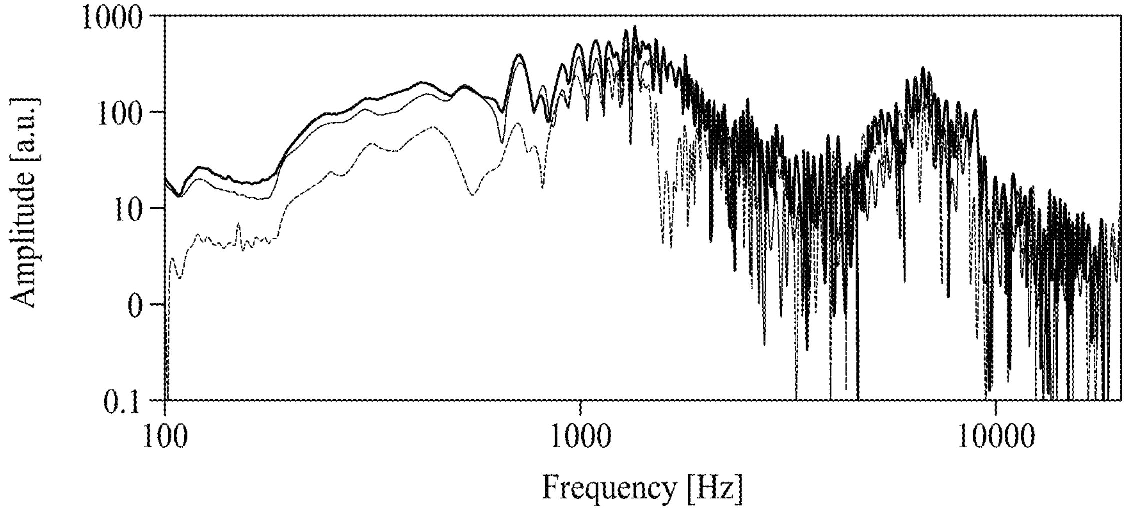
FIG. 17 illustrates a sound output characteristic based on a driving signal according to the first to third embodiments of the present disclosure illustrated in FIGS. 13A to 13C.

FIG. 17 illustrates a sound output characteristic based on a driving signal according to the first to third embodiments of the present disclosure illustrated in FIGS. 13A to 13C. In FIG. 17, a thick solid line represents a sound output characteristic based on a driving signal according to the first embodiment of the present disclosure illustrated in FIG. 13A, a solid line represents a sound output characteristic based on a driving signal according to the second embodiment of the present disclosure illustrated in FIG. 13B, and a dotted line represents a sound output characteristic based on a driving signal according to the third embodiment of the present disclosure illustrated in FIG. 13C. In FIG. 17, the abscissa axis represents a frequency (Hz), and the ordinate axis represents an amplitude. The amplitude is a digit expressed as a relative value with respect to a maximum amplitude and can be a sound pressure level. Also, FIG. 17 shows a log-log graph.

With reference to FIGS. 5, 13A to 13C, and 17, comparing with the solid line, in the thick solid line, it can be seen that a sound pressure level increases in 1 kHz or less (e.g., louder lower frequencies). Comparing with the dotted line, in the thick solid line, it can be seen that a sound pressure level further increases in 1 kHz or less.

According to the first embodiment of the present disclosure, as shown in FIG. 13A, the plurality of sub-active vibration members 200S disposed at a periphery of the main active vibration member 200M can be controlled to vibrate based on the same driving signal as the main active vibration member 200M, and thus, a sound characteristic and a sound pressure level characteristic of the low-pitched sound band generated by a passive vibration member can be further enhanced. Accordingly, the driving signal according to each of the first and second embodiments of the present disclosure can be applied as the driving signal of the vibration apparatus 200, in order to enhance a sound characteristic and a sound pressure level characteristic of the low-pitched sound band. Moreover, the driving signal according to the third embodiment of the present disclosure can be applied as the driving signal of the vibration apparatus 200, in order to enhance a sound characteristic and a sound pressure level characteristic of the high-pitched sound band (e.g., improved treble response).

Figure 18:
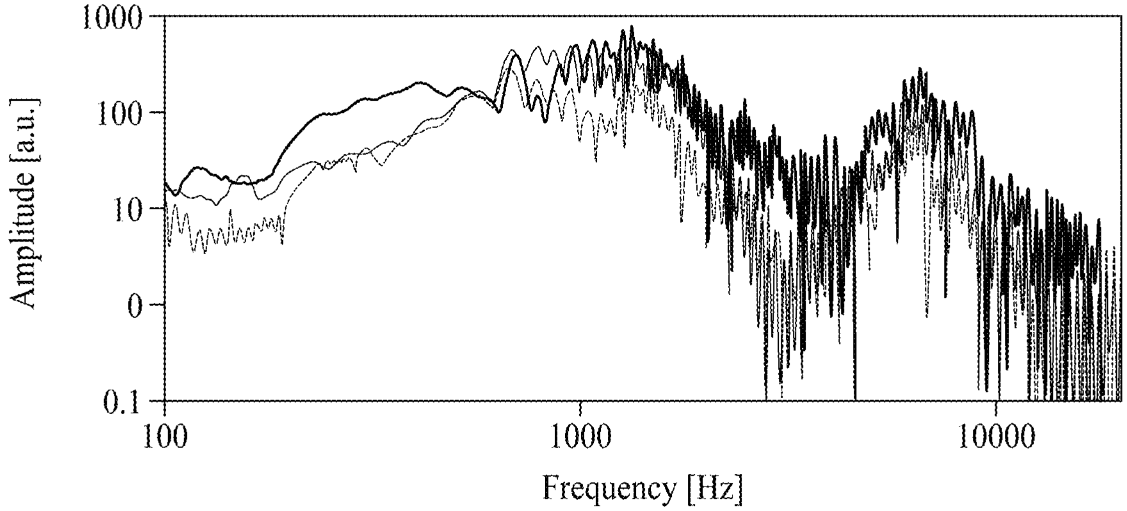
FIG. 18 is a graph illustrating a sound output characteristic based on a material of a passive vibration member, in driving of a vibration apparatus based on a driving signal according to an embodiment of the present disclosure illustrated in FIG. 13A.

FIG. 18 is a graph illustrating a sound output characteristic based on a material of a passive vibration member, in driving of a vibration apparatus based on a driving signal according to the first embodiment of the present disclosure illustrated in FIG. 13A. In FIG. 18, a thick solid line represents a sound output characteristic when the passive vibration member includes a plastic material, a solid line represents a sound output characteristic when the passive vibration member includes a paper material, and a dotted line represents a sound output characteristic when the passive vibration member includes a metal material.

With reference to FIGS. 5, 13A, and 18, comparing with the solid line and the dotted line, in the thick solid line, it can be seen that a sound pressure level increases in about 100 Hz to 500 Hz and 1 kHz or more. Comparing with the dotted line, in the solid line, it can be seen that a sound pressure level increases in about 700 Hz or more.

According to the first embodiment of the present disclosure, when the passive vibration member includes a plastic material, the plurality of sub-active vibration members 200S disposed at a periphery of the main active vibration member 200M can be controlled to vibrate based on the same driving signal as the main active vibration member 200M, and thus, a sound characteristic and a sound pressure level characteristic in 200 Hz to 550 Hz generated by the passive vibration member can be enhanced. Accordingly, the driving signal according to the first embodiment of the present disclosure can be applied as the driving signal of the vibration apparatus 200, in order to enhance a sound characteristic and a sound pressure level characteristic in about 100 Hz to 500 Hz and 1 kHz or more generated based on a vibration of the passive vibration member including a plastic material. Moreover, the driving signal according to the first embodiment of the present disclosure can be applied as the driving signal of the vibration apparatus 200, in order to enhance a sound characteristic and a sound pressure level characteristic in about 700 Hz or more generated based on a vibration of the passive vibration member including a paper material.

Figure 19:
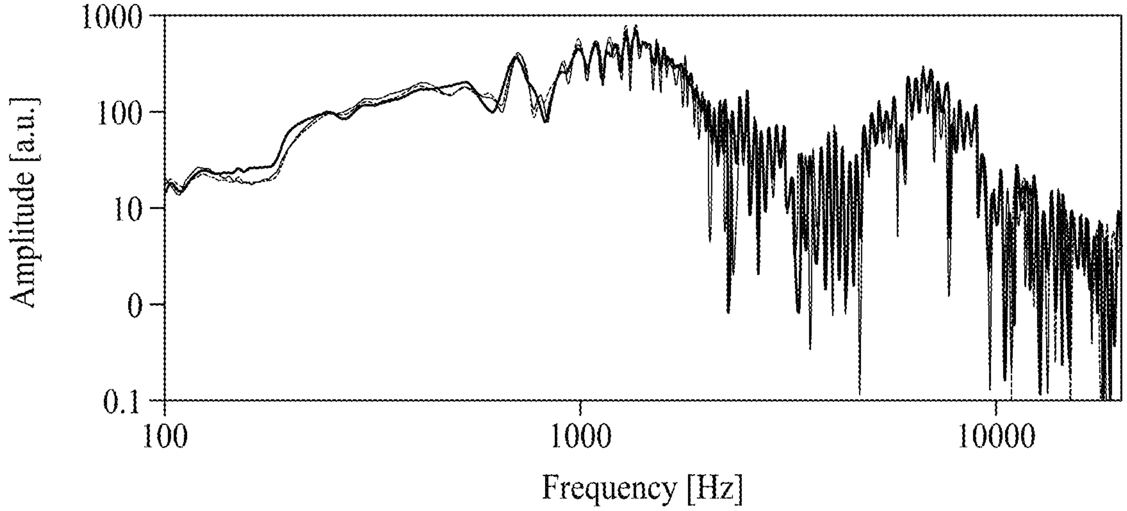
FIG. 19 is a graph illustrating a sound output characteristic based on a driving signal according to various embodiments of the present disclosure illustrated in FIGS. 13A, 13D, and 13E.

FIG. 19 is a graph illustrating a sound output characteristic based on a driving signal according to the first, fourth, and fifth embodiments of the present disclosure illustrated in FIGS. 13A, 13D, and 13E. In FIG. 19, a thick solid line represents a sound output characteristic based on a driving signal according to the fourth embodiment of the present disclosure illustrated in FIG. 13D, a solid line represents a sound output characteristic based on a driving signal according to the fifth embodiment of the present disclosure illustrated in FIG. 13E, and a dotted line represents a sound output characteristic based on a driving signal according to the first embodiment of the present disclosure illustrated in FIG. 13A.

With reference to FIGS. 5, 13A, 13D, 13E, and 19, comparing with the solid line and the dotted line, in the thick solid line, it can be seen that a sound pressure level increases in about 110 Hz to 250 Hz.

According to another embodiment of the present disclosure, as shown in FIG. 13D, the main active vibration member 200M can be controlled to vibrate based on the first positive driving signal PDS1 having the first amplitude A1 and each of the first to eighth sub-active vibration members 200S1 to 200S8 can be controlled to vibrate based on the second positive driving signal PDS2 having the second amplitude A2, and thus, a sound characteristic and a sound pressure level characteristic in about 110 Hz to 250 Hz generated by the passive vibration member can be enhanced. Accordingly, the driving signal according to the fourth embodiment of the present disclosure can be applied as the driving signal of the vibration apparatus 200, in order to enhance a sound characteristic and a sound pressure level characteristic in about 110 Hz to 250 Hz. In addition, the driving signal according to the first, fourth, and fifth embodiments of the present disclosure can be applied as the driving signal of the vibration apparatus 200, in order to enhance a sound characteristic and a sound pressure level characteristic in 250 Hz or more.

Figure 20:
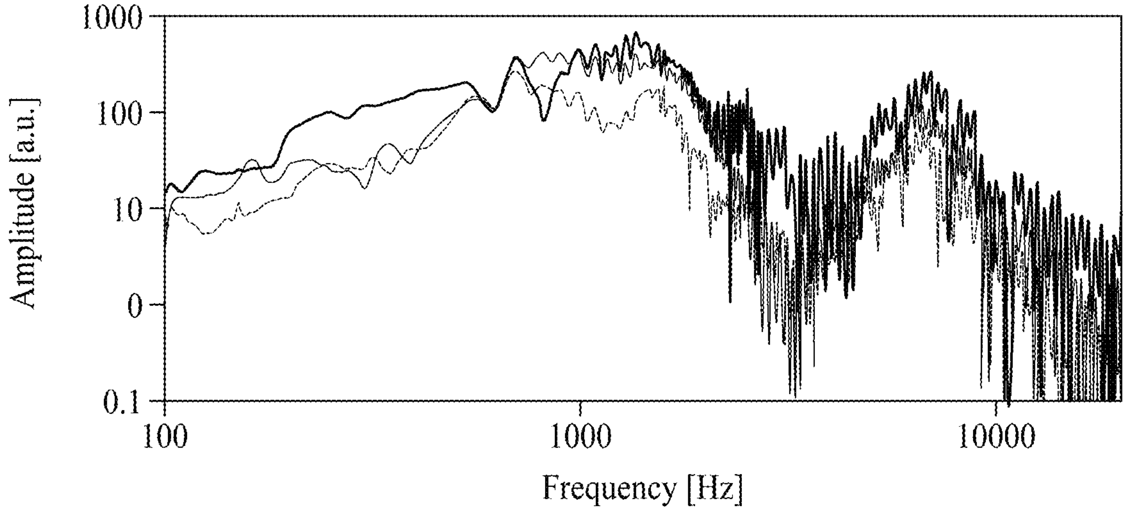
FIG. 20 is a graph illustrating a sound output characteristic based on a material of a passive vibration member, in driving of a vibration apparatus based on a driving signal according to an embodiment of the present disclosure illustrated in FIG. 13D.

FIG. 20 is a graph illustrating a sound output characteristic based on a material of a passive vibration member, in driving of a vibration apparatus based on a driving signal according to the fourth embodiment of the present disclosure illustrated in FIG. 13D. In FIG. 20, a thick solid line represents a sound output characteristic when the passive vibration member includes a plastic material, a solid line represents a sound output characteristic when the passive vibration member includes a paper material, and a dotted line represents a sound output characteristic when the passive vibration member includes a metal material.

With reference to FIGS. 5, 13D, and 20, comparing with the solid line and the dotted line, in the thick solid line, it can be seen that a sound pressure level increases in about 1.1 kHz or more. Comparing with the dotted line, in the solid line, it can be seen that a sound pressure level increases in about 700 Hz or more.

According to another embodiment of the present disclosure, when the passive vibration member includes a plastic material, the plurality of sub-active vibration members 200S disposed at a periphery of the main active vibration member 200M can be controlled to have a second amplitude A2 which is less than the first amplitude A1 of a main driving signal applied to the main active vibration member 200M, and thus, a sound characteristic and a sound pressure level characteristic in 180 Hz to 550 Hz generated by the passive vibration member can be enhanced. Accordingly, the driving signal according to the fourth embodiment of the present disclosure can be applied as the driving signal of the vibration apparatus 200, in order to enhance a sound characteristic and a sound pressure level characteristic in about 1.1 kHz or more and a sound pressure level in about 180 Hz to 550 Hz generated based on a vibration of the passive vibration member including a plastic material. In addition, the driving signal according to the fourth embodiment of the present disclosure can be applied as the driving signal of the vibration apparatus 200, in order to enhance a sound characteristic and a sound pressure level characteristic in about 130 Hz or less and a sound pressure level in about 700 Hz or more generated based on a vibration of the passive vibration member including a paper material.

Figure 21:
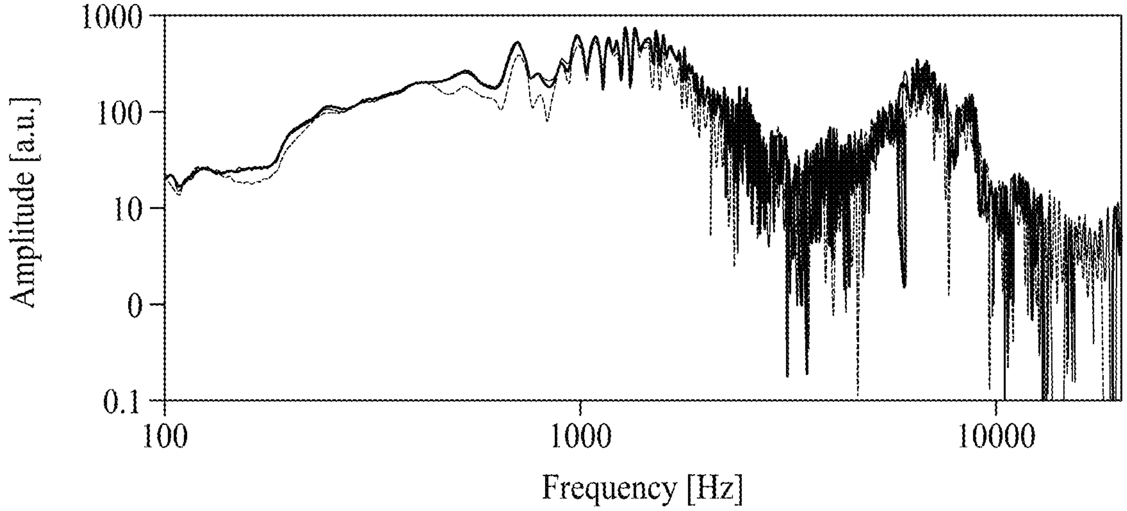
FIG. 21 is a graph illustrating a sound output characteristic based on a driving signal according to various embodiments of the present disclosure illustrated in FIGS. 13A, 13F, and 13G.

FIG. 21 is a graph illustrating a sound output characteristic based on a driving signal according to the first, sixth, and seventh embodiments of the present disclosure illustrated in FIGS. 13A, 13F, and 13G. In FIG. 21, a thick solid line represents a sound output characteristic based on a driving signal according to the seventh embodiment of the present disclosure illustrated in FIG. 13G, a solid line represents a sound output characteristic based on a driving signal according to the sixth embodiment of the present disclosure illustrated in FIG. 13F, and a dotted line represents a sound output characteristic based on a driving signal according to the first embodiment of the present disclosure illustrated in FIG. 13A.

With reference to FIGS. 5, 13A, 13F, 13G, and 21, comparing with the dotted line, in the thick solid line and the solid line, it can be seen that a sound pressure level increases in about 110 Hz to 250 Hz and 440 Hz to 900 Hz.

According to another embodiment of the present disclosure, as shown in FIG. 13F, the main active vibration member 200M can be controlled to vibrate based on the first positive driving signal PDS1 having the first amplitude A1, some of the first to eighth sub-active vibration members 200S1 to 200S8 can be controlled to vibrate based on the first positive driving signal PDS1 having the first amplitude A1, and the other of the first to eighth sub-active vibration members 200S1 to 200S8 can be controlled to vibrate based on the second positive driving signal PDS2 having the second amplitude A2, and thus, a sound characteristic and a sound pressure level characteristic in about 110 Hz to 250 Hz and about 440 Hz to 900 Hz generated by the passive vibration member can be enhanced.

According to another embodiment of the present disclosure, as shown in FIG. 13G, the main active vibration member 200M can be controlled to vibrate based on the second positive driving signal PDS2 having the second amplitude A2, some of the first to eighth sub-active vibration members 200S1 to 200S8 can be controlled to vibrate based on the first positive driving signal PDS1 having the first amplitude A1, and the other of the first to eighth sub-active vibration members 200S1 to 200S8 can be controlled to vibrate based on the second positive driving signal PDS2 having the second amplitude A2, and thus, a sound characteristic and a sound pressure level characteristic in about 110 Hz to 250 Hz and about 440 Hz to 900 Hz generated by the passive vibration member can be enhanced.

Accordingly, the driving signal according to each of the sixth and seventh embodiments of the present disclosure can be applied as the driving signal of the vibration apparatus 200, in order to enhance a sound characteristic and a sound pressure level characteristic in about 110 Hz to 250 Hz and about 440 Hz to 900 Hz. In addition, the driving signal according to each of the first, sixth and seventh embodiments of the present disclosure can be applied as the driving signal of the vibration apparatus 200, in order to enhance a sound characteristic and a sound pressure level characteristic in about 900 Hz or more.

Figure 22:
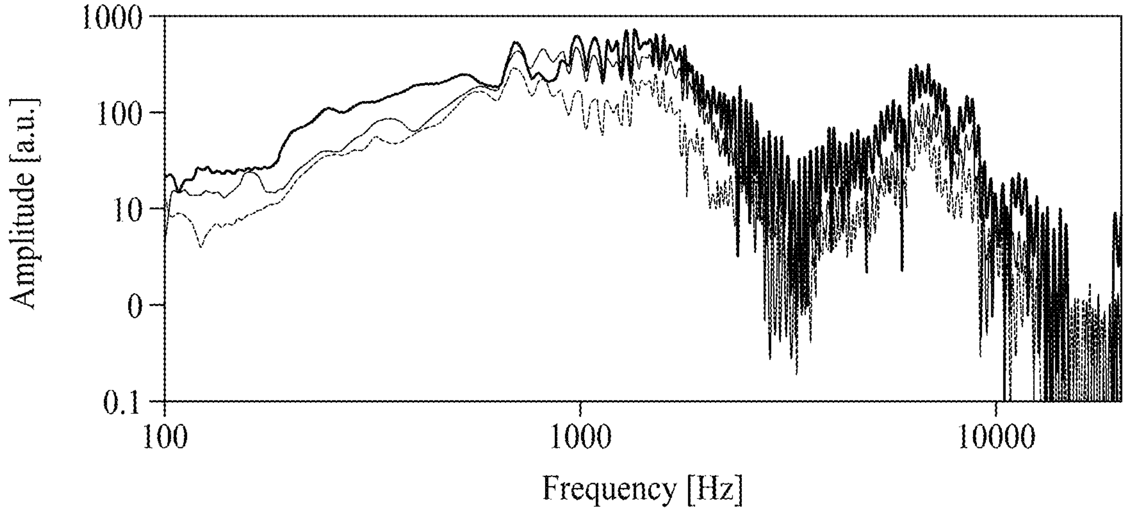
FIG. 22 is a graph illustrating a sound output characteristic based on a material of a passive vibration member, in driving of a vibration apparatus based on a driving signal according to the embodiment of the present disclosure illustrated in FIG. 13F.

FIG. 22 is a graph illustrating a sound output characteristic based on a material of a passive vibration member, in driving of a vibration apparatus based on a driving signal according to the sixth embodiment of the present disclosure illustrated in FIG. 13F. In FIG. 22, a thick solid line represents a sound output characteristic when the passive vibration member includes a plastic material, a solid line represents a sound output characteristic when the passive vibration member includes a paper material, and a dotted line represents a sound output characteristic when the passive vibration member includes a metal material.

With reference to FIGS. 5, 13F, and 22, comparing with the solid line and the dotted line, in the thick solid line, it can be seen that a sound pressure level increases in about 110 Hz to 550 Hz.

According to another embodiment of the present disclosure, when the passive vibration member includes a plastic material, a sub-driving signal applied to some of the plurality of sub-active vibration members 200S disposed at a periphery of the main active vibration member 200M can be controlled to have a second amplitude A2 which is less than the first amplitude A1 of a main driving signal applied to the main active vibration member 200M, and thus, a sound characteristic and a sound pressure level characteristic in about 110 Hz to 550 Hz generated by the passive vibration member can be enhanced. Accordingly, the driving signal according to the sixth embodiment of the present disclosure can be applied as the driving signal of the vibration apparatus 200, in order to enhance a sound characteristic and a sound pressure level characteristic in about 110 Hz to 550 Hz generated based on a vibration of the passive vibration member including a plastic material. In addition, the driving signal according to the sixth embodiment of the present disclosure can be applied as the driving signal of the vibration apparatus 200, in order to enhance a sound characteristic and a sound pressure level characteristic in about 600 Hz or less generated based on a vibration of the passive vibration member including a paper material.

Figure 23:
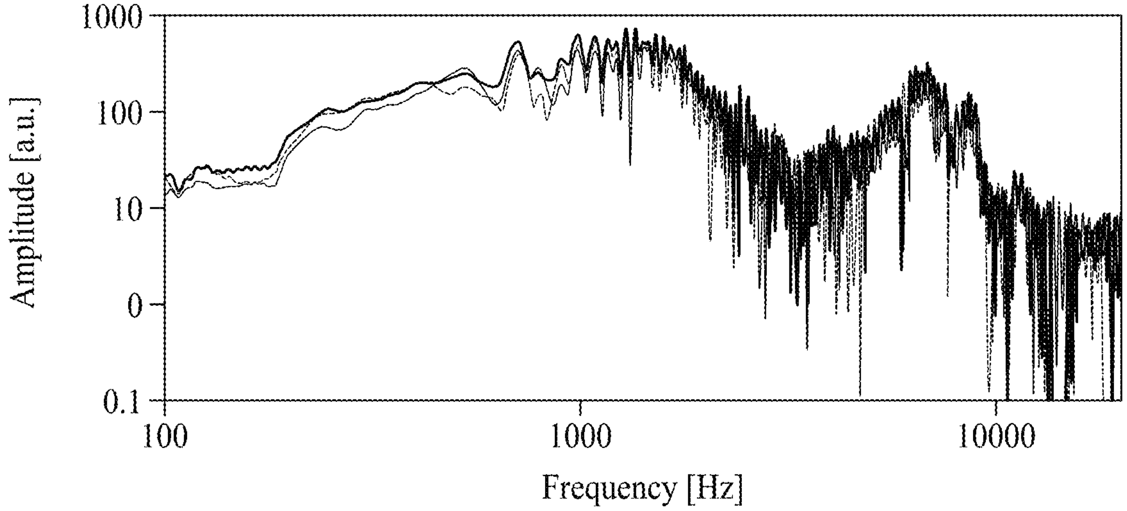
FIG. 23 is a graph illustrating a sound output characteristic based on a driving signal according to various embodiments of the present disclosure illustrated in FIGS. 13A, 13G, and 13I.

FIG. 23 is a graph illustrating a sound output characteristic based on a driving signal according to the first, seventh, and ninth embodiments of the present disclosure illustrated in FIGS. 13A, 13G, and 13I. In FIG. 23, a thick solid line represents a sound output characteristic based on a driving signal according to the seventh embodiment of the present disclosure illustrated in FIG. 13G, a solid line represents a sound output characteristic based on a driving signal according to the ninth embodiment of the present disclosure illustrated in FIG. 13I, and a dotted line represents a sound output characteristic based on a driving signal according to the first embodiment of the present disclosure illustrated in FIG. 13A.

With reference to FIGS. 5, 13A, 13G, 13I, and 23, comparing with the solid line and the dotted line, in the thick solid line, it can be seen that a sound pressure level increases in about 110 Hz to 250 Hz and 440 Hz to 900 Hz. Comparing with the dotted line, in the solid line, it can be seen that a sound pressure level increases in about 430 Hz to 1 kHz.

According to another embodiment of the present disclosure, as described above with reference to FIG. 21, the driving signal according to the seventh embodiment of the present disclosure illustrated in FIG. 13G can be applied as the driving signal of the vibration apparatus 200, in order to enhance a sound characteristic and a sound pressure level characteristic in about 110 Hz to 250 Hz and about 440 Hz to 900 Hz.

According to another embodiment of the present disclosure, as shown in FIG. 13I, the main active vibration member 200M can be controlled to vibrate based on the second negative driving signal NDS2 having the second amplitude A2, some of the first to eighth sub-active vibration members 200S1 to 200S8 can be controlled to vibrate based on the first positive driving signal PDS1 having the first amplitude A1, and the other of the first to eighth sub-active vibration members 200S1 to 200S8 can be controlled to vibrate based on the second positive driving signal PDS2 having the second amplitude A2, and thus, a sound characteristic and a sound pressure level characteristic in about 430 Hz to 1 kHz generated by the passive vibration member can be enhanced. Accordingly, the driving signal according to the ninth embodiment of the present disclosure can be applied as the driving signal of the vibration apparatus 200, in order to enhance a sound characteristic and a sound pressure level characteristic in about 430 Hz to 1 kHz.

Figure 24:
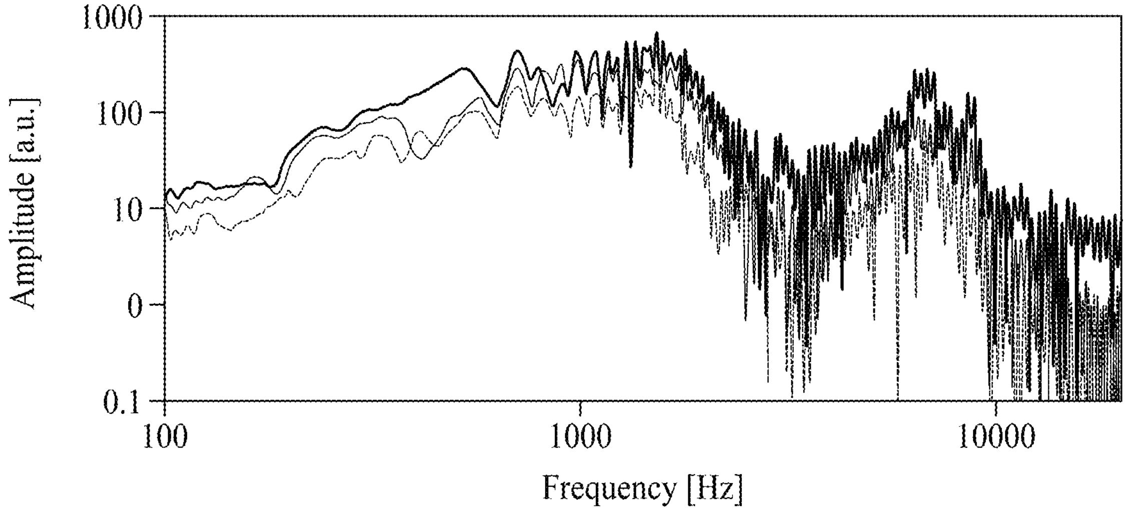
FIG. 24 is a graph illustrating a sound output characteristic based on a material of a passive vibration member, in driving of a vibration apparatus based on a driving signal according to the embodiment of the present disclosure illustrated in FIG. 13I.

FIG. 24 is a graph illustrating a sound output characteristic based on a material of a passive vibration member, in driving of a vibration apparatus based on a driving signal according to the ninth embodiment of the present disclosure illustrated in FIG. 13I. In FIG. 24, a thick solid line represents a sound output characteristic when the passive vibration member includes a plastic material, a solid line represents a sound output characteristic when the passive vibration member includes a paper material, and a dotted line represents a sound output characteristic when the passive vibration member includes a metal material.

With reference to FIGS. 5, 13I, and 24, comparing with the solid line and the dotted line, in the thick solid line, it can be seen that a sound pressure level increases in a full-pitched sound band. Comparing with the dotted line, in the solid line, it can be seen that a sound pressure level increases in 400 Hz or less.

According to another embodiment of the present disclosure, when the passive vibration member includes a plastic material, a main driving signal applied to the main active vibration member 200M can be controlled to the second negative driving signal NDS2 having the second amplitude A2, a sub-driving signal applied to some of the first to eighth sub-active vibration members 200S1 to 200S8 can be controlled to the first positive driving signal PDS1 having the first amplitude A1, and a sub-driving signal applied to the other of the first to eighth sub-active vibration members 200S1 to 200S8 can be controlled to the second positive driving signal PDS2 having the second amplitude A2, and thus, a sound characteristic and a sound pressure level characteristic in a full-pitched sound band range generated by the passive vibration member can be enhanced. Accordingly, the driving signal according to the ninth embodiment of the present disclosure can be applied as the driving signal of the vibration apparatus 200, in order to enhance a sound characteristic and a sound pressure level characteristic in the full-pitched sound band range generated based on a vibration of the passive vibration member including a plastic material. In addition, the driving signal according to the ninth embodiment of the present disclosure can be applied as the driving signal of the vibration apparatus 200, in order to enhance a sound characteristic and a sound pressure level characteristic in 400 Hz or less generated based on a vibration of the passive vibration member including a paper material.

Figure 25:
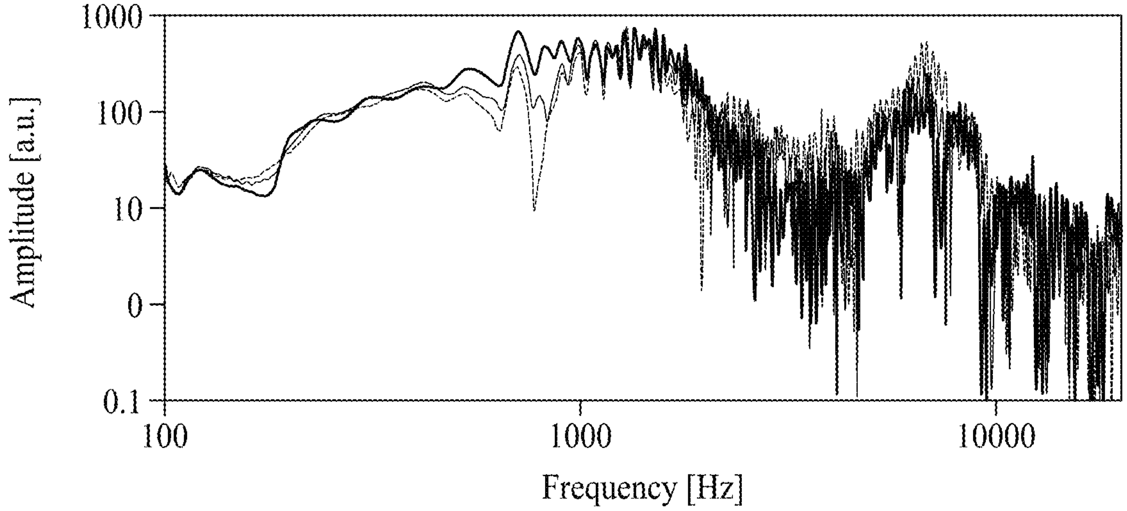
FIG. 25 is a graph illustrating a sound output characteristic based on an interval between a plurality of active vibration members, in driving of a vibration apparatus based on a driving signal according to the embodiment of the present disclosure illustrated in FIG. 13A.

FIG. 25 is a graph illustrating a sound output characteristic based on an interval between a plurality of active vibration members, in driving of a vibration apparatus based on a driving signal according to the first embodiment of the present disclosure illustrated in FIG. 13A. In FIG. 25, a dotted line represents a sound output characteristic when the interval between the plurality of active vibration members is set to 25 mm, a solid line represents a sound output characteristic when the interval between the plurality of active vibration members is set to 35 mm, and a thick solid line represents a sound output characteristic when the interval between the plurality of active vibration members is set to 50 mm.

With reference to FIGS. 5, 13A, and 25, it can be seen that the thick solid line, the solid line, and the dotted line have similar sound pressure levels in about 450 Hz or less. Comparing with the solid line and the dotted line, in the thick solid line, it can be seen that a sound pressure level increases in about 450 Hz to 1 kHz. Comparing with the thick solid line and the solid line, in the dotted line, it can be seen that a sound pressure level increases in about 2 kHz to 8 kHz.

According to another embodiment of the present disclosure, a plurality of active vibration members driven based on the driving signal according to the first embodiment of the present disclosure can be arranged to have an interval of 25 mm to 50 mm, based on a pitched sound band of a sound to be reinforced in an apparatus or a vibration apparatus.

Figure 26:
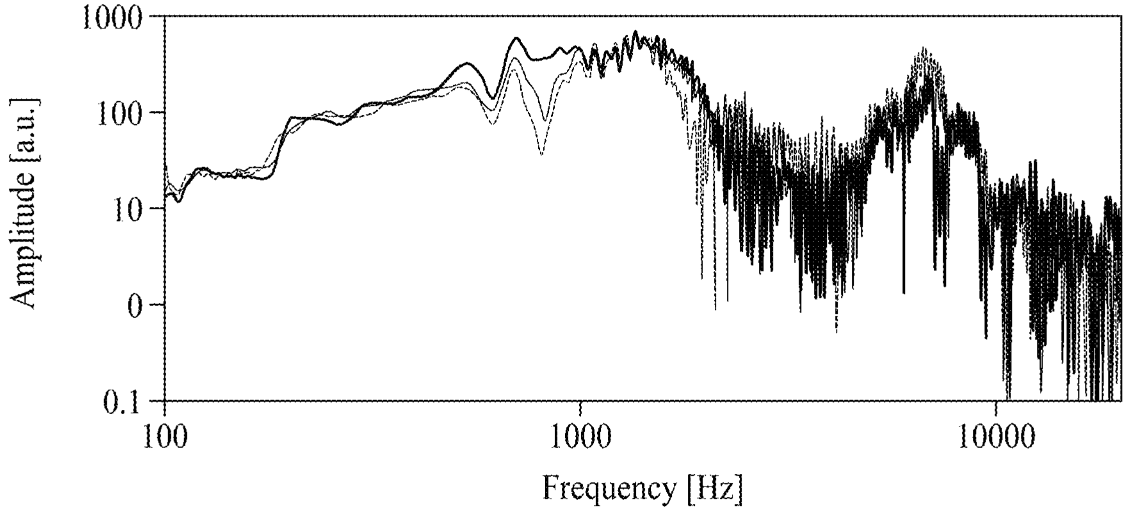
FIG. 26 is a graph illustrating a sound output characteristic based on an interval between a plurality of active vibration members, in driving of a vibration apparatus based on a driving signal according to the embodiment of the present disclosure illustrated in FIG. 13D.

FIG. 26 is a graph illustrating a sound output characteristic based on an interval between a plurality of active vibration members, in driving of a vibration apparatus based on a driving signal according to the fourth embodiment of the present disclosure illustrated in FIG. 13D. In FIG. 26, a dotted line represents a sound output characteristic when the interval between the plurality of active vibration members is set to 25 mm, a solid line represents a sound output characteristic when the interval between the plurality of active vibration members is set to 35 mm, and a thick solid line represents a sound output characteristic when the interval between the plurality of active vibration members is set to 50 mm.

With reference to FIGS. 5, 13D, and 26, it can be seen that the thick solid line, the solid line, and the dotted line have similar sound pressure levels in about 450 Hz or less. Comparing with the solid line and the dotted line, in the thick solid line, it can be seen that a sound pressure level increases in about 450 Hz to 1 kHz. Comparing with the thick solid line and the solid line, in the dotted line, it can be seen that a sound pressure level increases in about 3 kHz to 8 kHz.

According to another embodiment of the present disclosure, a plurality of active vibration members driven based on the driving signal according to the fourth embodiment of the present disclosure can be arranged to have an interval of 25 mm to 50 mm, based on a pitched sound band of a sound to be reinforced in an apparatus or a vibration apparatus.

Figure 27:
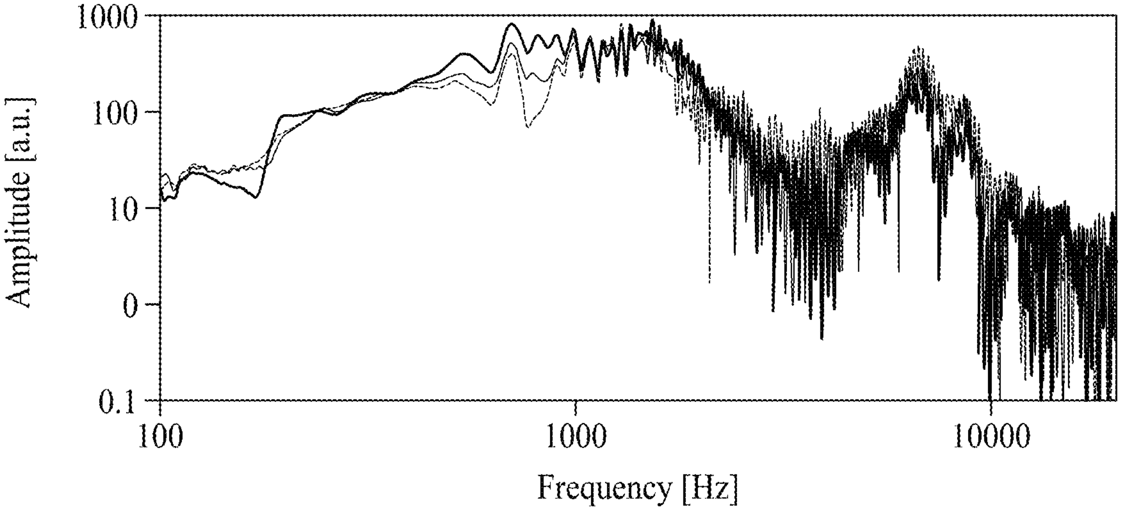
FIG. 27 is a graph illustrating a sound output characteristic based on an interval between a plurality of active vibration members, in driving of a vibration apparatus based on a driving signal according to the embodiment of the present disclosure illustrated in FIG. 13G.

FIG. 27 is a graph illustrating a sound output characteristic based on an interval between a plurality of active vibration members, in driving of a vibration apparatus based on a driving signal according to the seventh embodiment of the present disclosure illustrated in FIG. 13G. In FIG. 27, a dotted line represents a sound output characteristic when the interval between the plurality of active vibration members is set to 25 mm, a solid line represents a sound output characteristic when the interval between the plurality of active vibration members is set to 35 mm, and a thick solid line represents a sound output characteristic when the interval between the plurality of active vibration members is set to 50 mm.

With reference to FIGS. 5, 13G, and 27, it can be seen that the thick solid line, the solid line, and the dotted line increase in about 400 Hz to 1 kHz. Comparing with the thick solid line and the solid line, in the dotted line, it can be seen that a sound pressure level increases in about 2 kHz to 8 kHz.

According to another embodiment of the present disclosure, a plurality of active vibration members driven based on the driving signal according to the seventh embodiment of the present disclosure can be arranged to have an interval of 25 mm to 50 mm, based on a pitched sound band of a sound to be reinforced in an apparatus or a vibration apparatus.

Figure 28:
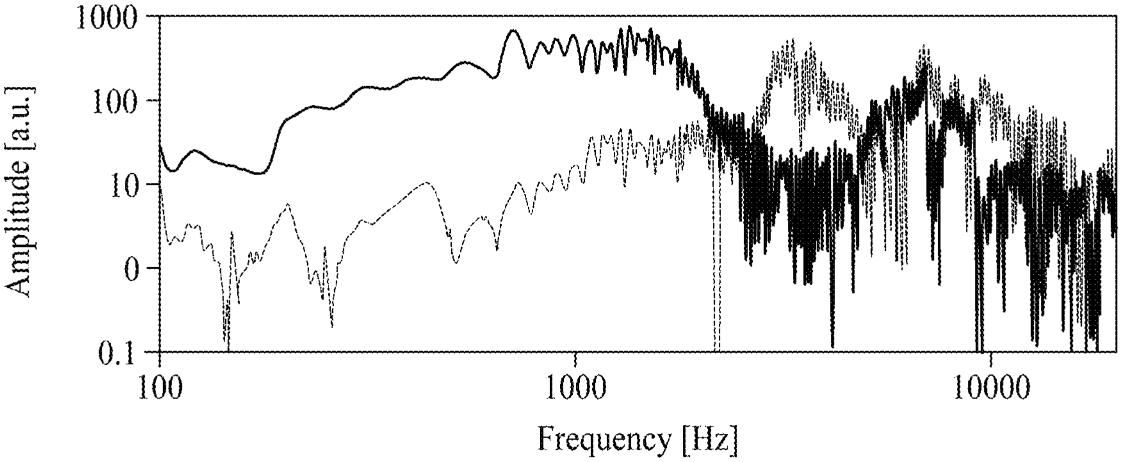
FIG. 28 is a graph illustrating a sound output characteristic based on an attachment scheme between a passive vibration member and each of a plurality of active vibration members, in driving of a vibration apparatus based on a driving signal according to the embodiment of the present disclosure illustrated in FIG. 13A.

FIG. 28 is a graph illustrating a sound output characteristic based on an attachment scheme between a passive vibration member and each of a plurality of active vibration members, in driving of a vibration apparatus based on a driving signal according to the first embodiment of the present disclosure illustrated in FIG. 13A. In FIG. 28, a dotted line represents a sound output characteristic when a plurality of active vibration members is provided at a passive vibration member by using the whole surface attachment scheme as illustrated in FIG. 2, and a thick solid line represents a sound output characteristic when a plurality of active vibration members is provided at a passive vibration member by using the partial attachment scheme as illustrated in FIG. 8.

With reference to FIGS. 5, 13A, and 28, comparing with the dotted line, in the thick solid line, it can be seen that a sound pressure level increases in about 1.1 kHz or less. Comparing with the thick solid line, in the dotted line, it can be seen that a sound pressure level increases in about 1.15 kHz or more.

According to another embodiment of the present disclosure, a plurality of active vibration members driven based on the driving signal according to the first embodiment of the present disclosure can be connected to or attached on a passive vibration member by using a partial attachment scheme, to reinforce a sound pressure level of an apparatus or a vibration apparatus in about 1.1 kHz or less. In addition, a plurality of active vibration members driven based on the driving signal according to the first embodiment of the present disclosure can be connected to or attached on a passive vibration member by using the whole surface attachment scheme, to reinforce a sound pressure level of an apparatus or a vibration apparatus in about 1.15 kHz or more.

Figure 29:
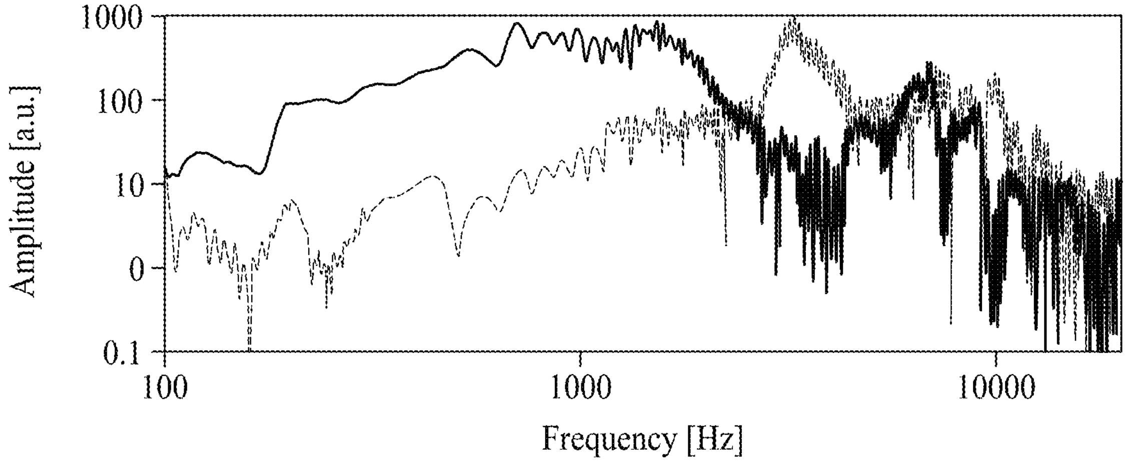
FIG. 29 is a graph illustrating a sound output characteristic based on an attachment scheme between a passive vibration member and each of a plurality of active vibration members, in driving of a vibration apparatus based on a driving signal according to the embodiment of the present disclosure illustrated in FIG. 13G.

FIG. 29 is a graph illustrating a sound output characteristic based on an attachment scheme between a passive vibration member and each of a plurality of active vibration members, in driving of a vibration apparatus based on a driving signal according to the seventh embodiment of the present disclosure illustrated in FIG. 13G. In FIG. 29, a dotted line represents a sound output characteristic when a plurality of active vibration members is provided at a passive vibration member by using the whole surface attachment scheme as illustrated in FIG. 2, and a thick solid line represents a sound output characteristic when a plurality of active vibration members is provided at a passive vibration member by using the partial attachment scheme as illustrated in FIG. 8.

With reference to FIGS. 5, 13G, and 29, comparing with the dotted line, in the thick solid line, it can be seen that a sound pressure level increases in about 1.15 kHz or less. Comparing with the thick solid line, in the dotted line, it can be seen that a sound pressure level increases in about 1.15 kHz or more.

According to another embodiment of the present disclosure, a plurality of active vibration members driven based on the driving signal according to the seventh embodiment of the present disclosure can be connected to or attached on a passive vibration member by using a partial attachment scheme, to reinforce a sound pressure level of an apparatus or a vibration apparatus in about 1.15 kHz or less. In addition, a plurality of active vibration members driven based on the driving signal according to the seventh embodiment of the present disclosure can be connected to or attached on a passive vibration member by using the whole surface attachment scheme, to reinforce a sound pressure level of an apparatus or a vibration apparatus in about 1.15 kHz or more.

Figure 30:
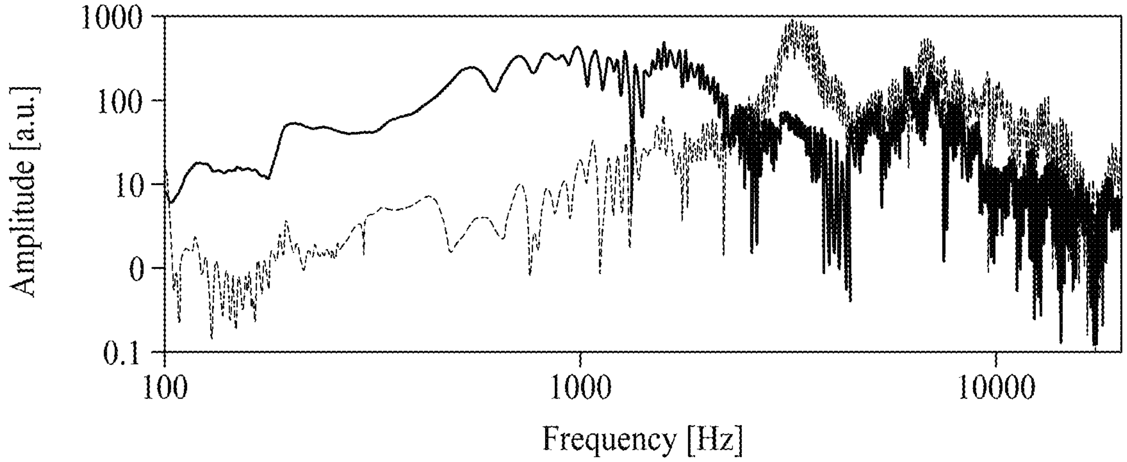
FIG. 30 is a graph illustrating a sound output characteristic based on an attachment scheme between a passive vibration member and each of a plurality of active vibration members, in driving of a vibration apparatus based on a driving signal of an experimental example illustrated in FIG. 13M according to an embodiment of the present disclosure.

FIG. 30 is a graph illustrating a sound output characteristic based on an attachment scheme between a passive vibration member and each of a plurality of active vibration members, in driving of a vibration apparatus based on a driving signal of an experimental example illustrated in FIG. 13M. In FIG. 30, a dotted line represents a sound output characteristic when a plurality of active vibration members is provided at a passive vibration member by using the whole surface attachment scheme as illustrated in FIG. 2, and a thick solid line represents a sound output characteristic when a plurality of active vibration members is provided at a passive vibration member by using the partial attachment scheme as illustrated in FIG. 8.

With reference to FIGS. 5, 13M, and 30, comparing with the dotted line, in the thick solid line, it can be seen that a sound pressure level increases in about 1.15 kHz or less. Comparing with the thick solid line, in the dotted line, it can be seen that a sound pressure level increases in about 1.15 kHz or more. However, comparing with the thick solid line of FIG. 28 and the thick solid line of FIG. 29, in the thick solid line of FIG. 30, it can be seen that a sound pressure level is considerably reduced in about 1.15 kHz or less. Accordingly, according to another embodiment of the present disclosure, the driving signal according to the experimental example can further enhance a sound characteristic and a sound pressure level characteristic of the low-pitched sound band.

A vibration apparatus according to an embodiment of the present disclosure can be applied to a vibration apparatus disposed at an apparatus. The apparatus according to an embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, etc. Addition, the vibration apparatus according to an embodiment of the present disclosure can be applied to organic light emitting lighting apparatuses or inorganic light emitting lighting apparatuses. When the vibration apparatus of an embodiment of the present disclosure is applied to lighting apparatuses, the lighting apparatus can act as lighting and a speaker. Addition, when the vibration apparatus of an embodiment of the present disclosure is applied to a mobile device, etc., the vibration apparatus can act as one or more of a speaker, a receiver, and a haptic apparatus, but embodiments of the present disclosure are not limited thereto.

An apparatus according to an embodiment of the present disclosure will be described below.

An apparatus according to some embodiments of the present disclosure can comprise a passive vibration member, a vibration apparatus including a plurality of active vibration members connected to a rear surface of the passive vibration member along at least one or more directions of a first direction and a second direction intersecting with the first direction, and a supporting member at the rear surface of the passive vibration member, a driving signal applied to at least one or more of the plurality of active vibration members can differ from a driving signal applied to the other active vibration members of the plurality of active vibration members.

According to some embodiments of the present disclosure, the driving signal applied to at least one or more of the plurality of active vibration members can have the same period as a period of the driving signal applied to the other active vibration members of the plurality of active vibration members.

According to some embodiments of the present disclosure, at least one or more of a phase and an amplitude of the driving signal applied to at least one or more of the plurality of active vibration members can differ from at least one or more of a phase and an amplitude of the driving signal applied to the other active vibration members of the plurality of active vibration members.

According to some embodiments of the present disclosure, the driving signal can comprise a main driving signal applied to a main active vibration member disposed at a center portion of a vibration region of the passive vibration member of the plurality of active vibration members, and a plurality of sub-driving signals respectively applied to a plurality of sub-active vibration members disposed at a periphery of the main active vibration member of the plurality of active vibration members, and at least one or more of the plurality of sub-driving signals can differ from the main driving signal.

According to some embodiments of the present disclosure, the plurality of active vibration members can be arranged at the same interval along the first direction and the second direction.

According to some embodiments of the present disclosure, an interval between the plurality of active vibration members arranged along the first direction and the second direction can be 25 mm to 50 mm.

According to some embodiments of the present disclosure, the passive vibration member can comprise a main vibration region and a plurality of sub vibration regions surrounding the main vibration region, the main active vibration member can be disposed at the main vibration region, and the plurality of sub-active vibration members can comprise a plurality of subgroups, and a plurality of sub-active vibration members included in each of the plurality of subgroups can be regularly or irregularly arranged at each of the plurality of sub vibration regions, based on a vibration displacement characteristic of the passive vibration member.

According to some embodiments of the present disclosure, sub-driving signals applied to a plurality of sub-active vibration members included in each of the plurality of subgroups can differ, or the sub-driving signals applied to the plurality of sub-active vibration members included in each of the plurality of subgroups can differ and can differ from the main driving signal.

An apparatus according to some embodiments of the present disclosure can comprise a passive vibration member, a vibration transfer member disposed at a rear surface of the passive vibration member and connected to the passive vibration member, a vibration apparatus including a plurality of active vibration members connected to the vibration transfer member along at least one or more directions of a first direction and a second direction intersecting with the first direction, and a supporting member at the rear surface of the passive vibration member, a driving signal applied to at least one or more of the plurality of active vibration members can differ from a driving signal applied to the other active vibration members of the plurality of active vibration members.

According to some embodiments of the present disclosure, the driving signal can comprise a main driving signal applied to a main active vibration member disposed at a center portion of a vibration region of the passive vibration member of the plurality of active vibration members, and a plurality of sub-driving signals respectively applied to a plurality of sub-active vibration members disposed at a periphery of the main active vibration member of the plurality of active vibration members, and at least one or more of the plurality of sub-driving signals can differ from the main driving signal.

According to some embodiments of the present disclosure, the vibration transfer member can comprise a vibration transfer plate connected to the plurality of active vibration members, and a connection member connected to the vibration transfer plate and the rear surface of the passive vibration member.

According to some embodiments of the present disclosure, the connection member can be connected between a corner portion of the vibration transfer plate and the rear surface of the passive vibration member.

According to some embodiments of the present disclosure, the vibration transfer plate can comprise a plurality of regions having different hardness.

According to some embodiments of the present disclosure, the vibration transfer plate can have hardness, which is largest at a center region of the plurality of regions, and can have hardness which is least at a region connected to the connection member.

According to some embodiments of the present disclosure, the main driving signal and each of the plurality of sub-driving signals can have the same period.

According to some embodiments of the present disclosure, at least one or more of a phase and an amplitude of the main driving signal can be the same as or different from at least one or more of a phase and an amplitude of each of the plurality of sub-driving signals.

According to some embodiments of the present disclosure, an amplitude of the main driving signal can be greater than or equal to an amplitude of at least one or more of the plurality of sub-driving signals.

According to some embodiments of the present disclosure, an amplitude of the main driving signal can be smaller than or equal to an amplitude of at least one or more of the plurality of sub-driving signals.

According to some embodiments of the present disclosure, each of the plurality of sub-driving signals can have an anti-phase of the main driving signal.

According to some embodiments of the present disclosure, some of the plurality of sub-active vibration members can configure a first group, and the other of the plurality of sub-active vibration members can configure a second group, a sub-driving signal applied to a sub-active vibration member of the first group can be the same as or different from the main driving signal, and a sub-driving signal applied to a sub-active vibration member of the second group can be the same as or different from the main driving signal.

According to some embodiments of the present disclosure, a sub-active vibration member of the first group and the main active vibration member can be arranged in a "×"-shape, and a sub-active vibration member of the second group and the main active vibration member can be arranged in a "+"-shape.

According to some embodiments of the present disclosure, an amplitude of a main driving signal applied to the main active vibration member and an amplitude of each of a plurality of sub-driving signals respectively applied to the plurality of sub-active vibration members can be symmetric with each other in one shape of a "+"-shape, a "/"-shape, a "*"-shape, a "×"-shape, a combination shape of a "×"-shape and a "–"-shape, a combination shape of a "+"-shape and a "×"-shape, and a "\"-shape with respect to the main active vibration member.

According to some embodiments of the present disclosure, each of the plurality of active vibration members can comprise a vibration device including a piezoelectric material; and a connection member connected to at least a portion of the vibration device and connected to the rear surface of the passive vibration member.

According to some embodiments of the present disclosure, the connection member can comprise an elastic material.

According to some embodiments of the present disclosure, the passive vibration member can be a display panel including a display area having a plurality of pixels to implement an image, or can comprise one or more materials of wood, rubber, plastic, flexible glass, fiber, cloth, paper, metal, carbon, a mirror, and leather.

An apparatus according to an embodiment of the present disclosure can provide an enhanced wide dynamic range, particularly with respect to low frequencies.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus, comprising:

a passive vibration member;

a vibration device including a plurality of active vibration members coupled to a rear surface of the passive vibration member, the plurality of active vibration members being arranged along one or more of a first direction and a second direction intersecting with the first direction; and a supporting member at the rear surface of the passive vibration member, wherein at least one or more of the plurality of active vibration members are configured to receive a driving signal that differs from a driving signal applied to other active vibration members among the plurality of active vibration members, wherein the plurality of active vibration members include a main active vibration member and a plurality of sub-active vibration members, wherein the driving signal includes a main driving signal applied to the main active vibration member and a plurality of sub-driving signals applied to the plurality of sub-active vibration members, and wherein each of the main driving signal and the plurality of sub-driving signals is based on one sound source signal and varies simultaneously.

2. The apparatus of claim 1, wherein the driving signal applied to the at least one or more of the plurality of active vibration members has a same period as the driving signal applied to the other active vibration members among the plurality of active vibration members.

3. The apparatus of claim 2, wherein at least one of a phase and an amplitude of the driving signal applied to the at least one or more of the plurality of active vibration members differs from at least one of a phase and an amplitude of the driving signal applied to the other active vibration members among the plurality of active vibration members.

4. The apparatus of claim 1, wherein:

the main active vibration member is disposed at a center portion of a vibration region of the passive vibration member; and the plurality of active vibration members are disposed at a periphery of the main active vibration member, and wherein at least one or more of the plurality of sub-driving signals differs from the main driving signal.

5. The apparatus of claim 4, wherein the main driving signal and each of the plurality of sub-driving signals have a same period.

6. The apparatus of claim 4, wherein at least one of a phase and an amplitude of the main driving signal is same as or different from at least one of a phase and an amplitude of each of the plurality of sub-driving signals.

7. The apparatus of claim 4, wherein an amplitude of the main driving signal is greater than or equal to an amplitude of at least one of the plurality of sub-driving signals.

8. The apparatus of claim 4, wherein an amplitude of the main driving signal is smaller than or equal to an amplitude of at least one of the plurality of sub-driving signals.

9. The apparatus of claim 4, wherein a phase of each of the plurality of sub-driving signals is an anti-phase of the main driving signal.

10. The apparatus of claim 4, wherein:

the plurality of sub-active vibration members include a first group of sub-active vibration members and a second group of sub-active vibration members; a sub-driving signal applied to at least one sub-active vibration member in the first group is same as the main driving signal; and a sub-driving signal applied to at least one sub-active vibration member of the second group is different from the main driving signal.

11. The apparatus of claim 4, wherein:

the plurality of sub-active vibration members include a first group of sub-active vibration members and a second group of sub-active vibration members;

the first group and the main active vibration member are arranged in a "×"-shape; and the second group and the main active vibration member are arranged in a "+"-shape.

12. The apparatus of claim 4, wherein an amplitude of the main driving signal applied to the main active vibration member and an amplitude of each of the plurality of sub-driving signals respectively applied to the plurality of sub-active vibration members are symmetric with each other in one shape of a "+"-shape, a "/"-shape, a "*"-shape, a "×"-shape, a combination shape of a "×"-shape and a "–"-shape, a combination shape of a "+"-shape and a "×"-shape, and a "\"-shape, with respect to the main active vibration member.

13. The apparatus of claim 1, wherein the plurality of active vibration members are arranged at a same interval along the first direction and the second direction.

14. The apparatus of claim 13, wherein the same interval between the plurality of active vibration members arranged along the first direction and the second direction is about 25 mm to 50 mm.

15. The apparatus of claim 1, wherein:

the passive vibration member comprises a main vibration region and a plurality of sub vibration regions surrounding the main vibration region;

the main active vibration member is disposed at the main vibration region.

16. The apparatus of claim 15, wherein the plurality of sub-active vibration members comprise a plurality of subgroups and sub-driving signals applied to sub-active vibration members in each of the plurality of subgroups differ from each other, or wherein the sub-driving signals applied to the sub-active vibration members in each of the plurality of subgroups differ from each other and the sub-driving signals differ from the main driving signal.

17. The apparatus of claim 1, wherein each of the plurality of active vibration members comprises:

a vibration device including a piezoelectric material; and a connection member coupled to at least a portion of the vibration device and the rear surface of the passive vibration member.

18. The apparatus of claim 17, wherein the connection member comprises an elastic material.

19. The apparatus of claim 1, wherein the passive vibration member is a display panel including a display area having a plurality of pixels to implement an image, or comprises one or more materials of wood, rubber, plastic, flexible glass, fiber, cloth, paper, metal, carbon, a mirror, and leather.

20. An apparatus, comprising:

a passive vibration member;

a vibration transfer member disposed at a rear surface of the passive vibration member and coupled to the passive vibration member;

a vibration device including a plurality of active vibration members coupled to the vibration transfer member along one or more of a first direction and a second direction intersecting with the first direction; and a supporting member at the rear surface of the passive vibration member, wherein at least one or more of the plurality of active vibration members are configured to receive a driving signal that differs from a driving signal applied to other active vibration members among the plurality of active vibration members, wherein the plurality of active vibration members include a main active vibration member and a plurality of sub-active vibration members, wherein the driving signal includes a main driving signal applied to the main active vibration member and a plurality of sub-driving signals applied to the plurality of sub-active vibration members, and wherein each of the main driving signal and the plurality of sub-driving signals is based on one sound source signal and varies simultaneously.

21. The apparatus of claim 20, wherein:

the main active vibration member is disposed at a center portion of a vibration region of the passive vibration member; and the plurality of sub-active vibration members are disposed at a periphery of the main active vibration member, and wherein at least one or more of the plurality of sub-driving signals differs from the main driving signal.

22. The apparatus of claim 20, wherein the vibration transfer member comprises:

a vibration transfer plate coupled to the plurality of active vibration members; and a connection member coupled between the vibration transfer plate and the rear surface of the passive vibration member.

23. The apparatus of claim 22, wherein the connection member is coupled between a corner portion of the vibration transfer plate and the rear surface of the passive vibration member.

24. The apparatus of claim 22, wherein the vibration transfer plate comprises a plurality of regions having different amounts of hardness.

25. The apparatus of claim 24, wherein the vibration transfer plate has a plurality of regions, and wherein a hardness of the vibration transfer plate at a center region among the plurality of regions is greater than a hardness of the vibration transfer plate at another region among the plurality of regions corresponding to the connection member.

26. An apparatus, comprising:

a passive vibration member; and a vibration device configured to vibrate the passive vibration member, the vibration device including a main active vibration member and a plurality of sub-active vibration members disposed around the main active vibration member, wherein the main active vibration member is configured to receive a driving signal that differs from a driving signal applied to at least one of the plurality of sub-active vibration members, wherein the driving signal includes a main driving signal applied to the main active vibration member and a plurality of sub-driving signals applied to the plurality of sub-active vibration members, and wherein each of the main driving signal and the plurality of sub-driving signals is based on one sound source signal and varies simultaneously.

27. The apparatus of claim 26, wherein the main active vibration member and the plurality of sub-active vibration members are arranged in a grid pattern, and wherein a first portion of the grid pattern is configured to vibrate differently than a second portion of the grid pattern based on different driving signals, or the grid pattern is configured to vibrate together as a single unit based on a same driving signal.

* * * * *